(12) United States Patent  (10) Patent No.: US 9,249,757 B2
Zauderer  (45) Date of Patent: Feb. 2, 2016

(54) TERRESTRIAL POWER AND PROPULSION FROM NUCLEAR OR RENEWABLE METAL FUELS WITH MAGNETOHYDRODYNAMICS

(76) Inventor: Bert Zauderer, Merion Station, PA (US)

( * ) Notice: Subject to any disclaimer, the term of this patent is extended or adjusted under 35 U.S.C. 154(b) by 0 days.

(21) Appl. No.: 13/584,467

(22) Filed: Aug. 13, 2012

(65) Prior Publication Data

US 2013/0042594 A1    Feb. 21, 2013

Related U.S. Application Data

(60) Provisional application No. 61/523,601, filed on Aug. 15, 2011.

(51) Int. Cl.
 *F02K 9/70*  (2006.01)
 *F02K 9/24*  (2006.01)
 *H02K 44/08*  (2006.01)
 *G21C 1/07*  (2006.01)

(52) U.S. Cl.
 CPC ...  *F02K 9/24* (2013.01); *F02K 9/70* (2013.01); *G21C 1/07* (2013.01); *H02K 44/08* (2013.01)

(58) Field of Classification Search
 CPC .............. F02K 9/24; F02K 9/70; H02K 44/08
 USPC ........... 60/39.465, 202, 203.1, 209, 210, 216; 310/11
 See application file for complete search history.

(56) References Cited

U.S. PATENT DOCUMENTS 2,504,357 A  *  4/1950  Swallen .................. 502/410
2,801,901 A  *  8/1957  Schaeffer et al. .............. 423/625
3,359,436 A  *  12/1967  Kohaut et al. .................. 310/11
3,480,806 A  *  11/1969  Berberich ........................ 310/11
4,200,815 A  *  4/1980  Petrick et al. .................... 310/11
4,624,191 A     11/1986  Zauderer et al.
4,694,729 A  *  9/1987  Hall ................................ 310/11

(Continued)

FOREIGN PATENT DOCUMENTS

WO    WO-03078540 A2    9/2003

OTHER PUBLICATIONS

Melting point, http://en.wikipedia.org/wiki/Melting_point, Mar. 2013.*

(Continued)

*Primary Examiner* — Ted Kim
(74) *Attorney, Agent, or Firm* — Andrew M. Calderon; Roberts Mlotkowski Safran & Cole, P.C.

(57) ABSTRACT

A propulsion system is disclosed that uses metal fuel particles heated to a range from 3000° K to 6000° K by reaction with oxygen in air inside a cyclone combustor to form metal oxides that are retained and removed from the combustor for re-conversion to metal, while nitrogen in the air is heated to the temperatures that on supersonic exhaust propels 50,000 ton monohull ships to from 50 to 100 knots. The ship can accelerate by electromagnetic force from a MHD generator-accelerator rendered electrically conducting by alkali metal seed injection into the gas. Also disclosed are 10 MW to 1000 MW Closed Cycle MHD power plants fired by natural gas into a top half of a falling pebble bed heat exchanger that transfers 2000° K to 3000° K heat to a noble or diatomic gas in a bottom half of the exchanger that on exit is seeded with an alkali metal rendering the gas conducting.

10 Claims, 8 Drawing Sheets

(56) References Cited

U.S. PATENT DOCUMENTS

| | | | |
|---|---|---|---|
| 4,765,258 | A | 8/1988 | Zauderer |
| 4,847,525 | A | 7/1989 | Sukoriansky et al. |
| 4,851,722 | A | 7/1989 | Zauderer |
| 5,211,006 | A | 5/1993 | Sohnly |
| 6,048,510 | A | 4/2000 | Zauderer |
| 6,440,193 | B1 | 8/2002 | Johansen et al. |
| 6,453,830 | B1 | 9/2002 | Zauderer |
| 6,722,295 | B2 | 4/2004 | Zauderer |
| 7,047,748 | B2 | 5/2006 | Zauderer |
| 7,247,285 | B2 | 7/2007 | Zauderer |
| 7,282,189 | B2 | 10/2007 | Zauderer |
| 7,435,400 | B2 | 10/2008 | Zauderer |
| 7,553,463 | B2 | 6/2009 | Zauderer |
| 8,337,613 | B2 | 12/2012 | Zauderer |
| 2007/0089423 | A1* | 4/2007 | Norman et al. .................. 60/728 |
| 2009/0021010 | A1 | 1/2009 | Walker |
| 2011/0173139 | A1 | 7/2011 | Zauderer |
| 2012/0005802 | A1 | 1/2012 | Claeys |
| 2012/0058042 | A1 | 3/2012 | Zauderer |
| 2012/0137877 | A1 | 6/2012 | Zauderer |

OTHER PUBLICATIONS

"Which Material has the Highest Melting Point?" http://www.wisegeek.org/which-material-has-the-highest-melting-point.htm, Feb. 2013.*

International Search Report of International Searching Authority for Application No. PCT/US2012/050617, date of mailing Dec. 4, 2012.

Written Opinion of International Searching Authority for Application No. PCT/US2012/050617, date of mailing Dec. 4, 2012.

L.D. Craggs et al."The Collisions of Electrons with Molecules", Handbuch der Physik, vol. 31/1, 3 pages, Springer-Verlag, Berlin, 1959.

R.J. Rosa "Magnetohydrodynamic Energy Conversion", revised 1987, 9 pages.

Comptroller General "Magnetohydrodynamics: A promising technology for efficiently generating electricity from coal", US General Accounting Office, Feb. 11, 1980, 12 pages.

B. Mrowca "Removing Heat from a Reactor in-Shutdown", Mechanical Engineering, vol. 133/No. 3, pp. 34-35 (2011).

Chris B. McKesson "Hull Form and Propulsor Technology for High Speed Sea Lift", JJMA, Bremerton, WA, revised Feb. 13, 1998.

G. Gabrielli et al. "What Price Speed?" , Mechanical Engineering J., Oct. 1950, 1 page.

George W. Sutton et al. "Engineering Magnetohydrodynamics", McGraw-Hill, Series in Mechanical Engineering, NY, (1965), 10 pages.

Ludwig Prandtl, "Essentials of Fluid Dynamics—With Applications to Hydraulics, Aeronautics, Meteorology and other Subjects" ,1952, pp. 220-229.

Jennings et al., "Gas Turbine Analysis & Practice", pp. 270-275,1953, McGraw H.H. Book Co.

"Federal Effort to Reduce the Cost of Capturing and Storing Carbon Dioxide" Cong. Budget Office, Jun. 28, 2012, 9 pages.

Andrew Murray, "Ship Building in Iron and Wood", Adam and Charles Black Pub., Edinburgh, UK, 4 pages, 1863.

Robert Murray, "Steam-Ships", Adam and Charles Black pub, Edinburgh, 1863, UK, 4 pages.

Ewan Corlett, "The Iron Ship", Arco Publishing Company, NY 1975, 6 pages.

Final Office Action for the related U.S. Appl. No. 13/584,574 dated Jan. 22, 2014, 9 pages.

* cited by examiner

FIGURE 4: TRANSPORT FACTOR (TF) V. SHIP SPEED

REQUIRED POWER AND AVAILABLE POWER

FOR SINGLE-ENGINE AIRCRAFT

POWERED BY RECIPROGATING ENGINE (solid lines) OR JET ENGINE (dashed lines)

Involuntary Speed Reduction in Head Seas - FastShip design compared with two other displacement ships.

TERRESTRIAL POWER AND PROPULSION FROM NUCLEAR OR RENEWABLE METAL FUELS WITH MAGNETOHYDRODYNAMICS

CROSS REFERENCE TO RELATED APPLICATIONS

The present application is a non-provisional application of U.S. Application Ser. No. 61/523,601, filed on Aug. 15, 2011, the contents of which are incorporated by reference herein in their entirety.

BACKGROUND OF THE INVENTION

1. Field of the Invention

The present invention relates to the use of gas-cooled nuclear reactors or renewable combustion of metal fuels, aluminum, magnesium, or zirconium, and with Magnetohydrodynamic (MHD) power generation and gas dynamic propulsion for terrestrial land, sea, and air use.

2. Background

Closed cycle MHD power utilizes the induced Faraday Law electromagnetic field in the MHD generator to yield non-equilibrium ionization in noble gases, preferably argon or helium, which is seeded with cesium in order to generate electric power. The gases are heated either indirectly with fossil fuels in a pebble bed heat exchangers wherein all molecular gases are evacuated prior to heating the noble gases to temperatures of about 2000° K (3140° F.). (Details in Zauderer-US 2012/0137877, which provides an over view of closed cycle MHD.)

Alternatively, a gas-cooled, pebble bed, nuclear reactor, similar to the nuclear rocket tested in the Mars Space Program in the 1960s, with hydrogen propulsion which achieved 5000° R. (2777° K), can be used. Also, experience from commercial gas cooled nuclear reactors with helium cooling, developed in the US and Germany at 1500° F. may be applied to 3000° F.

Between the early 1960 through the early 1970s Zauderer developed and tested shock tube and shock tunnels up to 10 MWt and achieved 20% enthalpy extraction at gas temperatures as low as 2000° K, the minimum at which an MHD power cycle can operate. The next step in 1973 was a one-minute 50 MW (thermal) MHD blowdown test to produce 15 MW of power, equal to 30% enthalpy extraction. The test cost was several million dollars. It was blocked by combustion MHD promoters that seized the entire $50 million US-DOE annual, $400 million over 7 years funding. However, researchers at Eindhoven U, Netherlands, tested in 1 minute blowdown, 2000° K, cesium seeded argon facility, a 5 MWt linear MHD generator that was designed and fabricated by GE's MHD group. It achieved the predicted 6% non-equilibrium power, proving the closed cycle MHD works. However, Eindhoven failed to credit GE. Zauderer recently discovered this information in his library. (See more information below.)

He also discovered in Public Law 404 in the 93$^{rd}$ Congress, where MHD was allocated $50 million annually from 1974 to 1982, that there was no Congressional directive that 99.9% of the funds be used solely for coal-fired direct open cycle MHD combustion. To justify this outrageous self-dealing they concocted in Energy Coal Alternative Study (ECAS) ordered by ERDA/DOE to justify killing coal fired, closed cycle MHD by setting up conditions that would cast non-equilibrium, as discussed in US 2012/0137877. Also, the history of two decades in the 1960s and 1979s of this inventor's research in closed cycle MHD is summarized in the Provisional Application, 61/323,601. Only the aspects that directly led to the present Non-Provisional Application are cited herein.

By coincidence, this published application '0137877 has just been granted a patent. Had CC-MHD continued in the 1970. it is possible that zero $CO_2$ emission with Closed Cycle could have been invented much earlier.

Another coincidence occurred on Jun. 28, 2012 when the Congressional Budget Office (CBO) released a Report that stated post combustion $CO_2$ separation from coal combustion exhaust followed by sequestration is uneconomical because it will cost 75% more than a regular coal plant, which is caused by a loss of 26% in coal power plant efficiency due to chemical $CO_2$ separation. In huge contrast, '0137877 by Zauderer discloses a parallel power plant with an existing Rankine steam cycle fired by devolatilized coal in parallel with an equal power closed cycle MHD Brayton cycle that doubles the power in the existing coal plants, separates $CO_2$ with only 4% plant efficiency loss, and triples the original plants revenue from double the electricity and the sale of cementitious slag from coal ash fired in a slagging combustor. Incredibly, closed cycle MHD that was buried by the coal open cycle coal MHD advocates in the 1970s has arisen like a Phoenix to provide all these benefits in power plants from 100 MW to 1000 MW.

Also, on Feb. 11, 1980, the US General Accounting Office issued a Report: "Direct Open Cycle Coal Combustion MHD: A promising technology for efficiently generating electricity from coal". It revealed that the MHD program was only in Phase 1 in the previous 6 years with almost all the funds committed to construction and operations of one large test facility called CDIF in Butte, Mont., and another smaller one in Tullahoma, Tenn. The next Phase 2 was to be a 500 MW (thermal?) MHD test plant, also in Butte, Mont. at a cost of $327 million, to be followed by a 1000 MW (electric) coal fired, open cycle MHD demonstration plant, presumably in Montana at a cost of one billion dollars ($3.5 billion in 2010). GAO estimated this would require 20-years of development. These huge sums and long time period to expend, presumably explains why the new Reagan Administration decided to terminate the MHD Program in 1981.

The only reference to closed cycle MHD in this Report and another recently uncovered 1981 Report by Zauderer on the Web was a few lines. This other shorter Report from the Congressional Research Service, Oct. 7, 1981, reached the same conclusions. It stated that DOE's support for Closed Cycle MHD was $1 million! Nowhere in these Reports was there any mention that due to the 10 times higher electric conductivity that resulted from non-equilibrium ionization in cesium seeded argon, an expenditure of under $10 million would have demonstrated a technically and economically viable closed cycle MHD power plant rated at about 10 MW electric (50 MW thermal). Another report recently uncovered that was issued by GAO in 1976. It was initiated at the request of the Congresswoman of the 3$^{rd}$ District Tennessee and it reiterated that the only Congressional mandate for the Open Cycle CDIF was that it had to be in Montana, not that any other version of MHD was forbidden. Furthermore, the Congressional Report document in support of PL 93-404 specifically stated that about 40% of the total funds were to support MHD at other locations without limitation to Open Cycle MHD.

This bias against closed cycle in the MHD Community continued after all MHD was shut down in the early 1980s, as evidenced in an MHD Power book by R. Rosa in 1987, which mentioned the Netherlands non-equilibrium MHD results but no GE results. More details are given below.

The reason for citing this "ancient" history is that it may explain why DOE rejected Zauderer's 2009 proposal for a zero $CO_2$ emission 20 MW coal fired power plant without even reading it because "coal ash does not burn" while the proposal states "burn carbon in coal ash". As noted above, the Jun. 28, 2012 CBO Report concluded $CO_2$ removal from coal is uneconomical. Zauderer's inquiry as to the reason his economical zero $CO_2$ emission 20 MW coal plant was not cited in the Report, CBO's response was "it was not peer reviewed". Now the beneficiaries of this coal report are wind, solar, and natural gas power. Therefore, it is not only in their interest for DOE not to fund the 20 MW $CO_2$ proposal, but also not to "peer review" it.

A 40 to 100+ Knot Navy.

Another consequence of DOE terminating Closed Cycle MHD in the mid-1970s was its adverse impact on the plan originally advanced by Admiral Elmo Zumwalt, Chief of Naval Operations 1970-1974, to construct a 100 Knot Navy that included large ships. The Navy has pursued this goal of faster ships to this day, as have commercial shippers. Speeds above the 50-knot range in Surface Effect Vessels (SEV) and Air Cushion Vehicles (ACV) have been commercialized. Also, the Navy tested prototype high-speed ships. Almost all of them have been in the 100s-ton range, or below, and with few at speeds over 50 knots range. Some were up to the 1000-ton range, but none at 10,000 tons, or above. All this information is documented in US Navy reports on these designs and tests.

The Navy's interest in high-speed ships came to this Inventor's attention only recently during evaluation of high-speed ship propulsion literature on the Internet. Since his group's work on closed cycle MHD in the decades of the 1960 and 1970 was supported by the Navy's Office of Naval Research (ONR), had he known of the Navy's interest it is possible that he would have brought the potential of closed cycle MHD to their attention. However, no one thought of this application because in a recent review of all the MHD technical progress reports that Dr. Zauderer's MHD Group submitted to the ONR contained a list of well over a dozen Navy Command Center recipients, but we were not contacted, as evidenced that we did not know of Admiral Zumwalt's 100 knot Navy. However, there was considerable research in MHD propulsion using seawater as the working fluid. There are other more serious problems with using seawater, as is described in the literature, but it is irrelevant for the present invention. As for no information on the 100-knot Navy, there was no Internet in the 1970s.

The present evaluation of high-speed ship development revealed that the Navy's high-speed ship development effort was nearly totally focused on ship designs, which consigned the standard, classic mono hull design near the bottom of this list. Instead the focus has been on multi-hull ships, such as the catamaran, trimaran, etc. Also, surface effect ships, (SES), where the ship is lifted by air jets to skim the sea surface, or SES ships whose hull rests on pontoons in the water, are susceptible to lateral stability problems, (one test ship flipped during trials on a lake). This is similar to what occurs in ferries, which have flat bottoms, and some of them have SES propulsion. From time to time there are reports that an overloaded ferry capsized and sank rapidly with great loss of life. Details are not given but if the load of people or goods crowd one end or a wave lifts one end, the ferry will flip. Also, long slender single hull ships, similar in concept as the mid-19$^{th}$ Century clipper sailing ships had lateral stability issues and suffered from high hull stresses that cracked some clipper ships in half, which limited the increased speed attainable. Therefore, while the Navy sponsored studies reported highest speed in SES, SEV and ACV ships, the risks of sending large 10,000s tons ships with these designs on long ocean voyages are problematic. However, since considerable analyses of these ship design up to 50,000 tons have been done, they were used in this Invention as a comparison standard.

The current favored design is the high-speed littoral combat ships with top speed of 50 knots, with thousands of tons in displacements. It appears that these ships are mono hull in design. They are powered by 2 gas turbines rated at about 30 MW that require very expensive reducing gears to drive the pumps that accelerate the water jets needed to propel the ship. Propellers are limited in high-speed use due to cavitations, (air pockets), that sets in at high propeller tip speeds.

Each of these energy transfers reduces the transfer efficiency from the power source to the propulsion device, which reduces efficiency and sharply increases the cost of increasing speed. The present invention discloses means whereby these intermediate power transfers are eliminated. In fact the present disclosed solutions brings ship power back to its ancient origin, namely transfer of power from sails or oars to speed with no intermediate steps.

An overall examination of the literature of the past several decades on high-speed ship development, especially the proposed designs for larger ships in the 10,000 ton and up displacement range, clearly reveals that the primary barrier to higher speed is the power source. The gas turbine has been assigned this role. However, its power is limited, as is clearly stated in Navy studies, and as explained in the introductory paragraphs to this invention. In a very in depth study by experts in 2004, the state of the art limit in marine gas turbines was listed at 40 MW, such as the GE-LM6000, whose specific fuel consumption is 200 kg/MWH, with fuel oil, which results in an efficiency of 41% LHV. (Gas turbine manufacturers use the lower heating value (LHV) while coal power uses the HHV. The reason is the former fuel has more hydrogen, which escapes unused as water vapor out the stack, and by using LHV this loss is ignored and makes the gas turbine more efficient than it really is if measured by HHV.)

Now the 2004 study projected that in the (undefined) future an LM9000 gas turbine rated at 125 MW, with an SCF of 180 kg/MWH would be available, and possibly in the far term future, the same gas turbine at 90 MW with an SCF 170 kg/MWH. However, from GE's current advertisements it appears that the LM6000 and two current littoral ship awards by the Navy, this turbine is still the limit of marine gas turbine technology. Furthermore, it runs on oil which is scheduled for replacement in the 5 decade long government quest for "energy independence". However, as per a recent Navy study, (see FIG. 5 herein) increasing the speed of the mothballed SS United States with its 50,000 ton deadweight from its peak power of 240,000 hp at launch in 1952 yielding 39.5 knots, to 45 knots, a speed increase of only 14%, would require 900,000 hp (670 MWe), namely, a 375% power increase, which is not even on the marine turbine horizon for a single gas turbine. However, a Navy sponsored study in 1998 on high speed sealift concluded that 8 GE-90 turbines (presumably the GE-LM9000) firing in parallel would each deliver 178,834 hp (133 MW) for a total of 1,430,670 hp (1067 MW) per ship.

SUMMARY OF THE INVENTION

As is discussed in the Description of this Invention, this result applied only to SES, SEV, and ACV ships in said study. As noted, this turbine is not yet available, and synchronizing 8 massive turbines is quite a challenge. These high-speed ship propulsion issues are disclosed in the present Invention, and summarized in FIGS. 3 to 6. Briefly, it is disclosed to use a metal fuel combustor whose gas thrust will provide in one unit the same hp as these 8 turbines. Alternatively, this thrust can also be provided by an MHD generator/accelerator. The result is somewhat similar as in the 1975 ECAS study, the GE-Closed Cycle MHD Case 102A, with its 930 MW electric Closed Cycle MHD generator channel that was 36 ft long, and had a 5.5 ft maximum width that would have easily fit in this 990 ft long, 101 ft beam SS United States, even with the MHD magnet and the added 66 ft long diffuser. The major difference that instead of argon, nitrogen would power the MHD generator.

This invention discloses totally new methods and processes for Earth bound propulsion and power generation by means of specified metal fuel combustion and gas cooled nuclear reactors to generate MHD power. These novel methods and processes incorporate in part this Inventor's prior Patents and in Provisional Applications, as explained herein. Due to multiple applications and multiple means of implementing them, any directly related prior art is discussed in the DETAILED DESCRIPTION in order to clearly differentiate any prior art from the novel aspects disclosed if this invention This invention discloses methods and processes by which energy is transferred directly in one step from the outlet of a high temperature metal fuel or nuclear heat source to its end use for propulsion or electric power generation. An example of direct energy transfer from a heat source to propulsion is a jet-propelled aircraft. In contrast, a car or a propeller-driven ship transfers energy from the heat source through intermediate steps, such as from the engine to gears and to tires in automobiles, or from the diesel engine to gears to motors to propellers in ships. However, the higher the temperature of the heat source, the more intermediate steps with more energy losses are required when using said state of the art propulsion systems. In contrast, the present invention discloses energy transfer from a high temperature source directly to the propulsion system by use of the heat source exhaust. Similarly, in the case of electric power generation the energy from the high temperature sources is transferred directly to the high temperature MHD electric generator without intermediate steps. Specifically, this invention discloses utilization of the high thermodynamic efficiency (>50%), very high MHD electric power density (>1000 MW/m$^3$), or very high propulsion thrust (>10$^6$ hp), that is attainable either by combustion of certain metals, such as aluminum or magnesium or zirconium, in the oxygen in air or in oxygen mixed with hydrogen, or by cooling of high temperature nuclear reactors with either nitrogen or hydrogen or a noble gas, such as helium or argon, in a high temperature Brayton cycle (>3600° R. [2000° K]) for terrestrial power generation or propulsion applications. The unique aspects of the high gas temperature Brayton cycle disclosed herein, is that it incorporates advantages found in current lower temperature thermodynamic cycles, while eliminating or mitigating the disadvantages of these lower temperature cycles.

Carnot's Second Law of Thermodynamics controls all power cycles. In the present case, it comprises a gas or liquid, heating the gas to a peak temperature, expanding the gas in a power production step, and rejecting the remaining heat to the environment. The ideal Carnot cycle is the most efficient cycle because its power output is totally reversible. However, reversibility is unattainable in actual cycles due to irreversible losses in all steps of the cycle.

The water-steam Rankine cycle is the closest in approaching the reversible Carnot cycle. This is due to the fact that most of the compression occurs in the water phase, which requires a very small fraction of the power produced in the steam expansion step. Therefore, despite its relatively low peak temperature of around 1000° F., which is dictated by steel properties, the thermodynamic cycle efficiency is relatively high, in the mid-40% range. However, about 20% of the fossil fuel energy is lost up the chimney because the fuel does not directly heat the steam, so the overall efficiency of even the largest 1000+ MW electric plants are about 35%.

Both the nuclear Pressurized Water Reactor (PWR) and Boiling Water Reactor (BWR) run on the Rankine cycle, with the first one using a heat exchanger to transfer heat from the pressurized (about 2000 psi) water heated by the reactor through a heat exchanger to the water-steam cycle at about 550° F., while the latter transfers heat directly to the steam water mixture at about 1000 psi and about 545° F. A steam-water separator removes the steam to power the steam turbine. The earthquake-damaged reactors in Japan are BWR. Their relevance to the present invention is it shows the importance of using a total systems approach in designing a power system, and the earthquake-tsunami exposed the deficiencies of the Rankine cycle for nuclear power use. The very low peak temperatures in these nuclear reactors yield low efficiencies of about 30%. This means that massive reactor vessels are needed to produce the heat to run a typical 1000 MW electric reactor plant. This has a very negative result in that it takes days to cool the reactor in an emergency even without more heat being generated by nuclear reaction after the neutron absorption rods are inserted. Furthermore, and much more serious, is the huge amount of spent nuclear reactive waste fuel that must be stored on site. It was assumed decades ago that this waste would have to be removed to a suitable permanent storage site. To this end in the US, the planned removal site was to be the massively excavated caves in Yucca Mountain, Nev. This work proceeded at a cost of billions under the erroneous assumption that Nevadans would accept this. Overlooked was the adverse experience of nuclear bomb tests in Nevada in the 1950s. As a result, spent nuclear waste remains stored and accumulates at the power plants. The current disaster in Japan has been made very much worse due to loss of water at the spent nuclear fuel vessel adjacent to the reactors. There has been much talk by experts in the US that the problems in Japan will be studied for lessons learned. There is no need to "study" that on-site waste storage is a very risky proposition, and the US Nuclear Regulatory Commission (NRC) current actions to extend the life of the 100 or so reactors that are between 30 and 40 years old by another 20 or so years will keep piling up waste at the plants. Also, while "study" sounds reasonable, it overlooks the meaning of the word "accident", which by definition is inherently "unanticipated". The problem of disposal of nuclear waste was "anticipated" from the beginning and the solution of storing it in water pools next a reactor was to be temporary. The "lesson" already learned from the Japanese disaster where radioactivity from the waste storage pools is that it is a major problem whose extent is as yet unknown. The extensive spread of highly radioactive water from the reactors and waste storage ponds is draining into the Ocean, where the authorities assert that it is diluted and harmless to humans and fish. This statement is an assumption because the long-term effects are unknown. It is now apparent that this radioactive cooling water could by itself be the "showstopper" for keeping these reactors operational, much less constructing new ones. The "solution" of using passive water-cooling that would not fail with pump power failure is questionable. In the first place, it has been reported that Unit No. 1 in Japan has a passive cooling water system and it failed. Also, a spokesman working on the new Generation 4 reactor under construction in Georgia, US, stated that the passive cooling system design on this reactor has only 3 days of cooling capacity. The Japanese reactors were still hot after several weeks. Therefore, either the waste must be removed, or infinitely better is to use another means of generating nuclear power without generating such waste, which is the "solution" in the present invention. Another argument advanced by a nuclear expert at MIT that new generation reactors would be safer because they will completely eliminate human contact during operation, as was the primary cause of the TMI, Chernobyl, and the bad result in Japan. Incidentally it has been recently revealed that another reactor meltdown occurred in France in the 1980s. The flaw in the "hands off" solution is that circuits can fail or be sabotaged, and with no one familiar on how to stop an automated failure the consequences could even be worse. Incredibly and new massive "hands off" failure just disclosed was the crash of a Air France jet for Brazil to Paris, France into the Atlantic Ocean. It was found that above a certain elevation where all long range flights operate, the entire system is automatic and when the speed indicator erroneously flashed a danger signal the pilots had no training in how to respond to this extremely rare occurrence, and as a result they overrode the controls in a direction that made the plane stall and crash into the Ocean with all several hundreds on board killed. The real solution is to design a reactor that will shut itself off an inherent aspect of its design if the reactor runs away, and that operates at very high temperatures so that any reduction of power cools it automatically and does not use water cooling and it is extremely compact and it is buried deep underground away from population centers, all of which is disclosed herein in the reactor design.

The massive breakdown in shutdown procedures in the Fukushima reactors in Japan shows deficiencies in reactor shutdown procedures even with multiple backup shutdown procedures. One such example appeared in a short two-page summary in the May 2011 issue of Mechanical Engineering, Vol. 133/No. 3, pp. 34-35: "Removing Heat from a Reactor in Shutdown." Despite the multiple alternate backup systems, the bottom line is they all depend on cooling water, and on access to on-site and off-site electric power. Even the new so-called $4^{th}$ generation reactors that have enough cooling water in massive water filled tanks on top of the reactor for automated cooling will run out of cooling capacity if no power is available after about 3 days. Then the last resort, as was the case in Japan, although it was implemented far too late to prevent hydrogen explosions, is to vent the high pressure steam to the atmosphere through specially constructed vent pipes whose exhaust is located some distance from the reactor building. While this event is extremely rare, it can happen, as it did in Japan. So now the non-polluting, non-greenhouse gas power source, PWR/BWR can emit radioactive materials into the atmosphere.

Another risk of PWR/BWR reactors is the need to clean up water spillage from whatever cause at or near the nuclear reactor vessel and storage areas from locations of elevated radiation. It has been reported that untrained temporary workers may be exposed to radiation while doing this work in Japanese nuclear power plants.

The bottom line from these experiences is that these inefficient massive PWR/BWR reactors are not the solution for widespread power generation near population centers. The present invention offers far less risky solutions.

At the dawn of peaceful uses of nuclear energy in the President Eisenhower "Atoms for Peace" Program in the 1950s, other nuclear reactor designs were developed, erected, and tested, including reactor piles cooled by helium in the US, by $CO_2$ in the UK, by helium in Germany. Interestingly, all these reactors were used to transfer heat though heat exchangers to a low temperature Rankine steam cycle. The German reactor used 5 cm diameter refractory pebbles packed with 100,000s mm diameter size uranium chips. A small number of the dry pebbles were continuously removed from the packed bed reactor for off-site storage, or better yet reprocessing, followed by re-injection in the top of the reactor vessel. In effect this removed the need for nuclear waste ponds as is required in all current water-cooled reactors. In the 1990s, the South African utility purchased the pebble bed reactor design from Germany. They increased the peak helium temperature from 1500° F. to about 1800° F., in order to heat the helium for direct use in gas turbines, which increased the plant efficiency by several percentage points. However, all work stopped after a decade in 2010 due to undisclosed problems. A plausible explanation for the stoppage is that the government saw ever increasing costs as new problems arose, and unlike other nuclear power plant in Nations that financially support nuclear power, including the US, which now provides up to $18 billion in loan guarantees, South Africa could not afford it. The cancelled pebble bed reactor would not need nuclear waste product pools because the nuclear pebbles would be continuously re-cycled from the bottom of the reactor to the top after reprocessing. At least two recent articles in the printed press suggested reviving the nuclear pebble bed reactors.

As cited in a recent Mechanical Engineering (ME) article another newly reactivated contender is the molten salt reactor, also called the liquid fluoride reactor. Its advocates assert that it runs at very low pressure and thus needs no high pressure as do the BWR/PWR reactor. However, while asserting the fluid interaction with the metal has been solved, the bottom line is that relying on this for decades of operation is highly problematic. After all the repeated cycling of aluminum as occurs in jet aircraft pressurization and depressurization on thousands of takeoffs and landing has been known since around 1950 after a pair of British Comet jets exploded in mid-air, as this Inventor learned in a Materials course at MIT in the late 1950s. It was "solved" supposedly for 60,000 takeoffs until recently when several Boeing 737 lost a small part of their skin in flight, that included one death, after only 30,000 takeoff. While that may be resolved in jet planes, the consequences are nowhere near as disastrous as it would be in a nuclear reactor.

Another problem with liquid or molten salt reactors is it that they also operate at temperatures of about 650° C., similar to the water-cooled reactors. The ME article states that this reactor can approach 50% efficiency versus 30% in the water-cooled reactors. This assertion is dubious because both thermodynamic cycle are in the same temperature range, and use indirect heating of the steam cycle.

In contrast, the present nuclear MHD cycle's efficiency is estimated at 56%. This result is derived from the detailed extensive analysis of the 1000 MWe coal fired MHD Brayton cycle analyzed under the 1975 ERDA-ECAS study at 10 atm, 2000° K (3140° F.). This efficiency excludes the 20% stack losses, which are absent in a nuclear plant. The actual number is probably at least several percentage points higher due to the absence of coal handling and disposal equipment. This also compares to 40% efficiency in gas cooled pebble bed nuclear reactors. Also, direct connection of the nuclear reactor heated gas to the MHD generator results in a very compact power system.

However, as explained below, this is not the maximum performance and efficiency attainable because direct thermal connection to an MHD generator enables this Brayton cycle with nuclear fuel to operate to 3000° K and with Al or Mg to 4000° K, and up to 6000° K with beryllium or zirconium, for propulsion on ships. Unlike the BWR/PWR that need 1000

MWe for economic power production, the MHD generator would be efficient from 10 s of MWe to several 1000s of MWe. Gas turbines cannot operate as such high temperatures because metal turbine blade cooling limits operation to about 1650° K The MHD generator only requires wall cooling, and can operate at these high temperatures with cooled refractory and electrode walls. The consumption rate of nuclear fuel would be less than one half that in current reactors. Also, the high reactor temperature means that radiation, conduction, and convection cooling will rapidly drop the reactor refractory materials temperature when neutron absorption control rods are inserted to stop the reaction. Furthermore, the pebbles and the reactor inner wall would be coated with refractory materials, such as MgO or $ThO_2$ which can operate to 3000° K, and others such as $Al_2O_3$ to above 2000° K, the hotter the heating from residual nuclear reactions, the greater the heat transfer, especially from radiation which is a function of temperature to the $4^{th}$ power. At 3000° K, radiation is 5 times greater than at 2000° K. Therefore, reactor overheating would be self-limiting. As a last resort the reactor vessel could be designed with an emergency trap door to drop the pebbles out the bottom, which would immediately stop fission.

Another nuclear power option on which considerable development was implemented in the 1950s that is being re-suggested in the press after the current Japanese disaster is the Homogeneous Thorium Reactor (HTR). In this case, the thorium acts as a neutron-breeding blanket for fissionable U233 and the pebbles would consist of Th—U mixtures. Another proposal in the news media is to place this material in molten fluoride salts, which was studied experimentally in the 1950s and 1960s. However, this does not eliminate the risk of overheating that would result from coolant loss, which the present invention avoids as stated in the previous paragraph. Furthermore, the present reactor is a small fraction of the size of water-cooled reactors, which sharply reduces the plants footprint and fission material. As a result the nuclear plant could be placed deep underground.

As for implementation, the present invention discloses proceeding first with a non-nuclear pebble bed MHD generator system of short duration (minutes) followed by long duration operation (hours, days, weeks, months) to test the durability of pebbles with similar properties as would be used in a nuclear MHD plant with nuclear fuel (See FIG. 3 in US Publication No. 2012/0137877, the contents of which are incorporated by reference herein in their entirety). Said pebble will be designed as in the nuclear case but without any nuclear material. For initial pebble bed materials tests, the first step could be with natural gas fired with air, or oxygen enriched air to achieve at least 3000° K in a combustor to heat the pebble bed. This would be followed by MHD power operation with a 2 stage slagging combustor (See FIG. 1, herein) rated at 50 MW thermal) using metal powder of either Mg, Th, Zr, fired with oxygen mixed with helium or argon to form liquid metal oxides at temperatures above their melting points of around 3000° K. About 90% of the liquid oxides would impact the liquid metal oxide walls in the first stage of the slagging combustor, and be drained and quenched. The oxides would be reprocessed for reuse as metal fuels. In the $2^{nd}$ stage additional argon or helium would be injected on a reverse swirl direction to counter balance the first stage swirl and to cool the first stage helium or argon from the $1^{st}$ stage to somewhat below 3000° K. This will be followed by attaching to the $2^{nd}$ stage chamber outlet the linear MHD generator. The helium or argon will be seeded with cesium or potassium upstream of the generator entrance at concentrations of 0.1 to 1% by weight to render the gas electrically conducting by thermal equilibrium and by induced non-equilibrium ionization caused by the Faraday voltage in the generator. In steady state operation the gas exhaust would flow though a boiler to generate steam that drives the air, He or Ar gas compressors. The alkali metal would be condensed and recovered upstream of the gas compressor to compress the gas mixtures to 10 to 40 atmospheres (See FIG. 2, herein.). This process would continuously operate with recovered condensed cesium metals and recompressed helium or argon gases to produce power. But most important it would be the prototype of a nuclear MHD power plant with the only change needed would be to put nuclear materials into the pebbles in the stationary pebble bead equal in size to the bottom half of the gas fired pebble bed heat exchanger. In the nuclear mode, some pebbles would be removed from the bottom of the heat exchanger, and evaluated regularly, reprocessed as needed and reinserted at the top.

The nuclear reactor core and MHD generator would be very compact, and very efficient. Also, there would be no water-cooled reactors, and no off-site nuclear waste disposal. (A critique of off-site nuclear waste disposal and underground nuclear power plants that are being proposed is given below.)

Another problem with BWR/PWR reactors is their high cost, in the $5000 per kW range. According to a March 2009 Power Plant Symposium at MIT, the standard nuclear parts replacement over production costs range from $84/MWH to $155/MWH. (Note that this was before the Japan incident in March 2011). These costs are for 1000 MWe nuclear plants. In addition, utilities are seeking $10s of billion in loan guaranties from the government. In other words, the taxpayers assume the risk while the utilities assume the profits. The incredible aspect of these loan guaranty requests is that after 40 years of commercial service one would think that reactor manufacturers know how to design such plants. The current Japanese reactor problem shows that all aspects of this technology cannot be predetermined, and that disastrous results and huge liabilities can result from unanticipated accidents. A nuclear accident is not the same as other accidents because it can leave the site uninhabitable for decades or even centuries. What is absolutely incredible is that six (6) massive nuclear reactor were located at one earthquake-tsunami site with no provision for this earthquake that last occurred 1000 years ago as determined from existing archeological data. Another serious problem learned from the Japanese is the danger of storing nuclear waste at the plant with less protection than the reactor building. Another serious problem is damage to the instrument and controls prevent data collection to even assess the extent of the damage. This last shortcoming is a show-stopper to the latest "solution" advanced namely automated cooling systems that do not require mechanical pumps that are not available on power failures. It has now been disclosed that current reactors can meltdown if cooling is lost for only several days. Also, this extending the life of reactors beyond 30 to 40 years on grounds that nothing happened so far is not a sound reason. One result of life extension is that nuclear waste accumulates. Also, the reason given for extension is that no funds have been set aside by the utilities for decommissioning. The bottom line is that existing nuclear power technology is uneconomical and also must rely on massive taxpayer subsidies and without guaranty that there will not be any massive failures.

In sharp contrast, the nuclear plants disclosed herein could economically start at 100 MWe at low cost, and negligible operational risks compared to BWR/PWR plant. The compact size enables one to erect them deep underground, and in areas far away from population centers.

The above is not the only benefit of operating MHD Brayton cycles at very high peak temperatures that result in very high cycle efficiencies. Another key benefit is that as the peak gas temperature increases, the ratio of gas compression power to turbine (i.e. MHD generator) power sharply decreases, to the point where this cycle is substantially more efficient that any other power cycle.

To show the benefit of this disclosed thermodynamic cycle, it is instructive to compare it with the effort in recent decades to improve the efficiency of Rankine and Brayton cycles.

For example, to squeeze another five percentage points to the total power plant efficiency over the current state of the art of steam Rankine cycles, the industry has been erecting super critical steam power plants with pressures of 4400 psi and temperatures of 1166° F. These conditions require very costly high temperature and pressure metal alloy steam tubes, which when added to emission controls for $SO_2$ with scrubbers and for $NO_x$ with catalytic reduction increase the capital cost for coal fired power plants by at least 50% to the $3000/kW range. Even this does not solve the coal use problem in that $CO_2$ removal and sequestration will be required in response to climate change. According to an MIT March 2009 Symposium, cited above, retrofit of coal power plants for $CO_2$ removal would cost an additional $74/ton of $CO_2$, $61.1/MWH, and reduce the plant efficiency by 27%. The Jun. 28, 2012 CBO $CO_2$ report quote this MID study as well as others that all generally agree with the very high $CO_2$ costs.

To solve the coal emission problems, the utility industry turned massively to natural gas fired turbine power plants in the 1990s to the point where 40% of current U.S. capacity is natural gas fired. During this time, coal prices have decreased by 32%. Nevertheless, coal power still accounts for 43% of all U.S. power in 2010, and only 30% in 2012, while natural gas is up from 24% in 2012 to the same 30% as coal. In other words, half the gas power production has been idle for a decade because at the same time in the 1990s, some States deregulated the electric industry, which opened the market for developers to purchase utility power plants and more important to erect natural gas fired power plants to sell on the open market. This massive new gas demand led to disastrous results because the price of natural gas exploded from the historical $2/MMBtu to over $10/MMBtu after 2000. This resulted in many bankruptcies among the so-called merchant power producers with massive losses to stock and bondholders.

The relevance of this history to thermodynamic power cycles is that gas turbine power cycles are subject to the Brayton cycle, and using gas turbines places a substantially lower ceiling on cycle efficiency than high temperature MHD. For the past several decades, the state of the art of the typical peak temperature at the inlet to the gas power turbine has been in the range of about 2500° F. This temperature limit is due to the need to cool the turbine blades, which require operating the turbine at substantial excess air to the point of reducing the $CO_2$ exhaust concentration to the 3% range. As a result the removal of $CO_2$ from the exhaust requires very costly chemical separation with amines at costs that are even greater than those cited above for $CO_2$ removal from coal, which makes removal of $CO_2$ from gas power plants cost prohibitive.

To enable the economic use of metals as a fuel, over 90% of the resultant metal oxide must be recycled. If fossil fuels are used for this purpose, the $CO_2$ must be separated from the combustion gases prior to sequestration, as described in U.S. Pat. No. 7,282,189 and US Publication No. 2012/0137877. Another major advantage of this physical $CO_2$ separation over the chemical separation became apparent to this author from the Jun. 28, 2012 CBO Report wherein FIG. 1 shows a schematic of the chemical processes. It shows that the 10% by volume of the $CO_2$ in the combustion gases undergoes chemical separation at 1 atm. prior to $CO_2$ compression. This means that the gas volume in the separation chamber is at least 20 times greater than in physical separation that occurs in the 20% $CO_2$ by volume. This means that the chemical separation vessel is very much greater, than the physical separation vessel. CBO FIG. 1 was the first time that this advantage of physical over chemical separation was apparent to this author.

Also, high gas dilution in high temperature gas turbines results in another negative effect, namely, compressor power. For example, a state of the art turbine requires about 48% of the gas turbine power output at 2500° F. peak temperature, for 40 atm compression, even assuming 3-stage compression with intercooling.

In contrast, a metal fuel combustor with air at 40 atm, and 4000° K peak temperature with aluminum powder fuel, 3-stage compression with intercooling, is now only 15% of the total thermal input for gas compression. Assuming another 5% for other cycle losses, 80% of the thermal input would be available for thrust or power production. This very high efficiency is more than double the thrust or power from gas turbines or diesels. This fact that the higher the peak Brayton cycle temperature the higher the efficiency is well known. Incredibly this temperature advantage was never emphasized in the ECAS study despite the fact that the compression power in Open Cycle MHD at 4500° F. was 25% of the heat input versus 45% in the 3000° F. Closed Cycle MHD. Had Closed Cycle MHD advocated, including this author, recognized this, we certainly would have studied 4500° F. power cycles by using oxygen enrichment or higher air preheat. Closed Cycle channels are not subject to the corrosive wall effects of Open Cycle. In fact Zauderer's 10 MWt shock tunnel non-equilibrium MHD power tests showed better results at higher gas temperatures. However, no one considered that the compression power over the power output ratio would decrease, which would make Closed Cycle MHD the most efficient ECAS cycle."

Advantages and Further Explanation of the Present Invention

In summary, the following lists the advantages of this invention whose goal is to extract the maximum power from gas cooled high temperature nuclear reactors or very high temperature combustion of metals, as stated at the beginning of this summary.

One advantage of the present invention is using metal oxides that are produced by combustion of certain metals to directly heat gases to high temperatures whose exhaust enables them to propel ship, land, and air vehicles at much higher speeds than currently available.

A second advantage is to modify the first process by adding a low ionization alkali metal to seed said gas to enable electric power production in a Magnetohydrodynamic (MHD) generator for electricity generation or for driving an attached co-axial MHD accelerator for direct propulsion, or for driving DC electric motors to drive water jet pumps or water propellers.

A third advantage is to implement the two above objectives by replacing the metal fuel with a pebble bed nuclear reactor heat source in order to produce the same power and gas acceleration as under the previous two objectives.

To briefly elaborate:

The first two advantages are implemented in a slagging, cyclone combustor into which fine metal powders, such as aluminum, magnesium, beryllium or zirconium, are injected and fired with the oxygen in dry air, to form metal oxide droplets that the tangentially injected air drives to impact the liquid metal oxide coated combustor wall, from which said liquid slag drains into a quench tank located beneath the bottom downstream end of the combustor, where the solid metal oxide particles are removed for reduction at an off-site reprocessing to the original metal.

To meet the first propulsion advantage, the heat released during the metal particle oxidation heats the oxygen depleted nitrogen in the air, which can be augmented with additional air primarily if the fuel is aluminum, and compressed before combustion to at least 10 atmospheres, and preferably to 40 to 100 atm. to gas temperatures in the range of 3000° K and higher in order to achieve the high thrust required for large ship propulsions at speeds up to 100 knots or higher.

For the second MHD power advantage, the nitrogen for terrestrial use is seeded with an alkali metal powder, preferably cesium, to temperatures of at least 2000° K but preferably 4000° K or even higher, in order to thermally ionize the cesium as well as to additionally ionize the cesium by nonequilibrium electron heating by the induced electric field by Faraday's Law inside a Magnetohydrodynamic (MHD) generator and MHD accelerator, which results in an electric conductivity that is high enough when combined with the applied magnetic field to power land based, or sea, or air transport systems.

As the on-board stored metal nears total consumption, which would consist of a quantity sufficient to complete the vessel's selected transport mission, reprocessed metal is loaded from a transport vehicle, while the metal oxide is removed for reduction in a metal reprocessing plant.

In case of an Ocean going ship, refueling would be either on a metal storage ship, which is equipped with nuclear power for electrolytic reduction of the oxide to its metal, or at the vessel's land destination, where reprocessing power would be provided by nuclear power or preferably hydrogen that is derived from coal volatiles, to reduce the metal oxide into the metal, or in the case of aluminum, into aluminum and aluminum hydride. This metal fuel mode of transportation would be accomplished without using fossil fuels. Reprocessing with nuclear power would eliminate fossil fuels and $CO_2$ emissions. On the other hand, with land based reprocessing hydrogen derived from natural gas could be used, or coal from which all emissions would be first removed, including $CO_2$ that would be sequestered underground.

The processes and method disclosed in the present Applications incorporate by reference in their entireties methods and processes that are based in part from U.S. Pat. Nos. 7,553,463, 7,435,400, U.S. Pat. Nos. 7,232,189, 7,247,285, 7,047,748, 6,722,295, 6,453,830, 6,048,510, 4,765,258, and 4,624,191, and by this inventor's Patent Applications 2012/0058042, 2011/0173139, 2012/0137877, which by reference are incorporated herein as needed in order to implement the present invention's advantages. They concern how to design, construct, and operate combustors for fossil fuels, primarily coal, and how to reduce and eliminate pollutants from their combustion. Differences in coal and waste fuel properties require different methods of operation and control.

This invention also teaches that this metal fueled MHD system would also be used to provide the technology base for designing and erecting nuclear reactors with thousands of ceramic or graphite spherical pebbles of several inches in diameter that contain tens of thousands of fissionable uranium particles that heat either hydrogen, or helium or argon to 2000° K to 3000° K and are seeded with cesium or potassium at the outlet of the reactor as the gas enters a closed cycle MHD generator to produce land based stationary or ship based power. Alternatively, a nuclear reactor using thorium and uranium 233 could also be used.

U.S. Pat. No. 4,851,722, which by reference is incorporated herein by reference in its entirety, reports the adiabatic flame temperature of the metals Al, Mg, Be, Zr in $O_2$. At 1 atm., it is about 3800° K (6389° F.), at 10 atm., it is about 4300° K (7289° F.), and at 100 atm., it is about 6250° K (10,790° F.). The increased pressure with increasing temperature is necessary to assure that the metal oxides do not dissociate or vaporize. The extremely high gas temperature is further augmented by the direct heat transfer from the metal oxide droplets to the MHD alkali metal seeded gas, which would be nitrogen and optionally augmented by dry air with atmospheric water droplets and vapor and $CO_2$ removed, for terrestrial transport. The high resulting gas temperature results in very high equilibrium electrical conductivity. This enables high power extraction in a linear Faraday MHD generator, whose output is used to accelerate the ionized seed gas in nitrogen. But that is not the end because the gas exhaust from the MHD accelerator still has substantial energy that provides additional thrust as it expands to one atmosphere on Earth. So in effect almost the entire energy from the metal combustion is transferred to the gas and used for thrust. It should be noted that the gas dynamic thrust begins from the stagnation pressure and it is included in calculating the total thrust. Alternatively, in the case of terrestrial transport where exhaust of even negligible potentially radioactive materials is prohibited, the MHD generator would drive DC motors that drive pumps for water propulsion jets or drive advanced propellers. However, it is unlikely that the latter two methods can deliver sufficient thrust to drive large 10,000+ ton mono hull ships to the range of 100 knots.

Alternatively, for some propulsion applications on water, land, and air, the entire MHD system is eliminated, and the pressurized gas exiting the metal oxide combustor is thermally expanded in the subsonic nozzle and the supersonic nozzle that exhausts into the air at exit pressures somewhat higher than the vehicle environment. Even this application does not preclude installing an MHD generator to process part of the heated gas for on-board electric power production.

Finally, the re-processing of the metal oxide is implemented with nuclear or fossil combustion with $CO_2$ sequestration, which makes this a zero emission process.

A critical factor is selecting metal fuels is their cost. The metal oxide reprocessing cost be it nuclear or coal derived oxide reduction is not prohibitive. However, when used for direct propulsion it is imperative that at least 90% of the metal oxide is recovered and not blown out with the exit nozzle. As disclosed herein this is accomplished by dividing the combustor into two sections with opposing swirl direction, which eliminates gas rotation at the combustor exit and recovers at least 90% of the metal oxide to prevent it from blowing out.

As disclosed in the present invention, heat from oxidizing metal fuel particles goes directly to the gas that provides the thrust to the transportation vehicle, be it a ship or a train, or a truck, or car, or airplane, or rocket. This is preferred to indirect thrust provided from a gas-cooled nuclear reactor through a solid heat transfer barrier to heat the propulsion gas. This preference depends on the mission in that nuclear would be preferred if the on board metal fuel needed for the mission exceeds the weight of the nuclear reactor system.

That direct energy transfer from the heat source to the propulsion gas is preferable is now universally recognized by the use of the much higher speed jet engine, which has totally displaced the lower speed propeller driven airplane, where the propeller is an intermediate step in the propulsion process.

This distinction between direct thrust and propeller thrust was not recognized in the early 1940s. The US Air Force did not have a jet engine development program, and it was only in 1942 that the US Air Force brought a jet engine from the UK, and it came too late for military use in the War. The German Air Force introduced combat jet fighters, but too late to affect the outcome. Had they or the British entered the War with a jet fighter, the outcome might have been different. Direct transfer of heat to thrust was used since the dawn of civilization by sails on ships. This was abandoned in the mid $19^{th}$ Century when it was recognized that steam power operates continuously while the wind does not, in time or direction. This wind continuity issue has apparently escaped the promoters of wind electric power production.

However, the above explanation on jet versus propeller driven airplane in the $21^{st}$ Century must be qualified due to the much high current cost of oil that is at least 30% or more of total operating costs of airlines. A study in 1945 by two engineers at the Westinghouse Jet Engine Division compared the power and fuel use for a single engine aircraft propeller powered by a reciprocating piston engine and a jet engine at speeds from 1 to 600 MPH (see FIG. 7). Up to near 400 MPH the fuel consumption of the piston was 33% less than the jet. Now since a good part of short distance flights spend a considerable time taxiing and circling the airports for distances of about 400 miles that would take only 1 hour, it makes no sense to expend huge fuel charges to get to the destination at 600 MPH and then waste jet fuels circling. Presumably no one makes large piston engine planes and the old DC-7s and friends no longer exist. The point of this for this invention is that it teaches to fit the mission to the power source, and not the reverse. This is the reason for metal fuel transport with no intermediate steps, such as engines, in this invention. Apparently, several airplane manufacturers have discovered FIG. 7 because they are now offering propeller driven planes for use for short distanced, about 500 or so miles.

In contrast, underwater propellers limit the speed of large ships. Therefore, the current prior art solution to high speed is to use water jets. Their power comes from high combustion gas temperature, high pressure, and high rotational speed gas turbines, whose blades must be cooled. They connect directly to high-speed motors. Therefore, they are connected to costly rotational speed reduction gears that drive low speed pumps that drive the water jets. At each step of this multi-step process, energy is lost, beginning with the gas turbine blades that must be substantially cooled below fossil fuel combustion temperature and that lose additional energy as the gas direction repeatedly changes inside each turbine blade.

As for nuclear-powered ships, the BWR/PWR reactors are thermodynamically inefficient, as per Carnot's Second Law of Thermodynamics, and they are extremely costly, and too bulky for powering high-speed ships. As a result they have been limited to aircraft carriers and submarines. The use of nuclear power for cruisers was discontinued soon after introduction in the 1960s. On the other hand, one option that is disclosed herein is the use of gas cooled pebble bed nuclear reactors connected to closed cycle MHD generators that drive conventional motor driven propellers, or motor driven water jets for ship propulsion where speed is not the primary selection criterion, such as naval ships that remain on station at sea for long durations. However, nuclear will not approach the speeds that are attainable with much higher temperature metal fuels. Also, the cost dealing with radioactive materials will be very much higher.

Therefore, it is disclosed herein that the development of nuclear power MHD should be implemented concurrently with metal fuel power and natural gas or coal derived gas power MHD. However, based on the history of nuclear power in the US, nuclear power MHD will face much better market acceptance once metal or gas fired MHD is accepted by the market, especially since its primary market is continuous nuclear MHD power for consumer uses and industry. The above was written prior to the Japanese nuclear power disaster. Therefore, there is even more motivation to proceed with the metal or gas fired MHD before nuclear reactors.

In conclusion, the one of many key innovations disclosed in this invention is propulsion of large mono hull ships at 100 knots.

The invention is related to the efficiency by which the heat energy, either nuclear or metal fuel, is converted to the propulsion of a ship. However, in ship propulsion this efficiency is not directly reported. Ship Horse Power, (shp) as shown in FIGS. 3, 4, 5, 6, and 8 relates the speed of a ship to the power delivered to the propeller shaft, shp. Since horsepower, hp, is convertible to the rate of energy use, namely, kW or Btu, one may erroneously assume that this is a measure of energy use efficiency. However, the rate of oil consumption is not listed. Instead the oil storage capacity, which cannot be directly connected to efficiency, is listed. Therefore, it was arbitrarily assumed that the oil use efficiency to the propeller power to be 50%. As described in the Detailed Description below, the specification for the SS United States listed total oil use, shp, and average ship speeds. This yielded the oil use to shp was only 30%. This is in the range of Rankine cycle efficiency. In contrast, metal fuels directly transfers 80% of its energy to propulsion which can yield about 3 times the propulsion efficiency and makes this process as revolutionary as each of the great milestones in ship travel in the last 200 years. Additional discussion is in the Detailed Description.

BRIEF DESCRIPTION OF THE DRAWINGS

FIG. 2 Item (8) identifies the "Nuclear Pebble Bed Reactor" location that replaces the entire gas fired heat exchanger system with stationary pebbles that are embedded with nuclear materials (U235, U233) and operate the same MHD Brayton topping cycle and Rankine bottom cycle as in the gas fired case.

DETAILED DESCRIPTION

The following details the specific applications of MHD power and propulsion using metal fuels and pebble bed nuclear reactors that are disclosed in this Application. The order of presentation is not meant to specify the preferred order that they should be developed or introduced into the market.

A unique feature of this invention is its high peak operating temperatures that ranges from 3000° K with nuclear reactors to 6000° K with renewable metal fuels that can be augmented with MHD power. MHD power operated at much higher temperatures than gas turbines that are limited to less than 3000° F. Both these Brayton cycles begin with the same gas compression power from ambient conditions. However, in the present Brayton cycles the gas compression power is a very small fraction (as little as 15%) of the power output from the nuclear reactors and metal fuels, compared to 40% to 50% compression power in natural gas fired turbines. This yields very high overall propulsion efficiencies, up to 80%, in an MHD Brayton power cycle with or without MHD accelerators attached to the exhaust. This contrast to less that 50% in the most advanced gas turbine cycles, based on Higher Heating Values (HHV). (Note that gas turbine efficiencies are generally quoted at percent of the Lower Heating Value (LHV) input because substantial energy in natural gas derives from water vapor product that is lost in the gas exhaust and HHV is not counted in cycle efficiency in order to yield a higher value.) The present heat sources result in very compact and low capital costs power plants and propulsion systems due to the very high power densities that are in the 1000s of Megawatt electric (MWe) range.

Figure 1:
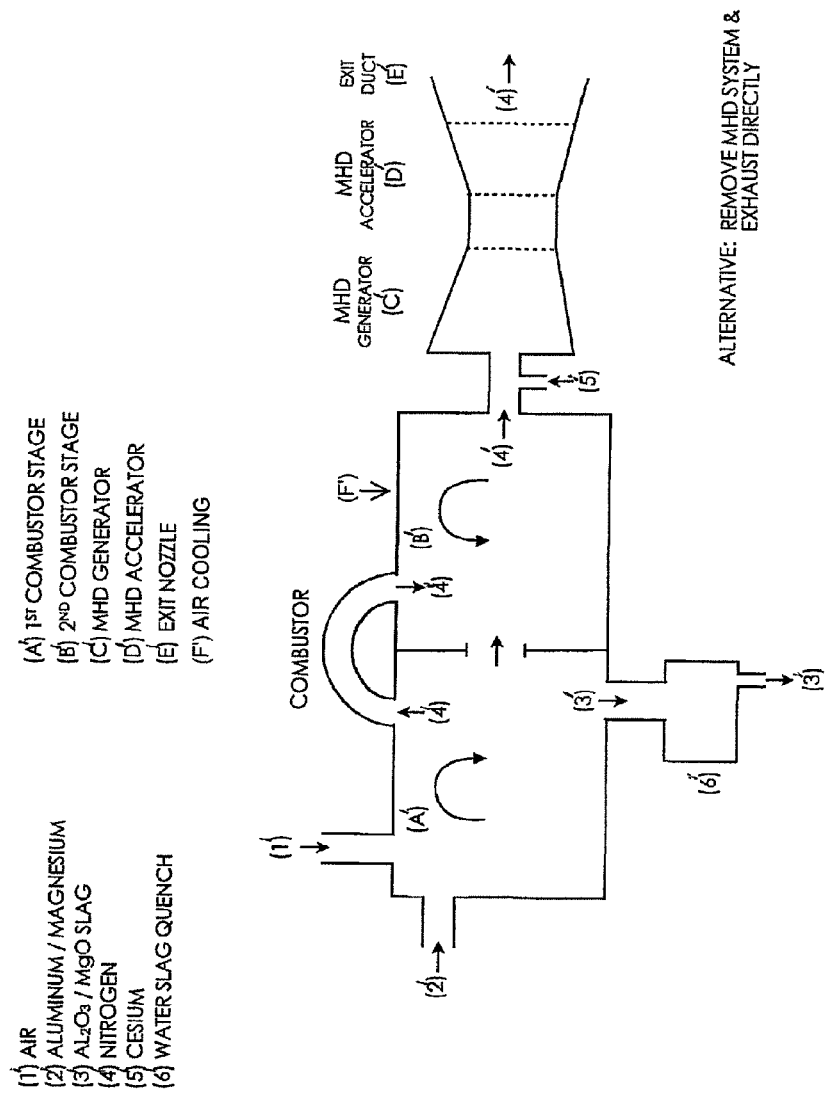
FIG. 1 is a schematic drawing of a terrestrial, cyclone, slagging metal fuel combustor fired with metals such as aluminum, magnesium, zirconium in air to form metal oxide droplets that heat nitrogen and excess air from 3000° K to 6000° K peak gas temperatures while the droplets impact the liquid oxide slag covered wall of the combustor thereby removing about 90% to 95% of the droplets, after which said slag drains and is quenched in a slag tank, while the heated gas flows through a subsonic-supersonic nozzle into an MHD generator and MHD accelerator and exhausts to the atmosphere, or the MHD system can be removed and the hot gas exhausts to the atmosphere.

For terrestrial propulsion, such as large, above 10,000 tons monohull ships, the metal particles react with the oxygen in the air that burns in a slagging, cyclone combustors to form liquid metal oxide droplets that heat the nitrogen and excess oxygen in air to said gas temperatures and exhaust in a supersonic nozzle that propels a vehicle, such as a ship at several times higher speeds than current state of the art propulsion. The centrifugal force from the swirling air in the combustor drives the metal oxide droplets into a slag layer that lines the inner cylindrical combustor wall, from which the liquid slag is drained, quenched, and removed for off-site reprocessing with zero emission heat sources, including coal, oil, or natural gas, or nuclear, to return into a metal (FIG. 1).

Figure 2:
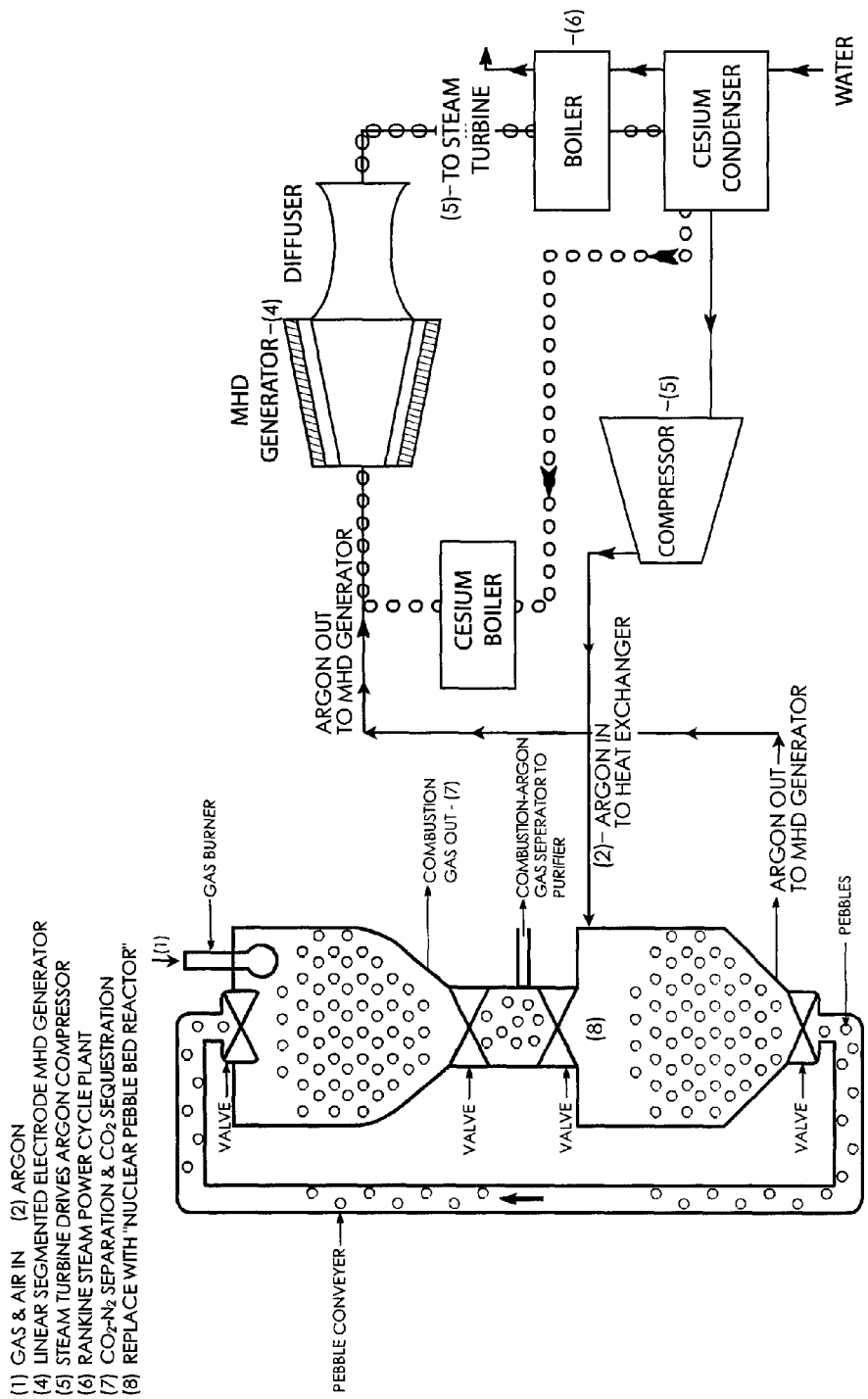
FIG. 2 is a schematic drawing of a closed cycle, Brayton MHD power cycle, that is fired with coal gas, or natural gas flows in the top of the top half of an hour glass, falling pebble bed heat exchanger where the pebbles are heated to 2000° K to 3000° K, as they fall to the bottom of the top half, and fall through a transition cylinder where the combustion products are evacuated, before passing through the lower half of the bed to heats argon, or helium, to said temperatures, and after exiting 0.1% to 1% cesium or potassium is injected into the gas before passing through a nozzle that connects an MHD generator, at whose exit the gas slows to near stationary prior to cooling to ambient in a shell and tube steam boiler whose steam powers a steam turbine connected to the MHD Brayton cycle gas compressors, and at boiler gas outlet at ambient temperature the cesium is recovered, and the gas flow through a $CO_2$ separation-sequestration where the nitrogen is rejected into the atmosphere.

Alternatively, the metal fuel heated nitrogen at the combustor exhaust can be seeded with an alkali metal, preferably cesium, to render it thermally electrically conducting. This gas expands in a nozzle that is co-axially attached to a linear Faraday MHD generator-accelerator where its thermal electrical conductivity is augmented to non-equilibrium conductivity by its induced electromagnetic field. If only MHD power generation is desired, the MHD accelerator is replaced with a diffuser that can exhausts into a metal, shell and tube heat exchanger in a Rankine steam bottom cycle, whose steam output can drive the Brayton MHD cycle gas compressor (FIG. 2). For propulsion use, the gas exiting the MHD generator exhaust flows into an attached co-axial MHD accelerator, which would shares the magnet with the MHD generator.

Alternatively for propulsion only, both the MHD generator and accelerator are removed, and the ship propulsion thrust is supplied by expansion of the heated gas from the combustor in a subsonic-supersonic nozzle followed by exhaust into the atmosphere. In this case, the heat to thrust conversion efficiency could also reach 80%. By comparison the heat to thrust efficiency in a steam turbine power plant is only about 30%. Even a gas turbine driven air, water, ground, propelled vehicles can at best yield a heat to thrust conversion efficiency of 50%. On the other hand, metal fuel powered thrust with 8% conversion efficiency could drive 10,000s ton displacement ships to 100 knots or more. This would meet a 1970 Navy goal of large 100 know ships by Admiral Elmo Zumwalt during his tour as Chief of Naval Operations.

This could be achieved by renewable, zero emission metal fuels that would make the U.S.A. Navy fleet energy independent from foreign oil.

For defense applications on land, sea or air, the metal fuels heat source can also serve as a source of electric power for use in a pulsed power system in directed weapons in addition to power and propulsion use.

In addition to powering transportation systems with metal fuels, these fuels would also provide the data base for use in closed cycle MHD power plants operating at high temperatures in gas cooled nuclear reactors for stationary land based power or for transportation power.

In summary, the methods and processes disclosed herein with nuclear or metal fuel heat sources operating with MHD power systems open unique multiple commercial and military uses that are not attainable with any current state of the art energy technology.

The relevance to the present Application is that the MHD power is based on extensive research, and not speculation. Although the critical metal fuel combustion aspects are not even hinted at in said MHD work.

(A) Nuclear Powered Closed Cycle MHD for Terrestrial Applications

Central Station Power:

One major application of nuclear MHD power would be to central station power. FIG. 2 is a schematic of a gas fired MHD power plants wherein the combustion energy is transferred to the MHD power generation gas, such as argon, through a falling pebble bed heat exchanger where the top half is heated by the gas, whose combustion product are removed and the $CO_2$ is separated from water vapor and nitrogen products prior to in-ground $CO_2$ sequestration. The pebbles heat the MHD gas, argon or helium in the bottom half of the heat exchanger. Now for a nuclear power, the bottom half of the pebble bed contains stationary pebbles embedded with nuclear fissionable materials. The top half of the heat exchanger does not exists. However, the combustion phase of this MHD power plant provides design, fabrication, and operational guidance for the nuclear MHD plant. This plant would be very much more compact and far less costly than a PWR/BWR, whose nuclear reactor core alone, inside the containment building, of a BWR of the 1970s rated at 1000 MWe is 21 ft ID×73 ft H, equal to 25,303 cu. ft. Most are still in use such as the six reactors severely damaged and destroyed in the March 2011 earthquake and tsunami in Japan. It is also by now apparent that the huge size of those reactors and their low temperature and low efficiency and massive water cooling needs were an important, if not key factor in the disaster to-date.

The initial intent of this invention for a nuclear MHD reactor volume was to base it on the heat transfer coefficient from refractory pebbles to argon, as was disclosed in this Inventors Provisional Patent Application No. 61/418,977 filed Dec. 2, 2010, for coal gas or natural gas fired MHD packed pebble bed power plants. However, in light of the destruction of the Japanese reactors by being forced to cool them with seawater, and discharging radioactive water into the Ocean to prevent them from overheating once cooling water was lost, it is clear that the first priority in nuclear power should be a reactor core as small as possible. Furthermore, it is essential to eliminate the need for massive water-cooling pools for spent nuclear fuel rods, which are radioactive, release substantial heat, and are stored next to the plant for lack of acceptable permanent storage, as Yucca Mountain will apparently not be used.

Therefore, it is disclosed herein to cool the reactor core with helium because its heat transfer rate would be about 8 times greater than argon. This should reduce the reactor volume by the same factor of 8. For the same pressure ratio, argon and helium should require the same compression power. However, since helium would have one-tenth the density it would require a 10 times greater volume compressor. This was one reason why argon was preferred for MHD. Another was to use the higher electric conductivity of argon seeded with cesium, (see below). However, the larger compressors can be reduced with higher gas pressures. Also, using high peak temperatures in a Brayton cycle increases the MHD power output, and greatly reduces the ratio of compressor power to the turbine (in this case MHD generator) power. This requires the use of high temperature refractory materials. With the inert noble gases, He, Ar, etc., refractory metal oxides such as MgO, and $ThO_2$, can be used to 3000° K (5400° R.). Graphite, which is also a neutron moderator, could also be used to these temperatures, as was the case in the NERVA test rockets. With noble gases, the hydrogen-graphite reaction would not be an issue. Also, the same gas would be in direct contact with the reactor core and the MHD generator, which reduces thermal losses. At these high gas temperatures, the equilibrium conductivity when seeded with cesium would be in the 100s Mhos/m range, meaning non-equilibrium MHD power would not be required, but it would still be available as the gas expands and cools in the MHD generator.

It is again emphasized that the cesium will not be in contact with the reactor core, as it will be injected into the gas, i.e. helium, downstream of the reactor gas outlet and condensed and removed upstream of the compressor (See FIG. 2). Therefore, the concern from radioactive cesium will be removed. Nevertheless, potassium can be used as an alternate seed.

The present nuclear MHD reactor size can be derived from the coal fired, cesium seeded argon, Closed Cycle 2000 MW (thermal) ECAS Case 102 (cited extensively in U.S. Provisional Application No: 61/418,977, dated Dec. 2, 2010, which by reference is incorporated herein in its entirety). Said Application (now published as US Publication No. 2012/0137877, Jun. 7, 2012) detailed how the 10 massive, coal fired, cored brick heat exchangers in ECAS 102 could be converted to a single falling pebble bed heat exchanger with the pebbles in the top half heated by clean gas and the pebble bed in the bottom half of the hour glass heat exchanger transferring heat to the pressurized argon that flows to the MHD generator (See FIG. 3 in '7877). In the present invention only the bottom half is needed with stationary pebbles containing nuclear material (See FIG. 2).

Nuclear power has no stack gas heat losses, nor cycled heat exchanger losses, nor combustion and argon purge losses, nor complex combustion gas to noble gas switching issues. Without stack losses from emission of combustion gases, the nuclear MHD cycle should achieve close to the thermodynamic Brayton cycle efficiency, which for Case 102 conditions was 56.1%. This increases the output to 1,122 MWe from 948 MWe in the ECAS combustion case. With nuclear heat only the 10-atmosphere argon half of the stationary natural gas fired pebble bed to noble gas heat exchanger will be needed. Since the pebbles do not move, the 17,600 $ft^3$ for the one half of the moving pebble bed could now have a L/D of 1, resulting in a 28.09 feet diameter, stationary nuclear pebble bed core that is 28.09 ft. high. Note that this total core value is derived for argon and with the heat exchanger specifications given in said Application.

However, especially in light of the March 2011 BWR nuclear reactor disaster in Japan, the use of argon for the terrestrial nuclear MHD generator should be replaced with helium. The reason is that the huge size of the BWR/PWR reactors requires massive dimensions, as listed above. This makes extinguishing the BWR.PWR reactors in case of coolant failure extremely difficult without radiation loses, as experienced in Japan. Also in connection with their emergency shutdown, their large capacity and very low efficiency generates large radioactive wastes, which are currently being stored next to the reactors, and with considerable lower strength containment vessels, as evidence by the cooling failures at several of the waste ponds in the Japanese March 2011 earthquake disaster. This is another reason for shifting to the disclosed nuclear powered MHD generator, with helium cooling of the reactor and as power gas.

In the 1970s one reason for using argon was to reduce the compressor size, compared to helium by up to 10 times. The second reason was the very low electron-argon elastic collision cross-section, which is 13 times smaller than with helium at a typical 4000° K electron temperature. However, the higher helium collision frequency versus argon is readily offset by increasing the gas and electron temperatures to 3000° K from the 2000° K in the ECAS study, which was limited by coal combustion products on the ceramic in the heat exchangers.

For nuclear use, the nominal 2-inch diameter pebbles will have refractory coated surfaces with 1000s of tiny nuclear material spheres inside, which are similar in size to those used in prior helium cooled nuclear pebble bed reactors. Cesium seed will be injected downstream of the reactor hot gas outlet and condensed upstream of the compressor inlet at under 100° F. This will eliminate any risk of cesium coming in contact with nuclear material (See FIG. 2). Should this not eliminate formation of radioactive cesium then a total particle filter will be needed upstream of the compressor.

Incredibly, the need to eliminate the risk of producing radioactive cesium was not mentioned in a US government final project report in 1990 by a team of private MHD experts that proposed using a NERVA type hydrogen gas cooled nuclear reactor in a pulsed, disc type MHD generator in which cesium was injected into hydrogen prior to entry into the nuclear reactor.

In connection with said study, it should be noted that said MHD experts focused on the disc generator due to their questionable interpretation of plasma non-uniformities data in linear non-equilibrium generators. This inventor repeatedly submitted results that these instabilities did not significantly impact MHD power. Also, the disc geometry is more susceptible to striations than the linear generator. But most important, the disc generator is not the geometry to use for MHD acceleration.

To estimate the nuclear aspects of the CC-MHD generator, reference is made to the Pebble Bed Modular Reactor (PBMR) whose development by Eskom in South Africa ceased in 2010 presumably due to high cost. That reactor followed the decades old technology developed in Germany from whom it was purchased. The German pebbles consisted of spheres of 2.36 inches in diameter, with a thin 5 mm graphite shell and 400,000 fuel particles of $UO_2$—$Th_2$ inside. Helium at 566 psi was heated to 1382° F. Escom improved this design by increasing the peak temperature to 1832° F., with several outer spherical layers of graphite, pyrolitic carbide, silicon carbide, surrounding 12,000 one mm diameter particles per pebble. There were to be a total of 360,000 of 60 mm diameter pebbles, each one weighing 210 gm. They were apparently contained in a cylinder reactor core of 11.48 ft D.×32.8 ft H=3,400 ft$^3$. This results in a pebble weight of 75,000 kg (166,520 lb). Each pebble contains 2 gm of uranium, which for the 360,000 pebbles in one reactor weigh 720 kg. Eskom lists the total uranium in one fuel load at 2,500 kg. The difference is not explained.

In any case, the Eskom reactor was to be rated at 400 MW (thermal) and 160 MWe output for an efficiency of 41.25%, which is 29% higher than in nuclear BWR, but 74% of the 56.1% of a nuclear MHD power plant. As with the natural gas case, analysis begins with a peak argon (or helium) temperature for a nuclear, non-equilibrium MHD generator also at 3100° F., the nuclear pebbles design will differ substantially. While carbon and graphite may be retained, ceramics and boron nitrides are preferred. The one major advantage of the present invention is that much of the performance of ceramic pebbles will be determined in actual fossil fuel power plant operation with pressurized particulate free gas MHD operation with fossil gas fuel, as disclosed in Provisional Application No. 61/418,977, also US Publication No. 2012/0137877, Jun. 7, 2012, the contents of which are incorporated by reference in their entirety herein.

Comparison as to how the nuclear MHD pebble bed reactor will function is at present very qualitative because all the operating parameters of the PBMR are not known. The appropriate design for the nuclear pebbles for MHD are as yet not been determined, except that materials suitable for the high MHD temperatures have a very extensive prior data base.

The PBMR was to operate at about 1500° F. to 1600° F., with helium at 60 atm. Nuclear MHD can run with either helium or argon, at 10 to about 20 atm. at 3000° F., and preferably up to 2777° K (4,540° F.) and possibly up to 60 atm as in the NERVA reactor, although it only operated as a multi-minute blowdown. The heat transfer from the pebbles to the gas will be substantially greater than in the PBMR with helium even at lower pressure due to the much greater temperatures. This means that the temperature difference between the pebbles and the gas was much less because the total gas temperature range was only from 1173° K out of the reactor to 823° K out of the gas turbine. In the nuclear MHD case the range could be as much as from 2777° K out of the reactor to 500° K out of the MHD generator. This means that the latter pebble bed can operate at a substantially higher pebble to gas temperature differential without significantly degrading performance, which substantially reduces the reactor core.

Using the PBMR results and the gas heated-argon pebble bed results, and assuming that the 166,520 lb pebble weight was correctly interpreted for the 400 MWt PBMR, the weight of 2,000 MWt MHD pebbles would be 1,936,000 lb, and it would be 387,200 lb at 400 MWt. The PBMR had 360,000 pebbles at 400 MWt, while MHD would have 4 million pebbles at 2000 MWt, and 800,000 pebbles at 400 MWt. Each pebble weighs 210 gm for the PBMR, and 219 gm for MHD, and the diameters are 60 mm for PBMR and 50.8 mm for MHD, 28.3% less surface area. This indicates qualitatively that the MHD pebble bed is in the size range of the PBMR. As stated above, at 400 MW thermal, the nuclear material is only 1.4% of the pebble weight, which is not surprising because nuclear energy is extremely concentrated, while heat transfer from solid to gas is relatively very poor.

Since the use of helium is now preferred in order to minimize the reactor size in light of the Japanese reactors, a packed bed heat transfer analysis should be implemented. There exists considerable test data for this going back well over 50 years. However, this inventor has no access to nuclear pebble behavior beyond the vague PBMR. Thus in view of the lack of data at this time, the helium film coefficient versus for argon will provide a rough estimate of core size. In analyzing the argon case in Provisional 61/418,977, also US 2012/0137877, its average film heat transfer coefficient used was 8.12 Btu/hr/ft$^2$. Therefore, for helium the number is 8 times that at 64.96 Btu/hr/ft$^2$. Each 2-inch pebble area is 0.0872 ft$^2$, with a volume of 0.00242 ft$^3$. So for 2000 MWt, the 4 million pebbles for argon become 500,000 for helium, and with a void fraction of 45%, the core volume would be only 2,200 ft$^3$, versus 17,500 ft$^3$ for argon, and the reactor dimensions would be 14 ft D×14 ft H. for 1122 MWe MHD.

As noted above, this compares with a 1000 MWe BWR/PWR reactor core of 21 ft D×73 ft H, and 25,303 cu. ft. core, which is 11.5 times larger. Therefore, the nuclear MHD generator could be placed anywhere far from population centers and deep underground, and of course they would also serve as prototypes for terrestrial and space transportation.

These heat transfer coefficients are for convective heat transfer. At these high temperatures radiation and conduction should also be considered. Also, the estimated gas temperature increase is 2410° F. for both gases in this sample calculation that is based on a 3100° F. gas outlet. Operating the reactor at 4500° F. would reduce the cooling gas flow substantially more. The optimum size will be determined by whether the nuclear reaction can keep up with this high rate of heat transfer, a solution that can be determined by nuclear reactor experts. A somewhat larger core is still compact compared to the BWR/PWR volume of 25,303 cu. ft.

In any case, these calculations show that this nuclear power can be extracted from very compact gas cooled nuclear reactors provided the energy could be converted efficiently to electricity. This is not the case with the massive PWR/BWR nuclear reactors, which are inefficient and produce hazardous radioactive waste that currently remains on site. It is also not the case in the low temperature gas cooled reactors.

The Japanese reactor failure has revealed that the US Nuclear Regulatory Commission (NRC) has studied the consequences of long duration power loss and determined that in certain US reactors a power loss of as little as one day could lead to radioactive release and core melting. Batteries can last less than one day. None of the reactors could survive partial or total core melting from loss of power of more than 3 days. Then there is the issue of on-site waste storage, which has reached 71,864 tons from the 104 US reactors. All this risk is due to the massive size of these low temperature reactors. This is not the case in the present invention.

In addition to their extremely compact size, their very high temperature results in increasing heat loss by radiation to the $4^{th}$ power of temperature if cooling of the reactor stopped and it continued to heat-up. Radiation is governed by the Stefan-Boltzmann (S-F) equation, with Qr-heat radiated in Btu/hr-ft$^2$=$\epsilon$*$\sigma$*$T^4$, where T is gas temperature in degrees Rankine, $\sigma$ is the S-F constant $0.1713*10^{-8}$, in Btu/[hr–$T^4$–ft$^2$), and $\epsilon$ is the dimensionless emissivity equal to 1 for a black body. For example, 3000° K nuclear reactor core would be placed in a cylinder and floor and roof of at least 1.5 ft thick refractory cylinder, roof and floor, with an outside surface of 1360 ft$^2$. Now using a $\epsilon$ of 0.9, the radiation would be 1.2 MMBtu/ft$^2$/h, equal to 1632 MMBtu/hr if the entire ceramic vessel reached operating temperature in case of gas coolant failure. Now the reactor's 1000 MWe at 56% efficiency would yield 6826 MMBtu/hr). So the radiation heat loss would be 24% per hour if un-cooled of full load. The core and 1.5 ft thick container vessel assuming of MgO would be 2,891 ft$^3$, weight 132,278 lb, at 108 lb/ft$^3$. Now at 3000° K (~4960° F.), the heat content of this reactor pile of MgO would be 309 MMBtu. Therefore, it appears that it would cool down almost immediately. This is just an estimated design to show how very high temperature reactor powering an MHD generator should not result in overheating from a reactor failure. Furthermore, all this would be tested with gas fired moving pebble bed heat exchanger-MHD, followed by metal oxide high temperature MHD generator operation before any radioactive material enters the picture.

A key lesson from the above is that heat transfer is the primary criterion on the design of both fossil fuel, metal fuel, and the nuclear closed cycle power systems. This inventor selected the pebble bed over the cored brick heat exchanger because when using clean, particulate free gases as the medium for transmitting energy from a prime heat source, be it a fossil fuel or a metal fuel, or a nuclear source, pebble beds are much more compact than cored bricks. The two-inch diameter sphere was selected because there is heat transfer data on that size from nuclear tests. However, the present analysis is based on heat transfer data from cored bricks with clean and particulate laden fossil fuels, and the results are in general agreement with the nuclear heat transfer data. However, this Inventor does not know the source of discrepancy from the latter data because all the details are not disclosed. Furthermore, the fact that the helium cooled nuclear system was finally abandoned after a decade of intense R&D shows there was something wrong there. While high cost was given as the reason, the high cost could have been due to the many participants in the project, a failing that permeates US energy R&D, especially when all DOE proposals are selected on "technical" merit, yet 50% of the score is given for personnel and project organization. If organization were so important, one could question as to why none of the organizational behemoths of years, decades, and centuries past, are leaders in the current new technologies, with the Internet being the latest example. Therefore, this inventor cannot explain the failings of nuclear closed power cycles, especially the water-cooled designs. However, the present invention is unique in that it would be commercially successful with fossil fuel and metal fuel heat sources, and the profits thereof could finance the nuclear option.

An important lesson from the PBMR to MHD is the required amount of nuclear fuel and nuclear waste produced. As noted above, the difference between the stated amounts of nuclear fuel of 2,500 kg and the 720 kg computed from the stated 2 gm of uranium for each of the 360,000 pebbles is not known. Assuming the 2,500 kg is correct, the 2000 MW thermal MHD reactor would require 5 times the PBMR amount, namely 12,500 kg (27,533 lb).

As to nuclear waste, the 165 MWe, 41.25% efficient PBMR would produce 32 metric tons of waste per year, of which 1 MT is uranium, equal to 3.13% of the total waste. This translates for the 56.1% efficient 1120 MWe MHD plant to 108.6 MT, or 217,000 lb, of waste, which is 11.2% of the 1,936,000 lb total weight of the pebbles. The uranium in the waste is 3.39 tons, or 6,720 lb/year. That is only 0.35% of the total pebble weight. It should be simple to continuously remove a few pebbles from the bottom of the bed for processing or disposal piecemeal because they contain no liquid radioactive waste, which is a major advantage of gas-cooled nuclear reactors, over water reactors.

To demonstrate the critical role played by heat transfer in designing a gas power system, the following example of a gas power system where understanding or explanation of heat transfer appears to be missing. It concerns a supposedly "new" technology called "Small Modular Reactors" having various names such as "Traveling Wave Reactor" (TWR). On the surface it appears to be just another version of recycling waste fuel from nuclear reactors. TWR is powered by spent BWR/PWR nuclear power reactor waste, of which there are supposedly 71,864 metric tons from U.S. nuclear power plants that cannot currently find a permanent home. TWR is supposed to operate without maintenance for decades, even up to one 100 years, in tiny units of undisclosed size. TWR's promotional information is misrepresented. For example, TWR's literature states "an 8 metric ton reactor could generate 25 million megawatt hours of electricity-enough to power 2.5 million households for one year". This statement is grossly misleading because it creates the impression that this would occur in one year of 8760 hours. If so, the TWR plant output would be 2,854 MW for every hour. This would make it one of the biggest power plants in the World, yet the power comes out of a tiny little 8-metric ton canister. It almost certainly must mean an unspecified multi-year operating period. Even over 100 years that would generate 28.54 MW per hour, which still could not emanate from this tiny canister. Therefore, the feasibility of this entire concept depends on the heat transfer through the surface area of this canister. Since it contains an unspecified amount of uranium, which is very dense at 20 gm/cc, or if it is uranium carbide at about 11 gm/cc it would equal 686 lb/ft$^3$. This canister as a sphere would have 25.64 cu. ft. volume and a surface area of 42.06 sq. ft. Assuming the same efficiency for TWR of 41.5% as for the PBMR 165 MWe plant, to produce the 25 million MWH cited in the Company brochure, would require a heat output of 60 million MWH, which equals $2.07 \times 10^{14}$ Btu. Now assuming a surface film coefficient of 1000 Btu/hr/ft$^2$/° F., which can cross a metal-water boundary and a temperature differential of 1000° F. and the 42. ft$^2$ surface area, the result would be that it would take 562 years to transfer the 25 million MWH out of the 8 tons of nuclear waste.

This calculation is cited as an example of the massive misrepresentation that permeates the US energy picture. The Universe is overflowing with energy that will last tens of billions of years, but the trick is getting it down here. The PBMR requires only 1650 lbs of U235 to generate 165 MWe in one year, yet the U235 must be distributed throughout 166,500 lbs of non-nuclear 60 cm diameter spheres to transfer that heat to the low molecular weight, high heat transfer medium helium at 60 atmospheres pressure.

All energy technology must follow these basic laws of thermodynamics and heat transfer. "Renewable" wind and solar power advocates do not advertise that these massively subsidized power plants take up massive amounts of the land area, that only a very small fraction of the U.S. land area in the very low populated Plains States is suitable for wind, that they only operate at full load for a small fraction of the year, (about 25%), and that "dirty" coal or expensive "clean" gas must operate the rest of the time, and that these renewable costs are several times greater than coal or gas power. As a result of the lack of low cost power, manufacturing and metals industries have relocated out of the USA, taking jobs and revenue with them to Asia.

A core element of the Closed Cycle MHD generator is the enhanced electrical conductivity of the alkali metal (preferably cesium) that is achieved by Faraday's Law of Electromagnetic Induction that elevates the electron temperature above the gas temperature to achieve ionization at the electron temperature, which in turn increases the electrical conductivity. To prevent lowering the electron temperature, noble gases, argon, neon, or helium are used because molecular gases lower the electron temperature enough to prevent non-equilibrium ionization. The elevated electron theory is discussed below. This was an extremely difficult goal to achieve, and almost all of the worldwide research facilities failed to achieve this goal in the 1960s. This inventor's claim that this failure was a result of high electrode voltage loses in MHD channels that were too small, was not accepted. Finally, in the mid-1970s after over a decade of experimental testing in shock tubes and shock tunnels, this Inventor's R&D Group demonstrated the over 20% enthalpy extraction at 2000° K with non-equilibrium ionization electric conductivity in cesium seeded, neon or argon. This is the minimum enthalpy extraction necessary to achieve a commercially viable MHD Brayton gas cycle. Using these data, the Inventors MHD Group in the early 1970s developed the Closed Cycle 1000 MW MHD power plant as in Case 102 in the ECAS Study.

Some Advantages of Nuclear MHD Power:

A closed cycle, non-equilibrium electric conductivity, MHD power plant is very compact. At 2000° K and 10 atmosphere stagnation, a nuclear 1,120 MWe MHD generator based on the ECAS Case 102 specifications is only 31 feet long, and it exhausts into a 65 feet long diffuser, for a combined length of only 96 feet. So even with the compressor power, this very large power output has a very small footprint.

MHD's high efficiency of 56% is 175% higher than the nuclear Boiling Water Reactor (BWR) and the Pressurized Water Reactor (PWR). It is also 36% more efficient that the nuclear pebble bed (PBMR) power plant's 41.25%. Nuclear MHD remains equally efficient over the entire power range from 100 MWe to 1000 MWe.

In contrast, the PWR/BWR require 1000+MWe for economic operation. Their cost is above $5000/KW and requires multibillions government loan guarantees and multibillions accident insurance coverage from the government, namely the taxpayer.

Nuclear PBMR is efficient at small power sizes, 165 MWe, and it also uses a pebble bed design. However, the selection of this small size and the need to modularize the plants at this size, (as designated in the "M" letter), is not explained. On the other hand, the MHD generator is equally economic over the entire power range from 100 MWe to over 1000 MWe. Also, if for some reason the nuclear reactor must be modularized, the MHD generator need not be, which in view of the costly super conducting magnet and DC to AC conversion is a major cost saving.

Disposal of waste nuclear fuel would also not be a significant problem with MHD because the nuclear containing pebbles would be removed individually at the bottom of the reactor, processed, and re-inserted at the top. Compact size is also the big attraction of gas turbine, nuclear reactors. However, the peak temperatures in the later are about one-half of MHD, which lowers their efficiency, as it does in the even lower temperature PWR/BWR. Consequently they produce massive amounts of waste heat that require large rivers or huge cooling towers. The March 2011 disaster at the earthquake tsunami damaged nuclear power plants in Japan, which shows the disadvantages of massive inefficient nuclear power plants.

Also, it is disclosed herein that with cooling of the turbine blades it might be possible to use gas turbines with the present pebble bed nuclear reactor, although at lower peak temperatures but higher efficiencies and lower cost than in the nuclear PBMR. The one limiting factor would be the possibility that abrasion by particles being carried over from the pebbles into the gas turbine could erode their blades, and also possibly transfer radioactive materials out of the reactor. This might require an isolating metal heat exchanger whose low temperature would eliminate any benefit from the high temperature, pebble bed reactor. Abrasion should not be a significant problem in an MHD channel because only the channel walls are exposed to particles and the boundary layer offers some protection. Also the compact size of the MHD generator would enable modest size enclosures to prevent radiation leakage.

It is also probable that the reactor and MHD generator and in fact the entire power plant could be located deep underground. Recently a power equipment manufacturer proposed 12 underground nuclear reactors, each with 1000 MWe capacity for a total 12,000 MWe of PWR/BWR water/steam nuclear reactors. They would be placed only several 100 feet underground, which means that any leak of radioactive material for whatever reason, even an earthquake, ground shift, etc., would risk contaminating groundwater. Note that the Yucca Mountain nuclear storage is being held up out of concern of earthquakes 10,000 years from now. Also, leaving radioactive waste at the power plant sites, as at present, is unlikely to be approved after the plants are decommissioned. This is especially the case after the March 2011 Japanese reactor catastrophe.

In sharp contrast, there will be no need to store any significant amount of waste at a nuclear MHD plant because the nuclear content pebbles will be removed regularly in very small quantities for reprocessing, and that will be the only radioactive waste because there is no water anywhere near the reactor.

Also, these underground PWR/BWR nuclear plants would still need massive above ground cooling towers since their efficiency would be about one half that of the MHD plant. Also, the MHD cycle's heat rejection temperature is considerably higher so that compact heat rejection is achieved. Also, Closed Cycle MHD plants can cover the range from about 100 MW to over 1000 MW, with nuclear fuel. Another very important advantage of nuclear MHD is a much lower cost than underground PWR/BWR, which are being proposed at $4000/kW versus over $5000/kW above ground.

Thus in summary, nuclear closed cycle MHD power can provide continuous year round, low cost power to consumers and industry, as opposed to current nuclear power and renewable power that are very costly to the point of needing perpetual support from the taxpayers without the compensating benefit of cheap electric power that would create real jobs.

The above applies to land based terrestrial applications of nuclear MHD. There are other major applications of Closed Cycle MHD to Ocean ship propulsion, as disclosed next.

Nuclear MHD Power Ship Propulsion:

Note that the fuel to propulsion efficiency discussed near the end of Summary Section does not apply to nuclear propulsion because the nuclear fuel has multi-year use.

The same closed cycle nuclear MHD power can be applied to ship propulsion. In fact it could be easier to implement than conventional steam power due to the high energy density of Closed Cycle MHD. For example, the 91,400 ton nuclear aircraft carrier, Nimitz, is powered by a 208 MW steam power plant, mostly for propulsion at 35 knots, and the rest for onboard power.

A 9000-ton cruiser, such as the former nuclear Bainbridge, operated at 30 knots with only 40 MW, including onboard power.

The 50,900-ton liner SS United States with sustained top speed of 39 knots was powered by 240,000 hp (179-MW). (This ship was oil fired, and the present nuclear example is to show only its propulsion, not its efficiency, which is discussed below.) As explained in the next Section, terrestrial nuclear power MHD must be in a closed cycle in order to prevent escape of radioactive gases, liquids, or solids into the environment. Elimination of the risk of radioactive leaks is a major reason why ship propulsion with metal fuels is disclosed in this invention.

Application of MHD to nuclear ship power, the DC output of the MHD generator would be electrically connected to an electric motor driving screw propellers. It would seem that this mode of ship power is less efficient than direct steam turbine drive of ship propellers. However, this overlooks the overall efficiency of the power train. It also overlooks that the nominal 3600 rpm steam turbine needs large gear reducers to drive the ship propellers, or low revolution pumps for current advanced water jet propulsion. In the present invention, propellers are not recommended if high speed is desired because speed is limited by propeller cavitation.

Also, overlooked are that PWR/BWR reactors have only 57% of the efficiency of a pebble bed nuclear MHD power plant. Furthermore the power density of the MHD plant is substantially greater. For example, the CVAN 68-Nimitz displaces 91,400 tons, is 1089 ft. long, with a 133 ft. beam, and a 209 MWe power plant. Now a 1100 MW nuclear pebble bed MHD power plant has a pebble bed core of 28.1 ft. D, 28.1 ft. H, and a core weight of 968 tons, with refractory coated pebbles. As reported above, this reactor vessel is based on using argon. As shown above, the reactor would be far smaller with helium. The MHD generator and diffuser would only be 100 ft. long, 10% of the carrier's length. The 1100 MW MHD output is 550% greater than the Nimitz's 209 MWe. Assuming the general ship drag rule that speed is proportional to the cube power of speed, the Nimitz's 35 knots could increase to $(5.5)^{0.333}=1.77\times35=62$ knots. However, based on FIG. 3 in this Application, aircraft carriers intersect at 3 (i.e. 280,000 hp/91,400 tons) on the Y-axis and at 35 knots on the X axis. Now with MHD power at 1000 MW, or 5.5 times the 209 MW results in an ordinate of 15, and the abscissa of 62 knots lies well to the left of the feasible line. However, experience with other large mono hull ships show that mono hull ships hit a barrier at 40 knots. Therefore, the cube power-speed rule may not apply at speeds above about 40 knots. This is discussed further below. (See also FIGS. 4, 5, and 6.)

On the other hand, the cube power rule for increasing ship velocity has been roughly demonstrated in small High Speed Surface ships and in Bow Lifting High Speed Surface ships with mono-hulls and pods underneath the front of the ship. In one example, a 22.35 tons ship doubled its speed from 15 to 30 knots with an increase of power from 200 kW by a factor of 6 to 1200 kW. There are other factors, such as drag, that limit large ships to below 40 knots.

Figure 5:
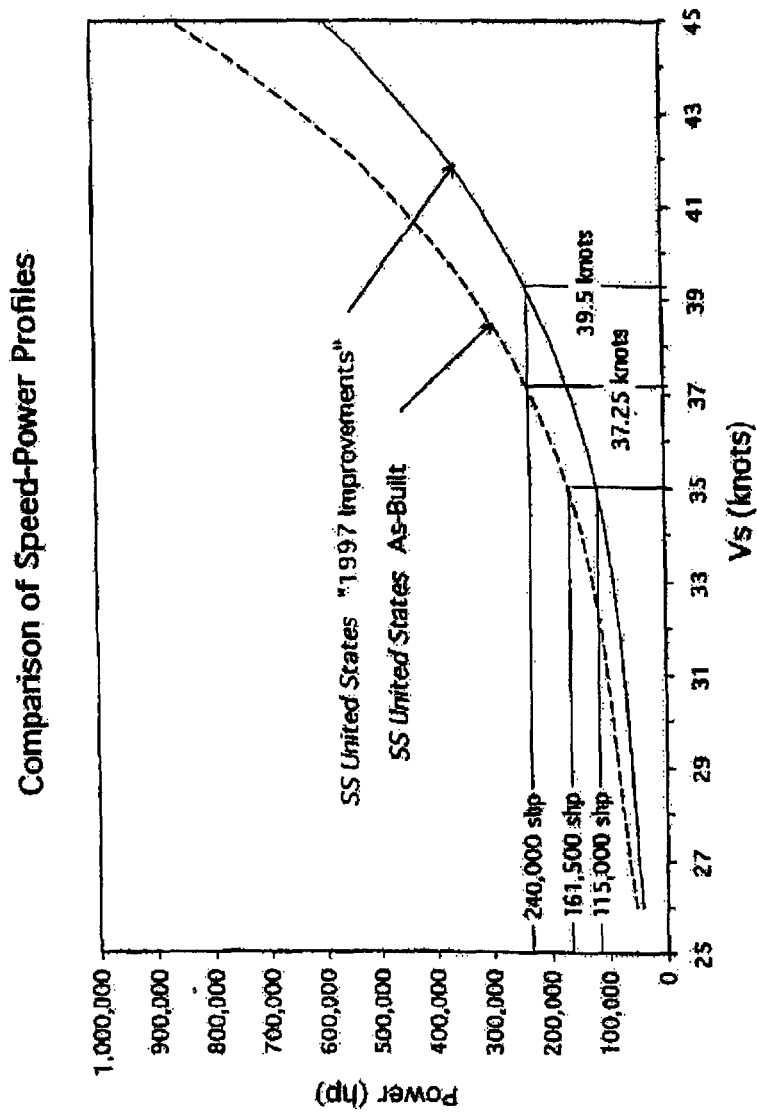
FIG. 5 shows the horsepower versus speed for the US liner SS United States as originally built in 1952 until retired in the later 1960s, as well as design improvements suggested in 1997, when the ship's hull was moored on the Delaware River in Philadelphia, Pa.

Another speed example deals with the passenger liner, SS United States (see FIG. 5). A graph on the Internet shows a copy of its original 1952 speed trials. It was the last liner constructed in the U.S, and the last to win the Blue Riband for crossing the Atlantic from Ambrose Lighthouse in NY Harbor to Bishop Rock in Cornwall, UK, a distance of about 2,938 nautical miles in 3 days, 10 hours, 40 minutes, at an average speed of 35.59 knots (40.96 mph).

From 18 and 26 knots, an increase of 44%, the SS-US power increased from 16,000 hp to 48,000 hp, an increase of 200%. The power over speed increase was 4.54.

From 26 Knots to 32 knots, an increase of 23%, the power increased from 48,000 hp to 104,000 hp, an increase of 119%. The power over speed increase was 5.17

From 32 knots to 38 knots (the maximum speed), an increase of 19%, the power increased from 104,000 hp to 240,000, an increase of 130%. The power over speed increase is 6.84.

Currently, the SS-US is an empty hulk docked in the Delaware River in Philadelphia, which the current owners, a preservation society, are trying to find a solution such as a floating hotel and casino, or scrap it. Interestingly, of the multiple Navy studies and prototype high-speed ships projects, one ship studied was the SS United States. As noted above, with its 240,000 steam powered propellers, long ago removed, its sustained speed was 37.25 knots. To reach 45 knots, would require about 900,000 hp, a factor of 3.75 power increase for a 19% speed increase. A naval architect suggested that by making modifications, such as adding a bow hull, a stern flap, use high strength steel and replacing the steam plant with gas turbines, and installing contra rotating propellers, 45 knots could be reached with 600,000 hp, only a 250% power increase. This solution is a powerful proof that more direct transfer of fuel, i.e. oil, energy to the propeller power is more efficient that a steam cycle where at least 20% of the energy input goes up the chimney before reaching the steam turbine.

Now with a 1000 MW (1,340,000 hp), a 223% increase in power should result in 50 knots, which is only an 11% speed increase (see FIG. 5).

It is clear that the rate of return on power over speed decreases rapidly. In fact as one approaches 40 knots, the return on power increase approaches an almost vertical speed barrier. Therefore, first speed solution is the design of the ship must change, such as using multiple hulls, or better yet, replacing the screw propeller with other the means of thrust, such as pumped, high velocity water jets. The present invention discloses using a high temperature, high velocity gas jet exhaust, preferably direct from the hear source or though an MHD generator/accelerator.

Continuous high speed was the core element in the age of steam. The pioneer ocean going steam ships beginning in the 1830s used paddle wheels. The screw propeller in the 1840s increased ship speed. (John Ericsson is credited as the inventor of the screw propeller, which was installed on the steam ship Archimedes in 1840. He also designed the Monitor, which fought the Merrimac in 1862.) Isambard Kingdom Brunel used it in the first iron steam ship, the Great Britain, in 1845 that crossed the Atlantic from Bristol, UK to NY, N.Y.) Higher speed came from increasing the steam pressure from 5 psi in the 1830s to the 70 psi range with triple expansion steam engines in the 1870s. This was made possible by the invention of the Bessemer process for making steel in mid-Century, which greatly strengthened the piston and sharply reduced the piston diameter. It also allowed gradual increase in steam ships from several 1000 tons to above 10,000 by 1900, the only exception being Brunel's 20,000-ton Great Eastern in the 1850s that failed as passenger ship but succeeded in laying the Trans-Atlantic cable from the UK to US in 1866. By 1900 reciprocating steam engines on several 10,000s ships became deafening behemoths, until Parsons invented the steam turbine in the 1890s, and within one decade the giant passenger and military ships rapidly switched to turbines.

The relevance of this history is that despite the recognition of the need for higher speed, especially by the US Navy since the 1970s, the prime mover has been the gas turbine from the beginning. It replaced the steam turbine whose need for a large boiler limits it to large ships. The solution for higher speed disclosed here is to use metal fuel combustion for direct axial thrust propulsion in order to increase speeds substantially above 40 knot to 100 knots even in large mono hull ships. The second speed solution is to use MHD powered propulsion with nuclear and metal fuels.

The above calculations were for the aircraft carrier Nimitz, which is powered by the low efficiency and large size BWR/PWR nuclear reactor, and the ocean liner, the SS United States. It was shown that a 1000 MW MHD generator which is 4 to 5 times the power rating on these large ships, could be readily accommodated in these ships.

The following shows that closed cycle MHD power plants could also be installed on naval cruisers. The U.S. Navy installed, but then abandoned it, most probably due to their large size and low efficiency, a nuclear reactor on the cruiser CGN 25 Bainbridge. It displaced 8,580 tons, was 566 ft long, with a 57.7 ft. beam, and 44.8 MWe (60,000 hp) power. Using the Nimitz's MHD scaling power of 550% would increase the Bainbridge power to 246.4 MW, which exceeds the current Nimitz's 209 MWe, and would theoretically increase the speed from 30 knots to 53.1 knots. Scaling down the new reactor core volume from the Nimitz's 17,600 cu. ft. by 550%, results in a nuclear core of 3200 cu. ft. with 16 ft H and 16 ft D. It should fit inside the 57.7 ft. beam (width) of a Bainbridge class cruiser. Using the same scaling factor from the carrier Nimitz of 550% would reduce the MHD generator-diffuser from 100 ft to 18 ft, which is probably an excessive size reduction. However, even a 50% reduction in MHD length to 55 ft. would only be 9% of the cruiser's 566 ft length. Also, with the Ocean as a heat sink, only the helium or argon compressor and the super-conducting MHD magnet are the other major components. Therefore, MHD power will not take a significant space in a cruiser. Furthermore, by modifying the ships hull design by adding outriggers or dual hulls or bow bulb or Stern Flap, as suggested for the SS-United States, would result in higher ship speeds.

One of the two failed attempts for MHD rebirths came in the late 1980s. One was to equip submarines with MHD accelerators of seawater. This work ceased soon for unknown reasons. Examination of sea water power density=$\sigma U^2 B^2 K$ (1-K), where $\sigma$ for seawater is 5 mho/m for a salinity of 35 gm/kg of water at ambient temperature, a ship velocity of 30 knots under water (34.5 mph), and as specified in technical papers on this subject using a magnetic field, B, of 10 Tesla, which is totally unrealistically high, and K the load factor, which is the ratio of applied voltage over Faraday induced voltage, (UB), which results in a MHD accelerator power input for K=2, of about 0.08 MW/m$^3$. A 1960s US submarine such as the Washington, 6888 ton submerged, has 11.2 MW power. Therefore, to replace 10 MW power; which is assumed needed for propulsion; would require a MHD accelerator volume 125 m$^3$, with a corresponding huge 10 Tesla magnet. Also, advocates carried the analyses to a K of 10 to increase the power density. However this reduced the thermodynamic efficiency from about 60% to 10%, which would require 100 MWe of electric power to drive the ship. All this means that this form of salt water MHD ship propulsion is totally unsuitable In comparison, the non-equilibrium MHD generator with an alkali metal seeded noble gas having 100 Mhos/m, velocity of 1000 m/sec, magnet 6 Tesla, K=0.8, yields a power density of 576 MW/m$^3$ that would be generated for use in cruisers, aircraft carriers, submarines, commercial ships, that would require a MHD channel volume of 0.0017 m$^3$ for this submarine, versus 125 m$^3$ for the salt water MHD accelerator. Therefore it would make much more sense to have nuclear MHD generator driven propellers. While propeller noise may possibly expose the location of the submarine, an argument in favor of MHD, this will be offset by dissociation of ocean water by the electric field, which will generate $O_2$ and $H_2$ bubbles that will expose the submarine trail for hundreds of miles; as will the huge strength of the magnetic field.

One application that would be most appropriate for nuclear pebble bed MHD power is for commercial ships. Commercial ships travel basically at one speed between the loading port and delivery port, as much as one-half a world apart.

One example would be to install a 179 MW pebble bed nuclear MHD power plant on the vacant hull of the above cited SS United States that has been sitting in the Delaware River in Philadelphia since the 1990s, while various owners have tried to rebuild or failing that, to scrap it. Assuming 35% steam power plant efficiency and the ship's quoted range of 12,000 miles indicates its oil capacity was 13,800 tons, about 90,000 barrels of oil, which equals 29% of the ship's displacement. At $100 per barrel, the cost saved would be $9 million, and about 10,000 tons of $CO_2$ not emitted, which could not be sequestered even in the Ocean due to the great depth needed keep the $CO_2$ down. Also, it should not be allowed because $CO_2$ in water forms carbonic acid, which will dissolve the calcium oxide in shelled sea life. In addition, this oil cost saving is considerably greater when one adds the useable space from not needing oil, and the ability to runs at full power continuously, even to circumnavigate the globe without refueling.

Turmoil in the Middle East oil-producing region has some financial "experts" predicting $200 per barrel oil in case of a conflict there. In that case, the fuel saving per oil storage on the SS United States would be $20 million per trip. In response to the possible argument that it would be years before this nuclear MHD solution would be available, the next section of this Invention deals with several immediate interim and probably permanent solutions, of retrofitting the ship with renewable metal fuels.

This Inventor's Published Application No: US-2011-0173139-A1, dated Jul. 14, 2011, disclosed replacing the fracking water with liquid $CO_2$ separated from coal combustion to frack the shale and followed by separating the $CO_2$ from the methane and sequestrating it. This addresses water contamination concern. Although, the use of the processes disclosed in the present application and this Inventor's earlier applications and Patents, could sharply reduce the need for gas fracking.

The above nuclear MHD power applies to commercial use where conventional single hull ships steaming continuously at the nominal 40 knots limit, which would be nominally double the speed of commercial shipping, and without concern of oil use. This option is not available with conventional nuclear power, which was implement on a commercial ship early in the nuclear age. Compact MHD power with pebble bed reactors with their minimal nuclear waste in recycled pebbles makes commercial use feasible. Similar shipboard missions could be done with metal fuels. It is discussed in the following sub-sections, beginning with metal fuel combustion use for pulsed MHD power. In either case, nuclear powered MHD will eliminate oil use.

Application of Metal Combustion to Pulsed MHD Power Devices:

The metal combustion applications disclosed herein are partly based on the slagging coal combustor, initially disclosed by Zauderer in U.S. Pat. No. 4,624,191, the contents of which are incorporated by reference in their entirety herein. Pulsed power is one of the many applications of MHD that can be derived from the MHD basic function of power generation, as disclosed by Zauderer in U.S. Pat. No. 4,851,722, the contents of which are incorporated by reference in their entirety herein. The second patent disclosed the production of hundreds of MW of pulsed MHD power from a non-equilibrium conductivity alkali metal seeded noble gas that is heated by the oxidation of metal particles, such as aluminum, or beryllium, or zirconium), to gas temperatures from 3000° K to 6250° K at pressures from 10 to 100 atmospheres. The combustion temperature and pressure were selected to maintain the metal oxides in their solid or liquid state so as not to reduce the non-equilibrium electrical conductivity of the seeded noble gases. The application considered in said second Patent was as a power source for nominal 100 MW electromagnetic, several second duration electric pulses, with up to 100 times repetitions to power lasers or electric projectiles, for use in outer space. The metals were to be fired with oxygen, which would heat helium, hydrogen or argon that was seeded with the alkali metal cesium to produce non-equilibrium electric conductivity MHD power.

The present disclosed application uses the features in said Patent but applies them to a totally unanticipated use at that prior time, namely continuous operation, and with the oxygen in air as the oxidizer and the alkali metal seeded nitrogen with or without added air as the MHD working gas. Neither use was even thought of at the time due to misunderstanding of elevated non-equilibrium, electron quenching by diatomic molecules. Also, $CO_2$ removal from fossil fuel combustion was not an issue at the time. Therefore, no one would have considered metal fuels could be used as a renewable, net zero $CO_2$ emission fuel, nor how to implement this. Also, since nuclear power was considered banned permanently, no one considered metal fuels could be a means to prepare for subsequent nuclear powered MHD.

While the present invention retains the use of this pulsed metallic function as a co-MHD power source, its primary and totally new function is to use the metal as the primary heat source for continuous MHD power generation, or to apply metal fuel combustion directly to continuous, direct propulsion for terrestrial, land based, shipboard and air transport uses. The product of combustion would be the metal oxide, which would be recovered and reprocessed into its original metal state by using either a pebble bed nuclear gas cooled reactor MHD generator, or a fossil fuel fired power plants with zero emission and $CO_2$ sequestration as the heat sources.

In summary the new invention differs completely from the original MHD pulsed power application. Previously, the objective was to provide electric power for the Strategic Defense Initiative (SDI) for defense in outer space, given then the name "Star Wars". The present application, in addition to its primary mission of transport power, can also be used as pulsed MHD power for direct electric energy projectiles or gas lasers for defense of shipping and on land from missile attack from the smallest hand launched missiles to ICBMs. This applies especially to the Navy, which has been concerned on leaving a trail of the direction of its ships to hostile forces. This is a special concern to the Navy because ships must stay on station to protect a landing of troops on a hostile shore. It was the absence of a fully effective air defense for the ships at Okinawa in 1945 that led to the great shipping loses from Kamikazes planes.

Totally new is the disclosure in the present invention, that the same MHD power plant that propels ships can also be used to intercept missiles in seconds per pulse. Incredible on Aug. 2, 2011 a news release stated that the US Navy had developed a power electromagnet rail gun technology that can project a "bullet" at 33 MJ of energy. Assuming the "barrel" takes 3 seconds to propel the "bullet", the power rate required would be at the rate of about 40,000 MW per hour of DC. A central station power plant only puts out 1000 MW per hour. However, the power rate attainable with the MHD generator disclosed in this Invention can achieve even greater power.

Metal Fuel Combustion with and without MHD for Ship Propulsion:

A) Metal Fuel Combustion with MHD Propulsion:

While nuclear MHD power opens up many uses from stationary power to propulsion power, this is not an immediate solution because the nuclear approval process for commercial use is a decade long process. (This sentence was written before the March 2011, Japanese nuclear power disaster. Now it has been revealed that US reactors are also at risk from extended several day power failures. Therefore, any new commercial nuclear power plant will face extensive delays for approval.) However, for military use, the US Supreme Court recently ruled in a case where the Navy was using underwater noise generators that could harm sea life, (apparently dolphins) that civilian plaintiffs have no standing in military matters. However, it is doubtful that the military would commit to nuclear power that is based on MHD power with the current technical status of closed cycle MHD. This is another very adverse consequence of the combustion open cycle MHD advocates in the mid-1970s that instigated a complete cutoff of closed cycle MHD R&D, while they dissipated $400 million ($1.4 billion in 2010) of taxpayer dollars to what turned out to be a dead end. Unlike open cycle combustion MHD, which stood on one leg, coal fired combustion power that required billion dollars expenditure to begin to demonstrate the technology that required at least 1000 MWe power plants, closed cycle MHD is a power system with multiple applications that can be commercialized in small 10 MWe power plants. Therefore, by killing closed cycle MHD by refusing to fund a commercial scale, several million dollar, 10 MWe, 50 MWt blowdown test due to the erroneous belief that coal was the only solution for energy in the US in the 1970s, the opportunity passed for its use to this day. Had the closed cycle MHD work continued since then it is probable that the US Navy alone could have used it for 100 knot Surface Effect frigates years ago. {Note added March 2011: More important had MHD continued since the 1970s, the Japanese nuclear disaster might have been avoided because nuclear MHD power plants might have been in wide use.)

The Navy could use five 145 mph frigates to sweep the entire 760-mile Mozambique coastline every hour, which would hem in pirates. Neither would the World's oil and stock markets have gone ballistic due to 2011 troubles in Tripoli, Libya, because oil for transportation would have been replaced with real renewable metal fuels or high temperature nuclear power. Therefore, to implement near term MHD power, the present disclosure suggests first shifting to metal fuel combustion for direct propulsion or for MHD generator-accelerator propulsion. This metal fuel source for shipboard propulsion, or for that matter any significant size propulsion system, be it land based or ship based, opens up a totally new unanticipated, renewable, zero $CO_2$ emission application for propulsion with or without MHD generators/accelerators by using certain metals, such as aluminum, magnesium, or zirconium, as the fuel, with dry air as the oxidizer.

This renewable metal application is possible because the metal oxide combustion products can be reversed by reducing the oxide back to the metal, either by electrolysis in the case of magnesium, or by the Hall process for aluminum, or by hydrogen reduction to form either the metal or the metal hydride. The hydride can also burn. However, the water formed during combustion must be removed at its lower temperature reaction before the high temperature oxidation takes place. If not, the $H_2O$ product gas will quench the non-equilibrium electrical conductivity in the MHD channel. As the stored metal fuel is consumed, the metal oxide is stored on board until the end of the voyage. It is removed and recycled on land, or on a supply ship, for reuse. The hydrogen for the oxide reduction can be supplied from electrolysis of water if a nuclear heat source is used, which has no $CO_2$ emissions, or preferably with hydrogen that is produced from natural gas, or preferably from the volatile matter in coal, as per U.S. Pat. No. 7,282,189. The resultant $CO_2$ would be sequestered in underground limestone formations, as per said Patent. The metal fuel is renewable because ships would be supplied with finely ground metal or metal hydride powder in sufficient quantity to duplicate a ship's range over a distance equal to that if it were fueled with oil.

The S.S. United States ocean liner could be used as a basis for performance comparison. The ship's displacement is 50,904 Short Tones (ST), fuel capacity—11,543 ST, range—11,500 Statute Miles, (ST), sustained speed—40,25 ST/hour, and 161,500 shp (see FIG. 5). These values were taken from "Hull Form and Propulsar Technology for High Speed Sea Lift" pages 15-16) (Chris B. McKesson, ed., Feb. 13, 1998). The values of this ship differs somewhat that those cited in other sources. However, this is the only source found by this inventor that directly correlates oil use with power at sustained speed. The surprising result was that the fuel efficiency was only 30%, which is at the low range of a high-pressure Rankine steam cycle efficiency. This means that almost 70% of the oil loaded does not contribute to propulsion, which is the mission of a ship.

So examining FIG. 5 shows that "as built" at only 45 knots requires 900,00 hp 5.57 times more oil, or 64,000 short tons of oil that exceed the weight of the ship displacement 50,904 ST which would sink the ship. The alternative "1997 improvements" mentions using gas turbines machinery at 5% to increasing the speed to 35 knots. However, it does not list 45 knots, which requires 600,000 hp. or 3.72 times the 161,500 hp, which would require 42,880 tons (339,000 barrels) of oil, which at $100 per barrel would cost $34 million. However, not stated at all is that gas turbine power is as much as 50% efficient versus steam turbine power's 30%. So the oil needed is 25,700 tons, or 203,000 barrels, which at $100 a barrel would still cost an unaffordable $20 million. Even the original 11,500 tons of oil at 30 knots and 11,500 miles would cost $9 million. Now said report lists the oil at 11,500 ST and cargo capacity at 6,440 ST. So to ship cargo over the 11,500 statute miles would cost $14,100 per short ton. Bulk coal from China costs about $7/ton shipping.

Now 35 knots (39.2 mph), 12,000 miles, 306 hrs, at 161,500 hp (120.5 MW), (411.2 MMBtu/hr), would require aluminum at 4000° F. with 28.12 MMBtu/ST, 14.6 ST/hr with a total Al of 4,469 total aluminum tons. With 80% heat to propulsion efficiency, the total metal 5587 tons per trip. Based on slagging coal combustor data, no more that 10% of the sub 10 micron particles of aluminum (1,136 tons) escape the combustor, or 559 tons per trip that is replaced at $2000/ton, at a cost of $1.17 million by the Hall Process, with electricity accounting for about $500/ton. The remaining 90% would be recycled, preferably with hydrogen from devolatilized coal at a considerably lesser cost use of hydrogen would cost a small fraction of the Hall process, electricity use would be minimal, and aluminum hydride is an acceptable fuel. Also, there would be no need for new bauxite and its processing cost. So assuming a generous $250/ton of aluminum to reprocess the 90% aluminum oxide to recover 5028 tons of aluminum would cost another $1.26 million, and a total of $2.43 million, or 27% of $9.1 million oil, and of course no imported oil and no $CO_2$.

On top of that the aluminum and $Al_2O_3$ renewable waste occupy only about 15% of the oil volume. This is an additional major advantage of metals over oil, its much greater density frees up substantial space for other uses, such as cargo for civilian or military uses, or riding higher in the water, which reduces drag and increases speed. (More below.)

On top of that the metals can propel the ship to 100 knots, while oil can't reach 45 knots, These figures are meant to show the economic benefit of this process. However, much more important, the price of aluminum would remain fixed because 90% per trip would be recycled to metal.

Also, if aluminum recycling is expensive there is magnesium, which requires 13,648 tons, and whose loss can be recovered from the Ocean, the Great Salt Lake, and the Dead Sea. There is also Zirconium but it is expensive.

However, an even more efficient and substantially less costly option is disclosed here, namely, using the thermal energy from metal fuel combustion to directly accelerate and expand the heated gas in a nozzle to the vehicle in this case a ship, as explained in the next Section.

B) Metal Fuel Combustion with Direct Gas Exhaust Propulsion:

As disclosed in the previous Section, using metal oxide droplet/particles to directly heat cesium seeded nitrogen/air mixtures at 10 atm and 3,140° F. (3,600° R, 2,000° K) stagnation temperature to generate non-equilibrium electricity in an MHD generator to directly drive a ship's propellers or a ship's pumps for water jet propulsion that is very efficient (about 56% based on HHV) and compact to the point that a single 1000 MW MHD generator could readily fit inside a 50,000 ton displacement ship, such as the liner SS United States, which was powered by only 240,000 hp (179 MW) steam turbines to reach only 37.25 knots, which is only one-quarter of the 1000 MW MHD power. FIG. 5 shows how this ship might achieve a speed of 39.5 knots at the same 240,000 hp with improvements such as adding a bow bulb and Stern Flap, suggested in 1997. Also shown are the huge increase in power needed, about 900,000 hp (375% more) as-built, or 600,000 hp (250% more) as improved, to increase the speed to 45 knots, which is less than 20% higher speed. FIG. 5 shows the near vertical power barrier to substantially increase the speed of conventional single hull ships. The present invention discloses how this barrier can be surmounted with modifications to existing ships and with alternate ship designs all of which would be propelled with the power plants disclosed herein. Before presenting how very substantial increases in speed in all size ships with metal fuel combustion can be achieved, it is necessary to list the major limitations of using gas turbines, which have been selected as the solution for high-speed ships.

Much of the public high-speed ship information is found on Internet web sites that discuss the results of the US Navy sponsored Symposium at the Carderock Navy Station in 1997. In the present document the different classes of ships and their attainable speeds are summarized in FIG. 3 through 6 herein. Since the disclosed propulsion systems are not limited to any specific ship, there is no need here to discuss their unique aspects and the specific identifying names given them in the figures.

In sharp contrast to using a single MHD generator at 1000 MWe (1,340,000 hp) and higher if needed, multiple marine gas turbines are needed to drive ship propellers or water jets at such high power levels. From the General Electric website the LM6000 is currently reported as the largest commercial marine gas turbine in service. It is currently rated at 57,333 hp (42.8 MW at 49.4% efficiency-LHV). (Gas turbines are rated on LHV because the water vapor energy at the turbine exhaust is lost. Therefore, using HHV would make gas turbines less efficient relative to coal-fired steam turbines.) It appears that this is its recommended cruising power. In a 1998 report on high-speed ship the proposed design of a Surface Effect Vessel (SEV) with the LM 6000 turbine is rated at 70,038 hp. It would take 8 gas turbines in parallel with a total 560,304 hp (418 MW) to propel at 78 knots a SEV with a displacement of 25,386 LT (Long Ton) without a payload, with fuel for 12,000 nautical miles (NT). This ship would have a Transport Factor (TF) of 24.29 (see Table 1 and FIG. 4 and the discussion below). Presumably each turbine would be individually connected to its own propeller(s) or water jet(s).

TABLE 1

Power and Speed of Various Ship Designs -Operating (O) & Proposed (P)

| Ship & Propulsion | Speed (knots) | Horse-power | Displace (LT) | Range (NM) | Transport Factor |
|---|---|---|---|---|---|
| United States (O) | 37.25 | 240,000 | 43,178 | 10,000 | 48.85 |
| United States (P) | 39.5 | 240,000 | 45,450 | 10,000 | 48.49 |
| United States (P) | 45 | 600,000 | 45,450 | 10,000 | |
| SEV&8 LM2500 (P) | 37 | 381,800 | 42,951 | 8,000 | 26.61 |
| SEV&8 LM6000 (P) | 48 | 560,304 | 43,810 | 4,000 | 25.8 |
| SEV&8GE90 (P) | 74 | 1,430,670 | 43,740 | 5,000 | 15.55 |
| SEV&8GE90 (P) | 117 | 1,430,670 | 25,620 | 7,000 | 14.4 |

Only SS United States Operated. Only LM6000 Turbine Operates. All Four SEV are Proposed Table 1 is taken from a US Navy 1998 Report that contains three sets of tables for existing and proposed ship designs with parametric variations covering conventional mono hull ships, including the SS United States, Surface Effect Vehicle (SEV) ships, and Semi Planning ships both of which are flat bottom air lift ships that have not been constructed above several 1000 long tons. Other reports cover 100 ship types and variations. For each ship, the parametric variations consist of varying the ship displacement, power, load, speed, as expressed in terms of different Transport Factors (TF).

The second example of a theoretical SEV would use 8 of GE's largest reported marine gas turbines, the GE 90 or LM9000, each rated at 178,834 hp (133.4 MW), for a total of 1,430,670 hp, (1,067 MW), a total that equals the output of a single 1000 MWe MHD generator. This SEV when applied to 43,740 LT (Long Ton) displacement ship would reach 74 knots with a range of 5000 miles, a TF of 15.55. A smaller, but still large, 26,620 LT ship, would reach 117 knots, with a TF of 14.4. So here is a 100-knot Navy. So why is there no such large ships?Possible reasons are:

1) This large turbine was cited in several of said documents, but as of 2010 there is no data on the GE Web site that lists a naval turbine greater that the LM6000 in use, and in any case the LM9000 is the largest marine turbine, and it is only 12% of a 1000 MW MHD generator.

2) It is questionable whether the thrust of 8 gas turbines firing is uniform.

3) Direct transfer of thermal energy to the propulsion is most efficient. The high rpm of the gas turbine must be geared down the low rpm propellers and pumps for the water jets, which lowers efficiency and adds greatly to cost.

4) SEV is a Surface Effect ship, which is most effective in achieving high speed. But it has flat, large area, shallow depth bottom platforms, similar to ferries, which are susceptible to rapid flipping and capsizing as the load shift, especially in high storm driven seas.

The modifications to the SS United States are discussed above.

Figure 3:
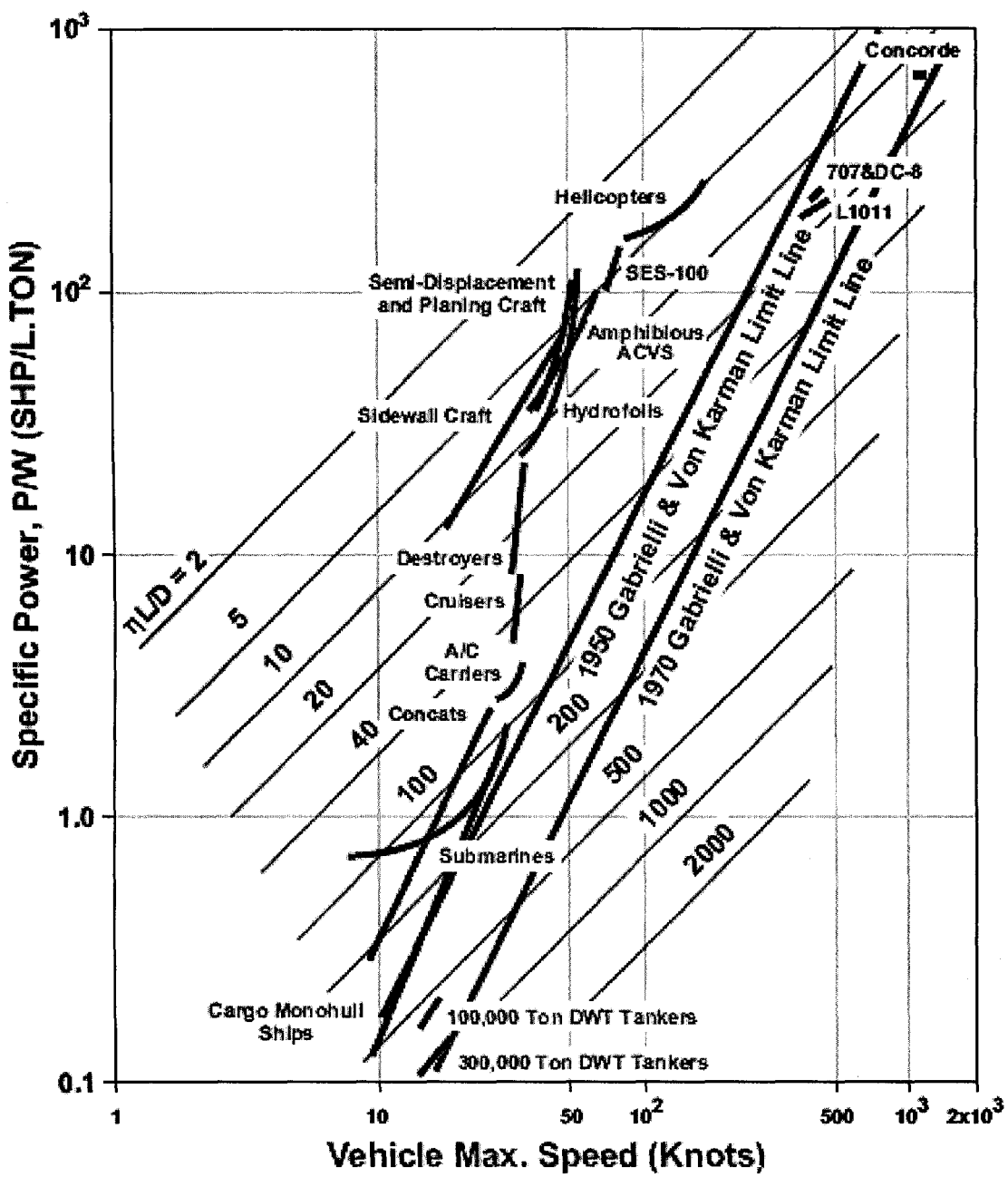
FIG. 3 shows that the specific power in hp per ton versus speed in mph for humans, animals, land vehicles, ships, aircraft, and rockets, that are all located to the left of the inclined line, as per G. Gabrielli and Th. Von Karman.
Figure 4:
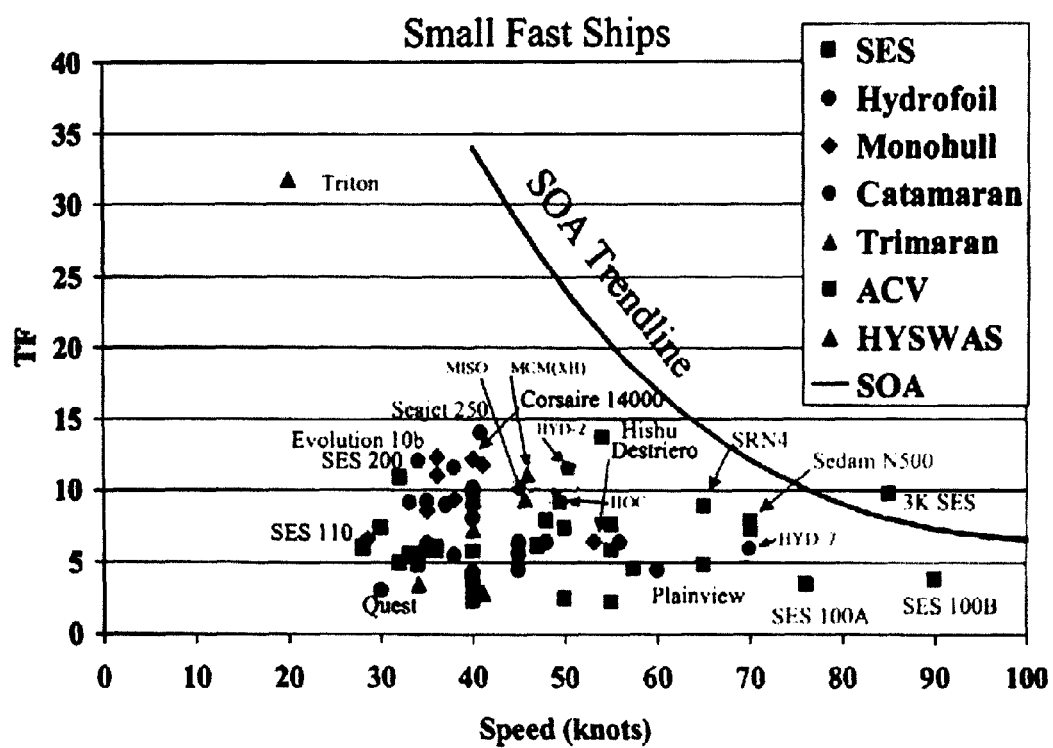
FIG. 4 shows a similar relationship as per FIG. 3 for ship speed as a function of a Transport Factor (TF) for most operating ships and proposed ships, as reported by C. Kennell, at the Navy's 1997 Carderock High Speed Ship Symposium.

Therefore, either the metal fuel and MHD accelerator propulsion systems disclosed herein, or the direct propulsion of the ship by the exhaust gases heated by the metal fuels are unique in directly transferring the input thermal energy into ship propulsion, and producing the high power needed to achieve the high speeds, as disclosed next:

As noted above, FIG. 4, was taken from a paper given in the 1997 Navy Symposium on high-speed ships. It was derived in-turn from FIG. 3 that is shown in a classic paper, "What Price Speed?" by G. Gabrielli and Theodore von Karman in the October 1950 issue of Mechanical Engineering. Ingeniously, these two authors derived a simple relationship between propulsion power per unit weight of any vehicle versus its speed. They showed that it can be applied to any moving object, humans, animals, ground vehicles, ships, airplanes, and rockets. They also showed (as in FIG. 3) that all propulsion methods fall to the left side of a diagonal line. As stated above, at the 1997 Navy High Ship Speed Symposium at the Carderock Navy Center, about 200 experts reported updates to these data, as shown in FIG. 3 and FIG. 4. These data are used herein to compare with the ship power disclosed in the present invention. Only a few specialized ships, such as Surface Effect Ships (SES) or Air Cushion Vehicles (ACV) can not only exceed 50 knots, but they can also theoretically exceed about 100 knots to even the 120 knot range in 20,000 LT (Long Ton) surface effect air elevated ships, called Surface Effect Vehicle (SEV).

This 1997 Meeting focused on novel ship designs as the path for high speed. C. Kennel and associates replaced the Gabrielli/von Karman Specific Power ordinate of FIG. 3 with a more encompassing ordinate that Kennel called the Transport Factor (TF). The TF consists of the sum of Transport Factors for fuel $TF_E$, for ship design $TF_S$, and for cargo, $TF_C$. In FIG. 3, the ordinate is the ratio of power driving the ship, divided by the total ship weight, which is a measure of propulsion efficiency. In FIG. 4, the Transport Factor (FT) formulated by Kennell is a term equal to the ship's weight times its velocity divided by the ship propulsion power, adjusted by two factors to accommodate units, namely $$TF=1.6878/550*2240*(\text{Full Load Displacement in Long Tons})*(\text{Speed in knots})/(\text{Total Installed SHP}), \text{ where SHP is shaft horsepower.}$$

Therefore, TF in FIG. 4 is the inverse of the FIG. 3 ordinate. The Legend in FIG. 4 covers the gamut of ship designs, from traditional mono hulls, to multiple hull ships, such as the two-hull Catamaran, the Air Cushion Ship (ACS) and the Surface Effect Ship (SES) also called Surface Effect Vessel (SEV) both of which use different methods to direct airflows to lift the hull off the sea surface. The only actual ships (Solid Symbols) that exceed 50 knots are surface effect ships, (SES and ACV). Also, they have Transport Factors (TF) under 10, meaning they are small ships, in the 100s of tons range, with few over several 1000 tons. The open square symbols, are primarily above 50 knots and at or above the Revised TF Trend line. They apply primarily to SES and ACS ships that need more powerful gas turbine than currently in use to propel them. They are called "concept" ships, i.e. "paper" ships.

Figure 6:
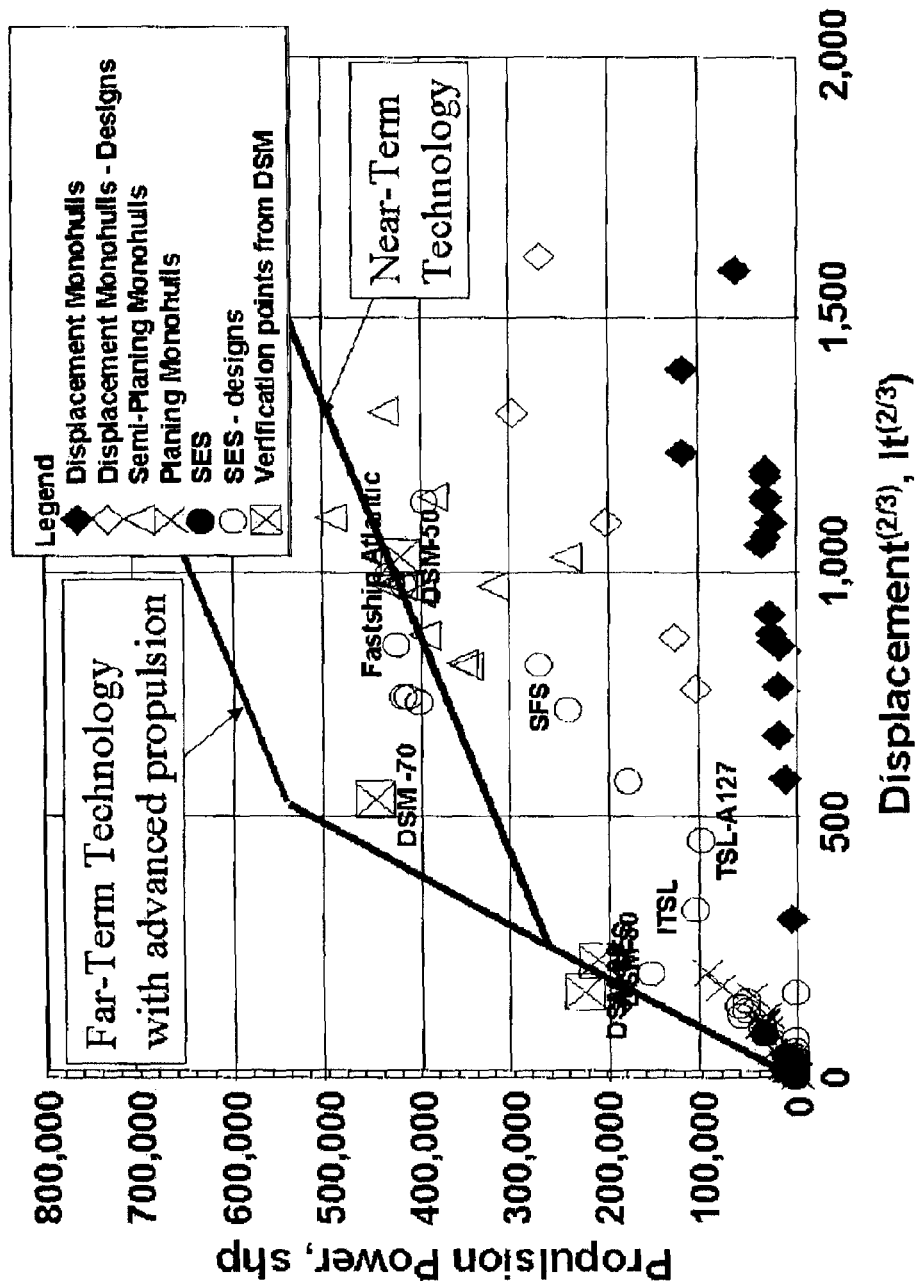
FIG. 6 shows propulsion power as a function of ship displacement volume to the ⅔ power for various classes of high speed ships as presented at the Navy's 1997 Carderock High Speed Ship Symposium.

The absence of large, high-speed ships can be seen in FIG. 6 which show the Propulsion Power in horsepower as a function of the ⅔ power of ship displacement. The 500 on the axis equals 10,764 long ton displacement, 1000 equals 30,000 tons, and 1500 equals 55,000 tons. While these are commercial and Navy ships, high propulsion power is only in the 10,000 ton range. This low power will keep these ships under 30 knots. In fact FIG. 6 does not even incorporate in the Far-Term Technology curve a SEV of 43,740 tons at 74 knots whose 1,430,670 shp is 178% above the top 800,000 shp ordinate in FIG. 6.

Therefore, the purpose of entering FIGS. 3 through 6 is to demonstrate that there are no actual or "paper" ships that could propel large ships in the several 10,000 ton range, above 40 knots under conditions generally encountered in Oceans. Both the Navy and commerce ships would benefit from large high speed ships disclosed herein.

High Speed Icebreakers:

One extension of the above ship propulsion is to icebreaker ships. In recent decades the 500-year search for a Northwest Passage from the Atlantic to the Pacific can now be transited in the summer. Also, icebreakers have traveled to the North Pole though ice paths that are less than 10 feet thick. In fact this is the range of ice sheet thickness that icebreakers travel. The icebreaker's stern pushes to the top of the ice sheet and continuously moves forward until the weight of the ship cracks the ice. In effect, the ship moves forward in an up and down motion. This requires a great deal of power, and forward motion is in the range of only several knots. The Russians uses nuclear powered ships, which appear to require frequent extended repairs. However, with the enormous power available from metal fuels or MHD power, icebreakers should be able to move at substantially higher speed than the few knot of existing ships. With the current rush to extract oil from the Arctic Ocean, the present high power propulsion system would enable direct transport of oil by ship from wells under the ice cap to market by ship.

In summary, the present invention of using renewable metal fuels or gas cooled nuclear reactors with or without MHD power could achieve "Energy Independence from Foreign Oil" on a massive scale for both stationary land based power and terrestrial propulsion power.

Due to the novelty of this ship propulsion invention some repetition is given below to further clarify the specification.

Practicing this Invention with a Metal Fuel Combustor:

This invention would be practiced by combustion of metal powders in air in a slagging combustor with or without an MHD generator-accelerator (FIGS. 1 & 2) whose mode of operation would be similar to that disclosed in U.S. Pat. No. 4,851,722 up to U.S. Publication No. 2012/0137877, the contents of which are incorporated by reference herein in their entirety. For example, metal combustion would occur with dried air (to prevent the formation of $H_2O$ molecules that would quench non-equilibrium ionization) at pressures from about 10 to 100 atmospheres, depending on the application at a stoichiometric ratio of oxygen that is about 1% less than unity in order to react all the oxygen and form liquid metal oxide droplets in the combustor. The liquid metal oxide particles would heat by conduction, convection and radiation the $N_2$ to about 4,330° K if the reaction were to occur with aluminum at 10 atm. in the combustor, and it would be in this temperature and pressure range with other metals, preferably Mg, or Zr in that order.

The cyclonic action of the gas, $N_2$, that is heated by oxidation of the metal particles into metal oxide droplets would drive the droplets into the liquid oxide covered wall inside the cylindrical slagging combustor, which is continuously drained through an opening at the bottom downstream end of the combustor, and quenched, as disclosed in said U.S. Pat. No. 4,851,722, the contents of which are incorporated by reference herein in their entirety. The quenched metal oxide would be stored on board until offloaded at the destination harbor, where reprocessed metal powder or metal hydride powder would be loaded.

The price of the metal is a secondary factor because the metal oxide formed after oxidation in the slagging combustor would be recycled in an on-shore metal oxide reduction plant. Or, if for some reason the metal fuel is needed continuously it could be reprocessed in an on board nuclear reactor. While hydrogen would be preferred to reduce the metal oxide to metal, other processes are also acceptable, such as the Hall process for aluminum, or even carbothermic reduction of aluminum, as disclosed in U.S. Pat. No. 6,440,193, the contents of which are incorporated by reference herein in their entirety and other previous ones. The determinant on which process is selected depends on efficiency and cost. Hydrogen is preferred because pure metal is not of paramount importance. A metal hydride is just as acceptable as a fuel if formed by hydrogen reduction. The only requirement is that the hydride be oxidized in a pre-combustor to drive off the hydrogen before injecting the metal into the combustor in order to prevent the formation of $H_2O$ in the metal combustor because $H_2O$ or even OH molecules have a very large cross-section to electron collisions that will quench non-equilibrium ionization inside the MHD generator and accelerator even at concentrations of a small fraction of 1% of the parent gas. Fortunately the heat of formation of these metal hydrides is a very small fraction of the metal oxide heat of formation. Therefore, the $H_2$—$O_2$ reaction can precede the metal-oxygen reaction.

Aluminum is used here as an example to show how the present invention would be practiced. U.S. Pat. No. 4,851,722, the contents of which are incorporated by reference herein in their entirety, reports that the adiabatic combustion temperature for aluminum with oxygen at 10 atm. is 4,333° K, and it is 5,000° K at 100 atm. With beryllium and zirconium the adiabatic gas temperatures at 100 atm. is computed as 6,250° K The Mg—$O_2$ temperature is only cited for 1 atm as 3873° K, a value that is about the same as with Al+$O_2$ at 1 atm. Therefore, all the metals cited herein can be assumed to yield about the same temperatures at the same pressures.

Said patent disclosed that the metal oxide droplets are totally dispersed in helium or hydrogen. Consequently heat is transferred very efficiently from the nominal 10-micron diameter metal oxide liquid droplets to the He or $H_2$. The result is that this heat transfer from the droplets to the gases entering the MHD generator would result in a gas temperature range from 3800° K to 6250° K at 1 atm to 100 atm. This is substantially higher than the nominal 2800° K peak temperatures attained in graphite pebble bed nuclear reactors under the AEC/NASA NERVA nuclear rocket program. Therefore, the thrust attainable with noble gases or hydrogen or nitrogen will be substantially higher with these metals than with nuclear reactors.

Furthermore, the gas exiting the MHD accelerator still contains significant thermal energy, which provides substantial additional energy that will further increase the thrust on ship or rocket or land based vehicles down to the background pressure in their environment, be it the atmospheres, or the oceans, or outer space.

This added exhaust thrust is not available for propulsion from a nuclear heat source if the risk of radioactive gas or solid materials can be exhausted into the Earth's air, water, or ground environment. Therefore, terrestrial nuclear powered acceleration must be closed cycle to prevent radioactive material in the exhaust, which could occur from failures of the nuclear content pebbles. However, this generator exit energy can be used to heat a bottom gas turbine Brayton cycle and/or a Rankine cycle of steam or organic fluids.

This does not apply for Space applications where radioactive materials are insignificant in the vastness of Space. As for the ground testing in the NERVA nuclear rocket program, the hydrogen tests were of several minutes duration, which presumably was too short to allow the escape of significant radioactive matter from the nuclear refractory core.

However, even without any risk of escape of radioactive materials from the pebbles in open cycle operation in outer space, nuclear power for MHD generation or propulsion is limited by the "heat transfer barrier", namely the energy density of uranium is so high that extracting its energy is limited by heat transfer from the nuclear fuel to the MHD generator or propulsion gas because the nuclear heat must be transferred through a refractory metal oxide barrier of relatively low thermal conductivity to heat the MHD gas to the stagnation gas temperatures. In contrast, the metal oxide droplets formed by combustion transfer heat directly to the gas, and they are at substantially higher peak temperatures. Also, with metal oxides, there is no concern about radioactive hazards to humans, to machines, and to the environment. However, it must be strongly emphasized that this advantage of metals over nuclear is only available for time constrained use, namely propulsion missions. For extended time missions on earth, ocean, or outer space, nuclear is clearly needed. So despite the heat transfer limit, nuclear power is the only solution in many cases.

Said U.S. Pat. No. 4,851,722, the contents of which are incorporated by reference herein in their entirety, also teaches that for MHD use, the combustor requires a second coaxial downstream chamber with counter swirling gas flow injection to remove the first chamber's swirling action (FIGS. 1 & 2). This is necessary to assure an axial gas flow in the MHD generator, which is co-axial to the two-chamber combustor. In the present application this second chamber gas would be $N_2$ that is drawn from the downstream end of the first chamber and redirected to the gas inlet in the second chamber. In case of aluminum, the second stage inlet gas can also augmented with air. The ducting to accomplish this would be internally lined with high temperature refractory, such as aluminum oxide. The $N_2$ would not require any additional compression, as its pressure would be the same as the air inlet pressure to the first chamber at a nominal 10-to 100 atm. New dry air to the 2nd stage would require compression.

For ship propulsion and terrestrial vehicle propulsion, the preferred MHD gas is nitrogen because it comes free with the oxygen and the only cost is the metal fuel. As shown by example above, the conversion of the metal to a liquid oxide means that with the exception of a few percent of the metal oxide escaping with the exhaust gases, the metal fuel is "recycled" and therefore "renewable", with no $CO_2$ emissions. Also, since the power generation can occur at full power continuously, this power source is truly "renewable" for 8760 hours annually. It is not intermittent "renewable" like wind, solar, or bio fueled power, which are only available at a small fraction of the year. Zero emission is accomplished by using either nuclear power, which has no $CO_2$ emissions. Or, if coal or gas fired power is used to recycle the meal oxide, the $CO_2$ is sequestered as per this Inventor's U.S. Pat. Nos. 7,247,285, 7,553,463, Provisional Applications No. 61/293,841, (dated Jan. 20, 2010), (also, US 2011/0173139), No. 61/380,913 (dated Sep. 8, 2010), (Also. US No. 2012/00580422), and No. 61/418,977 (Dec. 2, 2010,), (Also U.S. 2012/0137877), all of which the contents are incorporated by reference herein in their entirety.

At the $2^{nd}$ combustor stage exit Cs from 0.1% to 1% is added to the $N_2$ for thermal and non-equilibrium ionization. At stagnation temperature, $T_o$=4330° K, and Mach 0.9 in the generator, $N_2$, specific heat ratio $\gamma$=1.3, static temperature $T_s$=3897° K, velocity U=1108 m/sec., the equilibrium conductivity, $\sigma_1$, is 200 Mhos/m with 0.1% Cs, and $\sigma_2$ is 700 Mhos/m with 1% Cs. At B=4 Tesla, generator load, K=0.8, the power, $$P_{out}=\sigma U^2 B^2 K(1-K), \text{ in MW/m}^3, \qquad \text{Equation (1)}$$

equals 628 MW/m$^3$ at $\sigma_1$, and 2,198 MW/m$^3$ at $\sigma_2$.

Supersonic flow is needed to lower the gas temperatures and pressure to yield elevated electron temperatures, $T_e$ and conductivity in the MHD generator and MHD accelerator by:

$$T_e/T_o=[1+\gamma(1-K)^2 M^2 \beta_{eff}^2/3\delta]/[1+0.5*(\gamma-1)*M^2] \qquad \text{(Equation 2)},$$

$\beta_{eff}$ is the effective electron cyclotron frequency divided by the electron-atom or molecule collision frequency, and it is due to plasma turbulence, PT. For example, at 10 atm., 2000° K stagnation temperature in Cs seeded argon, B=4 T, and PT=0.5, $\beta$ is 9.1, and $\beta_{eff}$ is 2.1. For B=6 T, PT=0.2, $\beta$=15.2 and $\beta_{eff}$=4.7. $\delta$ is the inelastic electro-atom or molecule collision loss factor, which is a function of $T_e$, and it is unity, 1, for monatomic gases. In DOE ECAS Case 102, (Provisional No. 61/418,977), for Cs seeded Argon at 2000° K, the MHD power was 1000 MW in a 15 m MHD generator at 4 Tesla or in a 10 m long generator at 6 Tesla.

The argon cases were with non-equilibrium ionization at one half the temperatures achievable with metal fuels. For $N_2$ stagnation temperature, $T_o$, of 4330° K, with $\delta$=7.8, PT=0.5, $\beta_{eff}$=2.1, M=0.9, K=0.8, $\gamma$=1.3, Te=1.008×$T_o$=3897° K, versus the stagnation temperature of 4300° K, which yields the conductivity used to get the above power density from equation 1.

However, as the gas accelerates and cools in the MHD accelerator, non-equilibrium ionization is needed for $\sigma$. The gas cools due to the high area ratio in MHD generators, which in ECAS equaled 6, which with isentropic expansion for $N_2$, at $P_o$=10 atm. yields 2.8 atm. at Mach 1.5 at the generator entrance and 0.15 atm at a Mach 3.2 exit. $\beta_{eff}^2$ would be higher although the magnetic field is tapered down. Also, the Mach outlet over inlet would be 4.55. So electron heating and ionization is possible with Cs seeded $H_2$ and $N_2$ as $T_{gas}$ decreases in the accelerator.

The significance of this is that after the GE MHD Group was disbanded in 1981, remaining closed cycle MHD researchers at Eindhoven and Tokyo shifted to the disc MHD generator in shock tunnels and blowdown testing. This was despite the validation of the GE 5MW linear MHD generator at Eindhoven in 1983. This Inventor discovered in August 2011 the most probable reason for this shift to the disc in a theoretical paper at the 26 MHD Symposium, June 1988, on using the NERVA reactor on a non-equilibrium pulsed MHD disc generator for Earth orbit military defense, the same application as Zauderer's U.S. Pat. No. 4,851,722. The MHD generator operated at Mach 2.5 with Ts of about 1600° K and $T_e$ of 4500° K to 5000° K. However, the cesium seed was $5 \times 10^{-5}$ in $H_2$, versus 0.1 to 1% used herein. This was done to fully ionize the cesium, which plasma theoreticians claimed would suppress plasma turbulence, PT. As a result σ was only about 12 Mhos/m because there were too few electrons. With no PT, β and the Hall voltage was very high and the disc MHD output was computed at 2600 MW/m³, while the disc advocates claimed that the linear MHD generator output was only 10 MW/m³. Both numbers are fiction because there was no data to support the disc prediction, while this inventor's work on the GE-MHD shock tunnel generator with Cs seeded argon measured 50 MW/m³ at 2000° K stagnation temperature, which was 1000° K lower than the NERVA 3000° K. This totally erroneous dismissal of the linear MHD generator and unsubstantiated claims on performance by disc MHD generator advocates is another example of what led to the demise of MHD power. It also explains Rosa's statement in the 1987 reprint of his 1967 MHD book that "the feasibility of non-equilibrium ionization is yet to be demonstrated, some encouraging results have been obtained". His reference was to the disc MHD generator work in Japan and the Netherlands, and he dismissed the linear MHD generator work at GE, which he cited in the 1$^{st}$ edition when the GE work was first presented in 1964.

In any case, the disc MHD generator is useless for MHD acceleration, and for high temperature MHD power with $H_2$ and $N_2$, the generator should run-subsonic with equilibrium σ.

This last statement is very important to validate the present invention because all the authors of disc MHD generator papers, and certainly Rosa, who was a leader in MHD power research at Avco Corp. since the later 1950, where extensive linear and disc generator work was done, all dismissed the two decade long (1960-1980) non-equilibrium linear MHD generator data by the GE MHD group without any refutation of GE's experimental MHD data. As stated above, the Eindhoven group ran tests with a 5 MWt GE fabricated linear NHD generator that generated 7.5% enthalpy, non-equilibrium, power extraction at 2000° K stagnation temperature in a 1 minute-blowdown experiment without crediting GE's role.

The Critical Role of Electron-Molecule Collisions in MHD Power

MHD power is a function of the electrical conductivity that depends on the degree of ionization of the alkali metal gas seeded in the transport gas in the generator and accelerator. Ionization is a function of the electron temperature of the alkali seed electrons and ions. The electron temperature depends of the elastic collision cross-section of electrons with the transport gas, which in open cycle MHD are the products of combustion, and in closed cycle MHD it is the monatomic gas. Monatomic gases, e.g. helium, argon, can be considered as billiard balls with a collision energy loss of $(2\ m_e/m_a)$, where $m_e$ is the electron mass and $m_a$ the atom mass. Since this ratio is the inverse of about 2000, the electron energy loss is minimal and heating of several 1000° K are achieved, resulting in very substantial elevated electric conductivities.

In sharp contrast, electron collisions with molecules involve energy losses that also are elastic and comparable to those in equal weight monatomic gases. However, in addition there are electron collisions with molecular rotational quantum states, vibrational, and ionization states, each of which result in sharply increasing electron energy losses, which eliminate non-equilibrium ionization in gases from combustion product gases, but not all molecules, as discussed next.

Therefore, to evaluate their potential performance for MHD, the first step is to obtain accurate electron-molecule collision cross-section data. Such data collection has been on going at increasing depth since early in the 20$^{th}$ Century, and greatly accelerated in the second half of that Century, most of which is US Government sponsored research.

MHD researchers in the 1960s used the δ data reported in a book by Craggs and Massey—"Collisions of Electrons with Molecules" (Handbuch der Physik, Vol. 31/1, 1959): Although they reported that differences in the measured values for some molecules depending on the measurement method, the MHD community used only one set of values. The result was that decisions in the 1960s and 1970s on how much molecular gas concentrations could be tolerated in a noble gas before non-equilibrium ionization would be quenched were based on this one set of values of δ. Then when the steady state non-equilibrium MHD experiments that operated at under 3000° F. due to limitation of electrode gas heaters and due to the small size of the experiments, of a few centimeters MHD channel diameter failed to produce any results, the prime suspect was the molecules based on these values. However, it never occurred to anyone that maybe the electron-molecule inelastic collision cross-sections were much smaller and therefore operating the MHD generator at higher gas temperature, non-equilibrium ionization would be feasible, especially in some bi-atomic molecules, $N_2$, $H_2$. In revisiting this issue for the present invention, this Inventor found late 1980s papers by Japanese researchers who reviewed the very extensive research on electron collisions with $N_2$, $H_2$, $O_2$ and atomic oxygen, published in the Journal of Physical and Chemical Reference Data by the American Institute of Physics (AIP) under the auspices of the U.S. National Institute of Standards and Technology (NITS). The most interesting result of this massive review of the status on this field was that the collision data still was not complete.

The purpose of this comment is to emphasize that accurate data on the collision cross-sections is critical for MHD power applications. In the heyday of MHD in the 1960 the accepted wisdom was that only combustion of a fossil fuel at extreme temperatures of 4500° F. under equilibrium gas-electron temperatures was suitable for power generation, despite the harsh environment and minimal electric conductivity in the 10 Mho/m range. This required massive 1000 MW electric MHD generators for efficient commercial power plants. This narrow focus was compounded during the 1973 oil crisis by using only coal as the fuel. Non-equilibrium MHD was assumed to work only with noble gases with a nuclear heat source, and it required a purged refractory heat exchanger fired with gas as an intermediate development step to nuclear heat. Once coal became the energy salvation, every power system had to use coal, which for closed cycle MHD was doable but extremely costly due to the need for over one dozen massive heat exchangers for gas purge cycling, as reported in the governments ECAS study in the mid-1970s. It was known that other gases could be used, primarily hydrogen, but only under equilibrium conductivity at peak gas temperatures above 3000° K. That non-equilibrium MHD with bi-atomic gases, namely nitrogen and hydrogen might be used was not considered. This might not have been the case if more electron-molecule collision data had been available. Even now, four decades later there is no freely and readily available cross-section data. Therefore, this invention discloses using metal fuels at high enough equilibrium gas temperatures to enable efficient MHD power, followed by gradual temperature reduction in the hydrogen or nitrogen to determine feasibility of non-equilibrium MHD.

The use of cesium-seeded hydrogen at high temperatures of 3000° F. and above was considered for pulsed power MHD, as cited above in this Inventor's U.S. Pat. No. 4,851,722 However, it was not considered as a continuous long duration power source, and certainly not with nitrogen, whose electron loss factor δ is about double that of hydrogen in the patent.

While staring them in the face, MHD researchers in the entire non-equilibrium research field four decades ago overlooked the significance of the huge difference between δ in bi-atomic molecules, such as nitrogen, oxygen, hydrogen, whose values are less than 10, and heteroatomic molecules, such as CO, whose value is over 100, and NO with values of 1000, and $CO_2$ with values of several 1000, all of which are products of fossil fuel combustion. MHD researchers recognized this difference in the 1960s, as evidenced in two important MHD books by Rosa and by co-authors Sutton and Sherman. They both cited the δ data in Craggs and Massey in "Collisions of Electrons with Molecules" (Handbuch der Physik, Vol. 31/1, 1959). Nevertheless, Rosa stated: "Because of the high values of δ there seems very little hope of inducing useful non-equilibrium effect in molecular gases" (emphasis added by this Inventor). What Rosa certainly had in mind were products of fossil fuel combustion, as did all others. The result of this statement was to steer away non-equilibrium MHD researchers from considering diatomic gases as a seeded MHD working gas.

The MHD Generator-Accelerator:

Another benefit of using the MHD generator to drive an MHD accelerator is that the gas exhaust from the MHD accelerator still contains substantial additional thrust that can be used as it expands into the atmosphere or into Space.

A metal oxide heated, cesium seeded nitrogen gas flowing through a MHD generator at 4300° K stagnation gas temperature that is designed to extract one-half of the stagnation enthalpy, would reduce the gas temperature at the generator exit to about 2150° K. This would reduce the equilibrium electrical conductivity to less than 1 Mho/m, which cuts off power, unless non-equilibrium ionization could be applied to the cesium-seeded nitrogen. If equilibrium power is still desired the MHD power that drives the gas in the MHD accelerator, must be reduced by reducing the enthalpy extraction to about 25%, which yields an exit temperature of about 3225° K, and at roughly 2 atm. static pressure (from 10 atm stagnation) and an equilibrium conductivity of about 80 Mhos/m, more than enough for MHD power.

Powering the MHD accelerator is much simpler. In an MHD accelerator the transverse load factor K is negative, and the generator electrodes drive the accelerator electrodes. Assuming a K of (−1) yields a power input in the term (1−K) equal to minus 2. (Note: The electromagnetic force vectors are governed by the "right hand rule: in which current, velocity, and magnetic field, J×U×B, are orthogonal. Therefore in the MHD generator, the force on the gas velocity is upstream. Therefore, in an MHD accelerator, B must be directed 180° opposite to the MHD generator direction in order for the J×B force to face downstream. If the same magnet is used for the MHD accelerator and generator, the applied voltage K must exceed the induced Faraday voltage U×B. In the calculations in this section it is assumed that K and U×B are in the same direction to show the MHD potential. This reversal can be done by reversing the voltage and current direction by 180° in the magnet that covers the accelerator section of the channel.

Since a high velocity is desired to increase acceleration, M=2 is assumed, which yields a static temperature of 0.6280× 3225° K=2016° K.

So for $N_2$ with γ=1.3, $(1-K)^2=4$, $M^2=4$, $β_{eff}^2=4.41$ at B=4T, δ=7.8, equation (2) yields $T_e$=4.92*$T_o$=4.92×3225° K=15,867° K. The electrical conductivity with 0.1% cesium at this electron temperature would be 6,000 to 8,000 Mhos/m. Even using the static gas temperature, $T_g$, of 2016° K, in place of $T_o$ in equation 2, yields $T_e$=9,919° K, which yields a $σ_3$ of 2000 Mhos/m with 0.1% Cs. The gas velocity at 2016° K and M=2, is 1310 m/sec. and the acceleration power density into the $N_2$ is $P_{in}=σ_3U^2B^2K(1-K)$=110,000 MW/m³. This number is unrealistic because one cannot take out more power than power put in, in this case. Therefore, one could use either 628 MW/m³ with $σ_1$, or 2198 MW/m³ with $σ_2$. for a conservative estimate.

To repeat the statement in the 3$^{rd}$ paragraph above, it is assumed that in this accelerator, the magnetic field is aligned to induce the U×B voltage vector in the same direction as the applied electric field. This requires the field direction in the upstream MHD generator to be flipped 180°, whose feasibility depends on the space between the accelerator and generator. Alternatively, due to the high power density the MHD generator could be inserted in a parallel channel whose outlet gas would be directed into the accelerator channel. Or, another alternative is to have the applied voltage exceed the induced voltage.

However, there is an even more interesting alternative. It has been established by this Inventor and confirmed by other MHD researchers, such as the Eindhoven University MHD Group, of the existence of "streamers" in the transverse interelectrode directions that generally follow the electrode segmentation. Those researchers considered streamers an adverse effect and decided to switch their non-equilibrium MHD research to the disc generator, as did Japanese and others in the US. The disc has two flaws. One, there is no assurance that circumferential streamers are not worse in large generators in that they may concentrate at one radius. Two, they cannot be used for efficient MHD accelerators due to the need to change direction of the flow three 90° turns. In this inventors research no adverse performance effects from transverse streamers were observed in numerous shock tube MHD tests. More important, the streamers are certainly regions of elevated electric conductivity. Therefore, if the applied voltage to the accelerator could be synchronized with the streamer frequency the applied current inside the streamers would be enhanced which would enhance the J×B force.

Even with 50% enthalpy extraction, which results in a static gas temperature of 1350° K, yields a $T_e$ of 6,642° K, and $σ_4$ of about 400 Mhos/m. Here $P_{in}=σ_4U^2B^2K(1-K)$=22,000 MW/m³, which is again much too high, but it shows that MHD acceleration can cover a very wide energy range. However, in this case non-equilibrium ionization is essential in the upstream MHD generator.

The point of these accelerator calculations is to show that the accelerator is not the limiting "showstopper". It is the generator that must provide sufficient power to drive the accelerator. The metal fuel heat source provides the power for high ship propulsion applications far better than nuclear. These calculation examples show the huge advantage of MHD power and MHD acceleration for land, sea, air, and space transportation over other forms of power, and also show that metal fuels used for transportation by transferring the very high temperature metal oxide products of combustion to the MHD working gas are a far superior power source than direct use of fossil fuels and even very high gas temperature pebble bed nuclear MHD power generators and accelerators.

A critical requirement for metal fuel use is the capability of recycling the metal oxide products of combustion that result from using dry air as both the metal oxidizer and MHD power gas, by using the energy from a unique coal fired power plant that yields hydrogen to reduce and recycle the metal oxide into metal and metal hydride MHD power fuel and acceleration fuel.

An even more important advantage of MHD with metal or nuclear heat sources is that the ships would not need any oil for propulsion. This is a major step to moving the USA to real oil independence in the transportation sector to which there is no apparent solutions.

The advantage of the disclosed power systems derives from understanding the role of thermodynamics and heat transfer in power cycles, both for stationary and for transportation. The efficiency of a power cycle increases with peak temperature, which is known to all students of the thermodynamics of power cycles. What is widely overlooked is that the key challenge of power cycles is transferring the heat from the source to the power cycle working fluid.

The most thermodynamically inefficient cycle is the water-cooled nuclear reactors. Uranium has an astronomical power density. However getting that out to the steam turbine is the barrier problem. The result is low peak temperatures and very low efficiencies. As a result 10,000 ton, nuclear submarines have surface speeds of only 20 knots. Nuclear power on the surface has been limited to huge, 90,000 tons aircraft carriers, with speeds of 35 knots. Nuclear powers on 10,000-ton cruisers at 30 knots in the early 1960s were almost immediately withdrawn.

For the past one-half Century, the high-speed ship solution has and continues to be the gas turbine, which has two deficiencies. One is its use of petroleum fuel, which everyone wishes to reduce or even eliminate. The second is the high peak temperatures reported for modern turbines overlooks the need to cool the turbine blades as the peak gas temperature reaches 3000° F. to the point that high excess air is needed for cooling. While it may not considerably reduce the overall Brayton cycle efficiency, the excess air of up to 300% to cool the turbine blades dilutes the $CO_2$ in the exhaust to 3% or less, which makes $CO_2$ separation from the $N_2$ and $O_2$ uneconomical. While that may not be a barrier to transportation currently, it will be when ceilings on $CO_2$ emissions are enacted and $CO_2$ from transportation will also be included. The current MHD power plants disclosed herein have zero $CO_2$ emissions.

As stated above, there is another greater thermodynamic benefit in the Brayton cycle with the very high temperatures of 5000° F. in metal fuels or nuclear reactors over gas turbines that are limited to substantially lower peak temperatures of under 3000° F. Namely, the gas compression power occurs in both cycles at near ambient temperatures and consumes about the same power per gas mass flow rate. However, up to 50% of the gas turbine output is used for compression, while for metal fuel or nuclear heat sources that ratio can be as little as 15%.

Large Mono Hull, 100 Knots Ships for Humanitarian and Defense Purposes

One aspect of this Application is the use of MHD generators/accelerators with a nuclear reactor or metal fuel heat sources for high-speed ships was discussed. It was shown that the only large ships of 20,000 tons with the potential of achieving 100 knots were the flat bottom surface effect ships, but with limited range and load even with eight (not yet commercial) GE90 gas turbines propulsion, with a total 1,430,670 hp (1067 MMW) power.

In contrast, MHD generators can readily provide considerably more power in a single compact generator system. The generator will be directly connected coaxially to an MHD accelerator that in turn is connected to a coaxial nozzle that exhausts to the atmosphere to propel the ship.

Alternatively, the MHD generator's output would power DC motors connected to the ship propellers, or to pumps driving water jets to propel the ship.

The MHD system heat source can be a gas cooled high temperature, (2000° K to 3000° K) refractory, nuclear pebble bed reactor. Alternatively, and preferably, the heat source could be certain metals combusted with oxygen in air to form liquid metal oxides that heat the nitrogen and excess air to temperatures from 3000° K to 6000° K and their exhaust propels a ship.

Of these options the last one is much preferred because it provides the highest direct thrust to the ship as it directs the axial jet exhaust of the heated nitrogen/air mixture that could exceed even MHD propulsion due to the higher gas temperature achievable with metals while avoiding the nuclear radiation disposal issues. However, the MHD option could still be used with a metal fuel combustor or nuclear heat source if electromagnetic enhanced electron ionization yields a electromagnetic force on the seeded gas that exceeds the momentum achieved by gas dynamic exhaust only.

In reviewing the work on the present invention, which began considerably before two events in March 2010, the earthquake and tsunami in Japan, and the conflict in Libya, this Inventor noted that the ship propulsion aspects would be an excellent new application for large monohull 100-knot ships. These two incidents are representative of current problems facing the World that large 100 knot ships could assist in resolving by rapid arrival at unanticipated trouble spots. Unanticipated problems require almost immediate international assistance. In the earthquake and tsunami in Japan situation, roads to the disaster zone were destroyed and immediate large quantity assistance of medical, food, shelter, were needed, and the government was not able to respond, even though Tokyo was only 100 or so miles away. Yet a 100-knot ship could cover 5000 miles from the US West Coast to Japan in 2 days. Also, the distance from the US East Coast to Tripoli would also take less than 2 days. However, to have any significant impact it would require large mono hull ships. These ships must have an extremely thick steel structure or they might break up in heavy seas at that speed. The one group of ships that fits this requirement are war ships, especially WWII battleships, of which the Missouri, New Jersey, Massachusetts, North Caroline, Alabama, and Iowa are now dockside museums, some in their respective name States. They could be retrofitted with MHD power and metal fuel power trains, as well as structural modifications necessary for high speed. The battleships armed with their 16-inch guns, could suddenly appear at the shores of Tripoli, where US marines appeared in 1805 to save Americans from imprisonment by pirates. This could probably end hostilities with one full 16-inch battery salvo into the Sea. They could also perform this function in pirate-infested waters, supported by smaller 100 knot littoral warships. To this list can be added, the liner SS United States whose heavy steel plate was constructed for wartime use. More important this ship, which was constructed with Navy use, and the battle ships are certainly strong enough to withstand high seas at 100 knots. Also, the-1000 foot length is not susceptible to up and down motion in moderate seas with waves under 10 feet tall that would be unsuitable for passenger transport in small under 10,000 tons high speed ships. In fact, the SS United States was designed for moving an entire division of 15,000 soldiers 10,00 miles at high speed. Similarly, these ships could be a platform for all sorts of humanitarian relief. Most important, these ships would serve as a low cost platform to introduce the disclosed high power propulsion technology in this Invention. To demonstrate the propulsion issues, the SS United States parameters discussed above, are used.

In reviewing some of the data on the SS United States two important apparently unrecognized technical specifications that can lead to erroneous conclusions, were uncovered. One is the implicit assumption that the measured propellers ship horsepower is a direct measure of the ship's propulsion force. The second is the confusion caused by authors of early $20^{th}$ Century engineering textbooks of using the term "lb" with irregular specification as to whether it is "lb force" or "pound mass", the difference being "g" the acceleration of gravity, 32.2 ft/sec². While this is done in many cases with a subscript, in most case the authors excuse this omission on the ground of "obvious". However, in low or no gravity space applications the earth "g" or the space "g" are used interchangeably without explanation. To this must be added the liberal use of different units for the same or similar function, such power for hp, ft. lb. watt, BTU. The relevance to all this occurred in preparing this Application in one case when after considerable puzzlement on the low value of the momentum tern compared to the pressure term in the Thrust Function, F, the Inventor discovered that he used the "g" term twice, first for seconds and then again after conversion for hours. Therefore, it is emphasized that the numerical values herein are meant to illustrate the concepts claimed herein, but it is implicit that experts in the field will recognize the novelty disclosed from the description and claims, and excuse any error in unit conversions.

To demonstrate the application to 100 knot speed in large single hull ships, the above data on the SS United States is used with slight differences from another source. The ship has a 50,904 short ton gross tonnage displacement. The oil capacity is about 11,500 Short Tons (ST), and cargo 6325 ST. As stated above, at 35 knots, 5587 tons of aluminum plus the $O_2$ from 90% of the $Al_2O_3$ that stays on board results in an end fuel waste weight of 9495 tons to the ship versus the original 11,500 tons of oil.

The 100 Knot Ship.

The above shows that aluminum is preferred, even to duplicate the SS-US performance, mainly due to its 80% heat used for propulsion out versus 30% of the heat from steam power, and its much more compact density. However, the objective pf this invention is a 100 knot ship. So before proceeding with the fuel issue more discussion of ship design is needed.

The original SS-US ship design had 240,000 hp (179 MW). The 1997 analyses (See FIG. 5) by naval architects calculated that its original hp could be reduced by 29.5% at 35 knots by adding a "bow bulb"; a "Stern Flap"; high strength steel; and "contra-rotating propellers". These changes would increase the speed to 45 knots (29% more) with 600,000 hp (448 MW). Without these modifications would require 900,000 hp (671 MW). If the propulsion power followed the general rule of being proportional to the cube of the speed ratio, which would be $(45/35)^3=1.286^3=2.115$, or 341,570 hp. However, the 1997 estimate was (900,000/161,55)=5.57 times, namely the $7^{th}$ increase in power for the 45 knots speed would be needed. This high power is out of the question for the 30% efficient steam turbines or even for the 50% efficient gas turbines unless a gang of six (6) not yet commercial GE90 gas turbines would be used, as proposed for Surface Effect flat bottom single hull ships. However, an MHD power density of 628 MW/m³, (842,000 hp) cited above, could achieve the needed power in a single channel. With the modifications, cited above, that would reduce the hp to (600,000/161,500)=3.715. This is for 45 knots. However, 100 knots appears to be clearly out of the question with conventional steam or gas turbines and oil fuel. As discussed below, the present invention might achieve 100 Knots.

Another rule for monohull ships is that the speed has to be designed to meet the "Taylor quotient" (TQ), which is an empirical term of the ratio of speed in knots divided by the square root of the ship's length in feet, with a design target of less 1.3. This will keep the power necessary to increase speed below the cube of 3. The SS Unites States is 940 ft long. At 35 knots, its Taylor quotient is 1.14. It is 1.3 at 40 knots, and the speed ratio is (40/35)=1.143. From the cube speed ratio, the ship should require at 40 knots, $1.143^3=1.493$ times the 35 knots power, namely 241,200 hp. Instead the 1997 analysis estimate was 375,000 hp. At 45 knots, the Taylor quotient is 1.47, and the power from the cube rule should be $(45/35)^3=1.286^3=2.115$, or 341,570 hp based on the cube power rule. Instead the power is 5.57 times greater than at 35 knots, and (900,000/341,940)=2.63 times greater than the cube speed ratio.

It is again emphasized that the much higher 80%, heat input to propulsion output in this invention is made possible by the higher 4000° F. metal combustion, as well as the axial gas flow from the combustor to the propulsion exhaust. The direct axial thrust from the gas heated by the liquid metal oxide droplets leaving the ship as jets at high velocity. The thermal energy of the fuel is directly converted into an axial jet thrust, as in a ramjet. This is unlike data on ships shows, whatever the design or the power source, its means of power transfer to the ocean involves intermediate steps, such as rotation in steam turbines, gas turbines, gears, motors, pumps, propellers, all of which involve power losses. In spite of these losses, ship performance is always reported as ship speed versus shaft horsepower (shp), which presumably is measured as the torque on the propeller shafts, without any information on the power losses in the intermediate step upstream of the propeller shaft and downstream from the propeller shaft to ship's thrust. Even the energy loss from the heat source, the oil fuel or nuclear reactor, which if given, is placed in a separate location on the ships performance data in the literature. It is, therefore, difficult to determine what factors affect the overall efficiency from fuel to speed. The format used to generate FIGS. 3 and 4, especially FIG. 4 with its overall Transport Factor (TF) that is broken down into three subsets for fuel, design, and cargo provides some clarity, as does FIG. 5 on the SS United Sates. FIG. 6 is of special interest in that it shows as of its release date by the Navy that even in the future, propulsion power above 300,000 shp would not fit inside a long 50,000 ton ship with a displacement monohull (the standard ship design with a deep V type hull). The best estimates of top speed in large ships, is 50 knots, and maybe 60 knots in planning mono hulls that have flat bottoms, but do not hydroplane as SES. Therefore, one can conclude that 100 knots in large mono hull ships, and even multi hull are not on the horizon. Even SES, that can theoretically achieve 100 knots have questionable sea worthy-ness in large ships. Most on the high speed development took place in ships in the 1000s of ton range.

In sharp contrast, in metal fuel combustion with or without MHD generator-accelerators, energy is transferred directly from the heat source to the gas exhaust thrust, thereby bypassing all intermediate losses. Furthermore, their high operating temperatures offer high total power, high power densities, and high heat source transfer efficiencies, all not attainable elsewhere. On top of this, even the high 56% overall cycle efficiencies reported for nuclear heat source MHD generator, is not the upper limit in efficiency for energy transfer from the heat source to thrust to a ship. Furthermore, as noted above, the very high peak gas temperatures attainable with the metal fuels (4000° K to 6000° K) means that even at high pressure ratio, as high as 40 to 1 and even up to 100 to 1 means that the ratio of compressor power to total power is very low, about 15% in a 40 to 1 ratio and not much higher at higher pressures. This compares to 40% to 50% in gas turbines that operate at much lower peak temperatures.

Therefore, the key advantage for propulsion in the present invention is that almost the entire thermal input to the gas is converted into thrust. For example, with aluminum combustion in air at 4000° K and 40 atm, and only 15% for compressor power and assuming 5% for heat losses, as much as 80% of the fuel heat input could be available for propulsion thrust. This aluminum fuel method was applied to the SS United States for its 12,000 mile range and its commercial 240,000 hp above, and it is shown as feasible.

The above calculations show the major advantages of the disclosed metal fuel ship propulsion system compared to steam power propulsion on the SS United States, which was and remains the most advanced steam turbine propulsion system, and whose performance would only modestly be improved with gas turbines. However, the enormous advantage of the disclosed propulsion is that it can substantially increase the top speed of a large monohull ship, and potentially achieve the 100 knot goal of the Navy and commercial fleets with the present power system and with modest hull modifications. The reason for selecting large battleships and the SS United Sates is they have the reinforced structural steel hulls to withstand the rough seas on large ships at these high speeds.

It was already noted that there is insufficient information to relate the shaft horsepower (shp) of a ship to its forward driven thrust. For example, the SS US's 240,000 hp converts to 130,194.489 ft-lbf/sec, and dividing the top ship speed at full power, 66.6 ft/sec, yields 1,954,188 lbf. Now using the force in Newton's Law of Motion and the ship's 53,3000 short tons yields an acceleration of 2137 ft/hr or 0.35 knots, or 4.2 knots in 10 hours, which makes no sense because it would mean that the ship's maximum speed is higher.

What is more puzzling is the extensive Navy literature that was reviewed in preparation of this invention on high speed ships only considered advanced marine gas turbines, with no reference to other power sources. As stated earlier in this document, this runs counter to the nearly 200 years record of innovation in ship propulsion. One possible explanation advanced here is the apparent failure to consider the common elements of fluid mechanics of ships and airplanes. This point was made in an in depth discussion of ship and air propellers by Ludwig Prandtl in his "Essentials of Fluid Dynamics-With Applications to Hydraulics, Aeronautics, Meteorology and other Subjects", (Authorized English Translation, Hafner Pub. NY, 1952). The relevant issues to this invention are the propeller fluid mechanic inefficiencies, and propeller tip limitations around the speed of sound that limit its diameter and its thrust. Prandtl in Ch. III, Sections 19-20 discusses the different designs of an air propeller, low-speed and high-speed marine propellers. He states that the most important propellers are the "paddle wheel" and the "screw propeller", which is the order that these devices were introduced for ship propulsion in the first half of the $19^{th}$ Century. Their function is to accelerate the water flow in the direction of the ships motion. While Prandtl does not mention the "water jet" which is now the direction taken by the Navy for high speed ships, it is hinted at in a footnote that mentions the jet for jet propulsion and rocket propulsion, both of which perform the same propeller function in that combustion accelerates the air in a jet or on the combustion products in a rocket. However, the water jet is less efficient than the combustion jet because acceleration is by a pump's rotating vanes. While the propeller theory is presented in depth in his book, no examples are given. However, after reviewing the propeller chapter, the significance of the limitations of propellers occurred to this Inventor from a graph cited in "Gas Turbine Analysis and Practice" by B. H. Jennings and W. L. Rodgers (McGraw-Hill, NY 1953), FIG. 7-11 by Godsey and Flagle in "Westinghouse Engineer" (Vol. 5, pp. 121-127, July 1945). It is reproduced here as FIG. 7, which shows the "Power Required" and "Power Available" for a single engine airplane power by a "piston engine driven propeller" (solid lines) or a "jet engine" (dashed lines). It is clear that the propeller hits a wall at about 450 mph, which is identical to a ship propeller barrier at around 40-50 mph. The jet engine barrier in 1945 was Mach 1 at a little over 600 mph. While it is unlikely that the propeller can be pushed faster with more power, the jet engine can be pushed beyond Mach 1 with more power, and substantially well beyond Mach 1 with a ramjet.

This method in the present invention provides the power from metal combustion or nuclear heating either directly to the gas thrust or through the MHD generator-accelerator without any redirection of the inlet and outlet axial gas flow.

Figure 7:
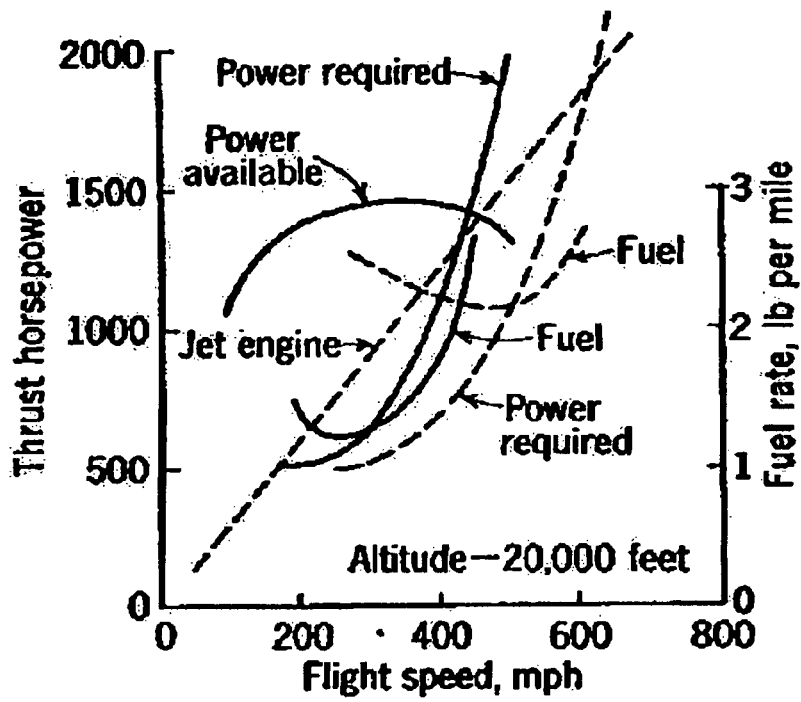
FIG. 7 shows the power required and power available for a single engine propeller airplane (solid lines) and jet engine (dashed lines) as well as fuel consumption for each engine, as reported by Godsey and Flagle in "Westinghouse Engineer".

The design changes in a ship include noise attenuation by providing soundproofing to crew and passengers. Most important are the modifications needed to a displacement (i.e. with a keel) mono hull, some of which have been mentioned by naval architects as stated above. Their objective was to reduce the drag on the ship in order to increase the speed from 37 knots to 45 knots. The most important ones were a bow hull and a stern flap, which lowers the ship's water line. Therefore, to further increase the speed to 100 knots the water line should be lowered more. Now earlier it was suggested that in addition to the cited four modifications, the power should be increased from the suggested 600,000 shp (448 MWe) to 1000 MW power to reach 50 knots. However, based on the Prandtl discussion on propellers, it is almost certain that the actual shp that moves the ship is certainly less by some unspecified amount below the 600,000 shp. To determine the transmission loss, Prandtl recommended experiment. This could be quite significant because FIG. 7 shows the power needed for the jet plane (dashed line) is lower than for the propeller (solid line) even down to 300 mph. This shows that direct thrust is more effective than by indirect thrust by propeller. The fact that the fuel consumption is higher for the jet only means that in 1945 combustion efficiency in a high-speed gas flow at many 100s mph was probably inefficient compared to today. However, in the present case of jet flow in a 100 knot ship, there should be sufficient time to complete combustion and heat transfer from liquid and solid metal oxides or nuclear reactor cores. Also, the thermodynamic cycle efficiencies in the gas turbine are at best 50% and in addition there are the engine to propeller or water jet losses. So the 80% heat to gas thrust efficiency in the present invention is not unrealistically optimistic. It should also be substantially more efficient that a ram jet or rocket where the combustion time is much shorter.

To determine how much power is needed to drive a large monohull ship one can compare the SS United States monohull with the same displacement weight SEV, which skims on the surface of water with far less drag. To emphasize this point, note that Table 1 contrasts a Displacement Monohull, the SS United States, with eight surface effect ships, (SEV) at the same speed and similar displacements.

At 37 knots, the SEV requires 59% more power than the monohull. This is unexpected because the drag on a monohull should be substantially more than a SEV that skims the water. A plausible explanation is at low speeds the lift on an SEV is low. This also explains why jet plane efficiency is lower than propeller efficiency below 400 mph, as shown on FIG. 7.

At 45 to 48 knots the power is the same, but the range of the SEV is only 40% of the monohull, which shows that the SEV energy efficiency is substantially lower than the monohull.

One can conclude that as the speed increases, the lift of a mono hull improves, just as is it does in a jet powered airplane. This calls into serious question the apparent conclusion that the road to 100 knots is the SEV and not the monohull. Some support for this question can be deduced from the SS United States analysis up to 45 knots (FIG. 5) that shows attaching bow and stern lift enhancers reduce the power required at 45 knots by 33%. One may conclude that monohull ships may be better candidates for high speed than SEV, and they are certainly much more stable. However, as speed increases toward 100 knots, even monohull ships would require side stabilizers such as used by Pacific Island natives to prevent the ship from capsizing. Also the ship should be steered perpendicular to high waves, which presumably mariners knew since ancient times. To benefit from these insights, the solution is direct thrust propulsion from compact metal fuel combustion or high temperature gas cooled nuclear reactors that can deliver up to several 1000 MW of thrust in a compact size. These power and structural modifications would enable the SS United States to cross the Atlantic from Ambrose Light, N.Y. to Bishop Rock, UK, in 30 hours and recapture the Blue Riband that it won in 1952 in crossing in 83 hours. It is absolutely amazing that in the large effort to develop high-speed ships, the power source was limited to gas turbines, which cannot achieve the power levels needed to exceed 50 knots in large monohull ships, much less 100 knots.

To show that several 1000s MW thrust power can reasonably be expected from metal fuels, the case of aluminum combustion in air is cited with the understanding that magnesium can accomplish about the same result. To avoid more that 10% metal oxide loss in the propulsion gas exhaust, $N_2$ and air, the vapor pressure of the oxide must be less that a few percent. The percent vapor pressure is reduced as the total gas pressure increases. Therefore, aluminum oxide and magnesium oxide are limited to about 4000° K at 10 atm, and to 5000° K at 100 atm, where their vapor pressure is low enough. For beryllium oxide or zirconium oxide at 100 atm the limit would be about 6000° K.

Again the SS United States is used as example.

Note in Table 1 that the 117 knot SEV displacement is 25,620 long tons (LT). However, what is left unstated is that this weight is the result of using gas turbines limited to 1,430,670 hp (1,067 MW). With the metal fuel or nuclear MHD power, the 43,740 LT SEV would require 171% more power to 2,442,525 hp (1,822 MW), as weight is the primary power increase factor. Since the SEV is elevated above the water, the increased drag on the larger ship should not be a significant factor. However, as will be shown next, weight is not the primary factor in displacement hull ship, it is the surface area of the ship below the water line that is in contact with the sea.

Even if a super gas turbine were available, for 11,500 miles at 161,500 hp uses 11,500 short tons (ST) of oil at 35 knots that equals 399,300 cu. ft. or about 25% of the SS-US 50,000 ST (1,562,500 ft$^3$) displacement. As shown above, hp to the ship's screw propellers uses only 30% of this oil energy. The rest is lost to the combustion exhaust in the stack (20%), plus additional losses in gear reduction, in turning the centrifugal flow axially, boiler losses, steam turbine losses, etc. These losses are less for gas turbines in that they convert heat into axial propulsion. However, all the directional flow changes in the compressor and turbine as well as the nominal 2500° F. peak temperature limit the axial thrust to at most 50% of the heat input. This explains the huge advantage of the slagging combustor with and without MHD propulsion in that the fuel energy is converted directly into thrust at about 80% efficiency and high gas temperature, which also reduces the compressor power to 15% of output vs. 50% in gas turbines.

To apply the above to the SS-US ship at 45 knots over 12,000 miles would require 900,000 hp at 45 knots, or 3.75 more power than the 240,000 hp at 37.25 knots, or 5.6 times more shaft power, shp, from 161,500 hp at 35 knots. 240,000 hp (179 MW) at 37.25 knots (See FIG. 5) requires 611 MMBtu per hour, and oil at 37 MMBtu/ton, results in 16.5 tons per hour. To cover 12,000 miles at 37.25 knots requires 280 hours or 4622 tons of oil. With 50% efficiency, the total oil is 18% of the ship displacement. The ship's oil storage is 11,500 tons of oil, or 22% of displacement. However, cargo and oil loads limit the speed to 35 knots.

So an increase of only 7.1% in speed requires an incredible 49% increase in shaft horsepower (see FIG. 5). However, that 161,000 ph is presumably delivered to the propellers with additional losses in turning the radial flow axially.

To achieve 45 knots on the SS-US with the "1997 Improvements" the power would be about the same 600,000 hp as the SEV (Table 1), and would require with 30% efficient steam power, 3.72×11.500=42,780 tons of oil, equal to 86% of the ship's 50,000 ton weight displacement. With 50% efficient gas turbines the oil use is 25,668 tons, 51% of the ship's weight displacement.

Now turning to the 100 knot ship and keeping the same range of 12,000 miles one finds from Table 1, an SEV with the same displacement of 49,000 ST requires 1,430,670 hp (1067 MW), to yield only 74 knots and only 6600 Statute miles. Also, this requires eight (8) non-existing GE gas turbines, which at 50% efficiency requires 2134 MW, and 77.6 hours to cover the 6600 miles. Oil heat is 37.5 MMBtu/ton, so 2134 MW (7283 MMBtu/hr) equals 15,070 tons, and 31% of the ship displacement, and for 12,000 miles it is 56% of displacement. But that is for 74 knots. For 100 knots, oil use is 77% of ship displacement, which would turn the ship into an oil tanker. With 30% efficient steam turbine power high speed is not feasible. The lesson of this is that the approach of changing ship design for high-speed large ships is fruitless. The answer is more power, as shown next.

The following shows how more power can be achieved with the above 37.25 knots S.S. US with aluminum beginning with 240,000 hp (179 MW) by direct thrust in from a slagging combustor that converts 80% of the thermal input of 224 MW, or 764 MMBtu/hr. Aluminum at 4000° K has a heat of combustion of 28.12 MMBtu per short ton. This yields 27.2 short tons per hr for a total 7,619 ST in 280 hours for a range of 12,000 miles. This compares with 19,270 ST of oil with 30% efficient steam turbine power, which uses 39% of the ship's displacement volume, and 168% of the oil tank capacity. The oil is even 6% more than the ship's oil and freight capacity of 18,600 ton. Now if 90% of the Al to $Al_2O_3$ product remains on board at the end of 12,000 miles, the total metal oxide weight would be 12,952 tons. More important is that using aluminum fuel frees up ship oil volume space. The oil's 57.6 lb/ft$^3$, compares with 168.8 lb per ft$^3$ for Al and 247.7 lb/ft$^3$ for $Al_2O_3$. Now the ship displacement volume is 1,562,500 ft$^3$, of which 19,270 ST of oil equals 670,000 ft$^3$ or 43% of displacement. In sharp contrast, the Al fuel requires only 90,273 ft$^3$, which is only 8.1% of the oil volume. Assuming 90% of the final $Al_2O_3$ remains on board, its 19,252 tons would occupy 104,580 ft3, which is 9.4% of the oil volume. Now this assumed a 100% packing factor. If both the Al and the $Al_2O_3$ are finely ground into micron dust, the packing factor would double but still remain below 20%. By grinding the Al on board and reprocessing the oxide on board ship with a small nuclear reactor, the volume would remain below 10%.

The specification is meant to teach how to practice this invention, not to design a ship, which experts can accomplish (those skill in the art would understand) on reading this invention. It is obvious that no one thought high-speed, large ships beyond the use of gas turbines or steam turbines for higher power in the prior art, which solely focused solely on various ship designs.

The current Baltic Exchange bulk rate for ships is about $0.60 per Long Ton per day. So at 37 knots and 10,000 nautical miles, a 11 day trip would cost $6.6/LT, or $5.94/ST, and the weight saving would be $66,867 for the trip. But the freed volume from the replaced oil is even greater assuming a low density cargo like oil would allow loading an additional 13,270 tons of cargo at $78,723 for a combined $145,691 added revenue, even if the ship draft will increase by several feet. However, with the metal fuels the speed will be much higher, up to the 100 knot range, which would make ocean shipments much lower in cost than airfreight. In fact the US Navy could return to the days of sailing war ships where the considerable empty space from "renewable" wind power was used by the UK East India Company to ship cargo in warships when not needed. In the era of steam ships this dual use was not available due to the coal and large steam power plant that left no room.

The above cargo issue is meant to alert the ship owners that reducing fuel use reduced not only fuel cost but adds cargo revenue, even if the ship does not travel at 100 knots.

Another important note is that the above calculation assumed that all the oxygen in air reacts with the metal to form the metal oxide droplets that heats the nitrogen in said air to provide the vehicles thrust. However, depending on thee thermal conditions there may be more energy released by the metal oxide than needed to reach the desired nitrogen end state. In that case, excess air is heated to provide the desired end state, as example in the following example:

Combustion of the aluminum to 4000° K and 40 atm requires 146 MMBtu/hr to heat the metal oxide $Al_2O_3$ product. This leaves 617 MMBtu/hr for heating 158,855 lb/hr of nitrogen left after the oxygen burns the aluminum and 153,178 lb/hr of excess air, all heated to 4000° K.

Now compression of all the air in 3 stages with ambient temperature intercooling requires about 15% of the total heat input to achieve 4000° K at 40 atm. It is assumed that the compression power is supplied by steam power from low temperature waste heat recovered from the nitrogen and air thrust to the ship. At Mach 1, the static temperature is 6261° F. from a stagnation temperature of 7200° F., which results in a velocity of 3,735 f/s at the Mach 1 nozzle throat. Isentropic expansion of the gas to the 14.7 psi atmosphere results in an exhaust Mach number of 3 and a static temperature of 3064° F., more than enough to use part the gas for steam production to drive the air compressors. The exhaust thrust for expansion at a constant specific heat, and a ratio of specific hears $\gamma$ of 1.3 equals $3.822 \times 10^8$ lb force/ft$^2$/hr at the nozzle throat at Mach 1, and $4.923 \times 10^8$ lb force/ft$^2$/hr at the nozzle exhaust at 1 atm and Mach 3 from the combined static and momentum forces.

Now the 240,000 hp converts to 130,194, 489 ft-lb/sec, and dividing by the Mach 1 throat velocity of 3,735 f/s yields a lb-force of 34,858 lbf/ft$^2$ per second, or $1.255 \times 10^8$ lbf/ft$^2$ per hour. Now the force of the nitrogen and air mixture of 312,034 lb/hr through the nozzle throat at 3,735 lbf/s is $1.16 \times 10^9$ lbf. So a circular nozzle throat of 2.4 ft$^2$, and 12.4 ft$^2$ at the Mach 3 exit could pass the gas flow thrust to move the modified SS United States at 39.5 knots, which is small and is certainly much more efficient and far less costly that all other reported solutions. Also, it does not require imported oil, has no $CO_2$ emissions, and is thus entirely renewable because the aluminum oxide is recycled to aluminum to yield zero emissions from the coal or naturals gas power plants designed according to this Inventor's cited background US patents, or even nuclear reactor. On top of all this, the results form a calibration basis for all other terrestrial energy and motion needs, and lays the groundwork for moving Earthlings to the moons, planets, thereby continuing mankind's explorations since the beginning of their time on Earth.

The next question is what is needed to move displacement monohull ships at 100 knots?

Of the many Navy sponsored studies on high speed ships one mentioned already above is by John McMullen Associates (JJMA), edited by Chris B. McKesson, dated Feb. 13, 1998 entitled the "Hull Form and Propeller Technology for High Speed Sealift" from inputs by many naval architect experts. Included are data on the SS United States shown in FIG. 5, and data on SEV ships.

However, as already noted above, the solutions disclosed in the present invention differ totally from all the studies in the JJMA Report, which focused on ship design, while the present invention focuses on achieving very high propulsion power with metal fuels and nuclear power by direct thrust or by MHD power and acceleration. Also, the present focus is on monohull ships due to their much greater displacement and seaworthiness, and due to the ability to retrofit the disclosed propulsion to many existing ships, as explained next.

As already noted above, due to the extensive analyses and testing on various hull designs, the large monohull SS United States is compared herein to an equal size SEV, which at 117 knots and 43,740 long tons full load displacement would require 2,442,525 hp (1,822 MW) of propulsion power (See Table 1). This assumes the scaling based on ship size is a reasonable measure in the absence of test data. This power is exactly 10 times the power of 240,000 hp for 39.5 knots. Now the heat of formation of $Al_2O_3$, namely, the combustion of aluminum in air for this hp requires 221 ton/hr of aluminum. Now at 117 knot over 12,000 miles takes 89 hours equal to 19,700 tons of aluminum. However, that assumes all the energy is converted to propulsion. However, as noted above, the unique feature of this invention is an estimated 80% of the energy input is converted to thrust as opposed to less than 50% in gas turbine, and 30% in steam turbines. So the total aluminum would be 24, 600 tons, and with the slagging combustors 90% slag metal oxide retention, the new aluminum cost is $4.9 million at $2000 per ton, and assuming a $250 aluminum oxide reprocessing cost, of the 90% retained, to aluminum. At 22,140 tons, the cost is $6 million, for a total of $10.9 million. Note that the exact cost is not critical because the cost of electricity is the key factor, and the patents cited in the Application can deliver zero emission coal with co-benefits such as high value hydraulic cements, and $CO_2$ emission credits can earn revenue that is more than double the wholesale cost of electricity. This plus the huge energy reduction in the present metal fuel with no oil for transportation will make this metal processes profitable. Especially, with the almost factor of 3 higher efficiency over steam turbine power.

The SS United States consumes 12,000 tons of oil for 12,000 miles. For 7.9 barrels per short ton yields 95,000 barrels at $100 per barrel, the cost is $95 million. But that is only at 35 knots. FIG. 5 shows at 45 knots with the improved ship modification would require 4 times the power and oil to hit 45 knots from 35 knot, which reduces the 12,000 mile travel time to 78%, and oil is 4×0.78×$95=$295 million plus 225,000 tons of $CO_2$ emitted and 232 hours versus the present $11 million and no $CO_2$ and 89 hours.

And this is only 45 knots, not 100 knots.

Also, the aluminum and its oxide require much less space that the oil due to their much lower density. The difference in space needed for the metal is discussed below.

With aluminum used to propel the ship to 100 knots there is no reason to initially design for a 12,000 mile range. All the published Navy studies on the Internet use a wide range of ship displacement and range. The SSMA Report for the SEV shows calculations that are far less than 12,000 miles. Table 1 shows ranges as little as 4,000 nautical miles.

So for example, a 3000 mile, 100 knot, 26 hour trip from NY to the UK would require only (100/117)×(3000/12,000)× 43,740=8,972 tons of aluminum, which compares with oil's 3,000 tons at 35 knots, and 15,950 tons at 45 knots, which is 45% of the speed (See FIG. 5), and exceeds the ship's oil capacity by 33%, and costs $5.83 million for aluminum vs. $12.4 million for oil, that emits $CO_2$, and that takes twice as long and requires first major design changes.

Also, the metal oxide would double the weight, but since this oxide is generated during the trip, it would amount to an average 50% weight increase. However, the key point is that the density of oil is about 0.9 gm/cc, or 56 lb/ft$^3$, while for aluminum it is 2.7 gm/cc, or 168.5 lb/ft$^3$, and for $Al_2O_3$ it is 3.9 gm/cc, or 243 lb/ft$^3$. So the density of the aluminum plus 50% of the difference between the aluminum and its oxide equals 206 lb/ft3. As powder with a 55% packing factor, the volume would be about double. However, at present it is assumed that the metal could be ground on board ship and the metal oxides could be left in denser blocks on the ship, which results in a greater packing factor near 1.

Also, a major benefit of the metals and oxides is that they could be stored in the rear half of the ship which lower the stern and raises the bow. This reduces ship drag and power needed.

Another option is to install a nuclear reactor on the ship to provide the power to reprocess the $Al_2O_3$ to Al and use the released oxygen. This is not a perpetual motion machine because the nuclear power is independent of the metal combustor. In this case the propulsion gas would be air instead of $N_2$. The determinant on its feasibility would be whether the reprocessing reaction could keep up the propulsion rate, which would require testing.

Figure 8:
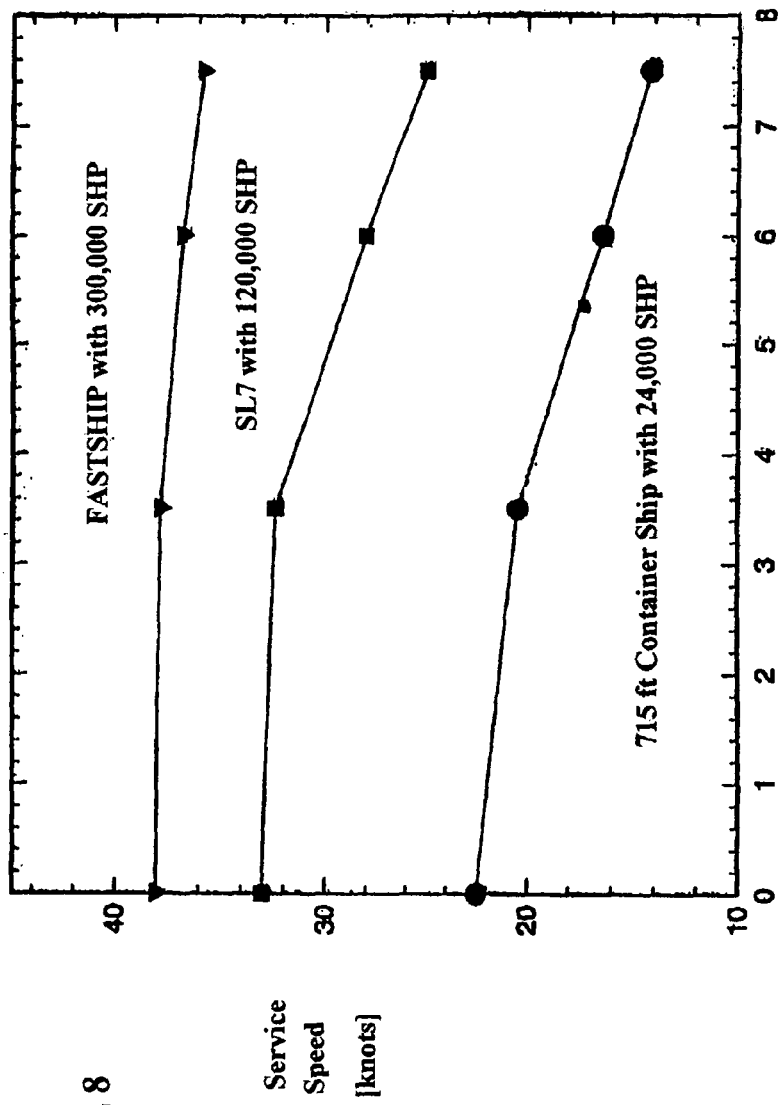
FIG. 8 shows that the loss of ship speed due to increasing ocean wave height decreases at various ship propulsion power levels.

The JJMA Report states that drag on monohull ships at high speed is dominated by wave making drag (See FIG. 8). Therefore, more power is needed, but no solution as to where this power will come. It is further stated that wave-making resistance is the primary drag on a ship, and it is dominated by Speed and Slenderness. Speed power increases as the cube ratio but only up to the ratio of ship speed in knots divided by the square roof of the ship's length in feet, to the 1.3 power. (For the SS-United States this is 37.25/990$^{0.5}$=1.18, or modified 39.5/990 0.5=1.26 both values are below 1.3). However, increasing the modified power to 600,000 hp yields 45/990 0.5=1.43, which is clearly above the "normal" limit. Now the increase in speed from 39.5 to 45 is 1.14 and the increased power is 600,000/240,00=2.5, which is the 7$^{th}$ power of the speed increase. Now without the modifications, the speed increase is 45/37.25=1.21, while the power increase is 900,000/240.000=3.75 which is also to the 7$^{th}$ power. The JJMA Report offers no explanation as to how this high speed is to be implemented, nor as to the reason why for equal percent speed increase, the power increase by percentage is the same.

The remedies offered for reducing the power at 35 knots strongly indicated that only a conventional power train was considered. The 29.5% power reduction was to be achieved by adding a bow bulb, 5%, a stern flap, 8.5% for high strength steel and lighter weight gas turbines 5%, and efficiency increases by counter-rotating propellers 11%. Only the first two increase the ship speed by raising the water line a little bit.

Interestingly, the higher efficiency of a gas turbine (50%) over a steam turbine (30%) in not stated in that report. The only note is a 5% reduction due to lighter gas turbine machinery. In the present application, the gas turbine increases efficiency by 67%. Of course the metal fuel is a much bigger efficiency factor.

Another proof that the speed increase in the prior art was to be within the existing ship propulsion technology of steam and gas turbines because all the Navy studies over the years focus on various ship designs but not other high power concepts.

Now the solution disclosed herein is to go outside the existing ship technology with a much more powerful power train that operates in a totally new mode. A similar sea change occurred in the 1830s. While historians of ship technology probably know about the revolutionary advance in ship propulsion, collectors of 19$^{th}$ Century Transatlantic mail from the USA to the UK certainly know that the speed of a ship is primarily a function on the ship's surface are exposed to the ocean, and not its volume. In the 1830s, several English steamship entrepreneurs sought public financing for a fleet of four, paddle wheeled, coal-fired, passenger, cargo and mail steamships from the UK to the USA. At the time, self-styled scientific "experts" crisscrossed the breath of the United Kingdom lecturing on scientific matters, which served as entertainment in those days before Radio, TV, and the Internet. One of these "experts" was Dr. Dionysus Lardner. One of his lectures was printed in the Edinburgh Review in April 1837 in which he showed by detailed analysis that a steamship no matter the size would run out of coal about two-thirds of the way from the UK to NY. He warned against the attempt by "projectors much more highly supplied with zeal than knowledge" that offer shares for UK to US steam ship construction. ("projectors" was the 19$^{th}$ Century word for "entrepreneurs", and its reintroduction in our time might save investors a great deal of money) He also stated that it "would be easier to go to the Moon than to NY". One of those "projectors" was the Great Western Steam Ship Company in Bristol, UK, whose chief engineer was Isambard Kingdom Brunel, (recognized to this day as the most brilliant engineer of the 19$^{th}$ Century), who had already designed and managed the construction of the Great Western Railroad from London to Bristol, as well as bridges and tunnels. In 1836, at a fund raising public meeting for the four ships to run a weekly service from Bristol to NY, Brunel stated that drag on a ship based on his ship model tests was proportional to the ship surface area exposed to water, not the ship volume as Lardner asserted. Lardner's statements convinced some investors to take a pass and only sufficient funds were subscribed for one ship, named the Great Western, 1340 ton, 450 hp from a 5-psi steam engine, wooden paddle, 212 ft long, 35.3 foot beam. She sailed from Bristol at 10 AM, Apr. 8, 1938 and docked in NY at 5 PM, April 23$^{rd}$, after 15 days, 10.25 hours crossing to wild acclaim and massive crowds on shore, having used only 452 tons of coal out of 600 tons loaded. By an incredible coincidence, a rival company, the British & American Steam Navigation Company, whose ship for the New York run, the British Queen was not finished, leased a small 703 ton steamer, the Sirius, to race to NY ahead of the Great Western. Sirius left Cork, Ireland, at 10 AM Apr. 4$^{th}$ 1938 and anchored April 22$^{nd}$ crossing in 18 days and 10 hour, about 5 or so hour ahead of the Great Western. Of her 450 tons of coal loaded only about 20 tons remained, and this only because of a 1834 invention by Samuel Hill of a surface condensers, which enabled fresh distilled water to be fed to the boilers, doing away with the necessity of clearing them of salt every 3-4 days".

Incredibly Lardner's totally erroneous and infamous assertion that it cannot be done has adhered to him since 1838. It is mentioned among many other places, in "Ship Building in Iron and Wood" by Andrew Murray and "Steam-Ships" by Robert Murray" (Adam and Charles Black, Edinburgh, UK 1863) and in "The Iron Ship" by Ewan Corlett (Arco Pub. Co., NY 1975), which is a history of Brunel's iron steam ship, the Great Britain of the 1840s, where the author states after the ship's Captain Hoskin grounded the Great Britain on Dundrum Bay, Ireland on her 7$^{th}$ voyage on Sep. 22, 1846: "This was the death of the Great Western Steamship Company. The Company deserved success but two men had brought it to naught—Dr. Lardner with his pompous ill founded nonsense and Captain Hoskin."

Another consequence of Lardner's action was the UK Post Office offered a UK-US and Canada mail contract and selected a group led by a Canadian descendent of a USA Tory, Samuel Cunard, and rejected the Great Western Co bid. The Cunard Shipping Company, whose name still exists, was repeatedly subsidized by the mail contract for over 30 years. This enabled Cunard to resist all attempt to introduce improved ship technology, which indirectly destroyed attempts by others, especially Brunel to profitably commercialize his next breakthrough in the 1840s with the Great Britain, and in the 1850s with the even more revolutionary 20,500 ton Great Eastern Now in order for the present invention to benefit from Brunel's Great Western that showed a ship's drag and required power depends on its surface area exposed to the water and much less on its volume, this surface area is required. Although it must exist this information is not listed among the many documents on specification of ships, including those on the SS United States, in the SSMA Report that cited data on increasing its speed as shown in FIG. 5 in this Application. Fortunately, the wetted area was found for the Great Britain in Appendix 1 of the "Iron Ship". It is 15,626 ft$^2$. There are variances on this ship's dimensions, and cited herein are those from the 1863 Steam-Ship Book, namely 3,209 presumably Long Tons seawater displacement of 110,309 ft$^3$. Also listed is the length at 274 ft×48.2 width, and 21 ft draft at the waterline, and 31.5 ft depth to the deck. Corlett lists the draft at 18 ft. Presumably his measurement was made when the ship was a hulk. So dividing the displacement of 110,309 ft$^3$ by the 21 ft draft yields 5253 ft$^2$ and doubling this for both sides of the ship yields 10,506 ft$^2$. With the 18 ft draft, the result is 12,256 ft$^2$. The results are 67% and 78% of the actual measured value. Since the wetted surface area reported by Corlett was presumably measured from the Great Britain hulk in the 1970s, the 67% value will be used. It will be corrected when the measured values are located. Since the draft is listed for all ships, the 67% of actual wetted area is used for the following analysis.

The ratio of displacement tonnage in cubic feet over wetted area values are listed herein in Table 2 for the Great Britain, Great Western, Great Eastern, Sirius and United States to see what light they shed on ship propulsions. The Great Britain is the actual value, while the others are double the value of displacement in sq. ft. divided by 67%.

TABLE 2

Ratio of Displacement Volume over Wetted Surface Area

| | Great Britain | Great Western | Great Eastern | Sirius | United States |
| --- | --- | --- | --- | --- | --- |
| Displacement-ft$^3$ | 110,309 | 46,065 | 773,438 | 24,166 | 1,832,188 |
| Wet Area-ft$^2$ | 15,626 | 8,333 | 92,351 | 4,809 | 176,426 |
| Displac/Wet. Area | 7.06 (actual) | 5.53 (Est.) | 8.38 (Est.) | 5.03 (Est.) | 10.39 (Est.) |

Note that there is considerable confusion as to the meaning of ship terms, such as tonnage, gross tonnage, displacement, etc. In presenting these data an attempt was made to use consistent definitions in order to show the impact of a solution on the ships selected. Table 2 shows that as the ship size increases the displacement over the wetted area increases which shows that the ships per displacement become higher in the water, namely their drag on a per unit basis decreases, which is the point that Brunel tried to explain to Lardner, but the latter had a "Doctor" in front of his name so he impressed the unlearned.

Table 2 shows that the SS United States is clearly superior as a load carrier and it is several times that of the mid 19$^{th}$ Century ships. As noted, it is 990 ft long, has a 101 ft. beam, a 31 ft draft, and displaces 53,300 short tons of seawater at 64 lb/ft$^3$, which equals 1,832,188 ft$^3$, with 59,103 ft$^2$ (=1,832,188/31) below the water line. So the corrected estimate is now 59,103×2/0.67=176,426 ft$^2$ wetted surface area below the 31 ft water line.

Another measure of performance is this ship's V shape with a Slenderness defined as ship length (L) in feet divided by Displacement, $\blacktriangledown^{0.333}$ in long tons, which equals 990/48, 455$^{0.333}$=27.2 for this ship. This is quite a high slenderness. The JJMA Report (cited above) lists a ratio of 12 in a 7,500 long ton Fast Ferry as the peak for high speed. However, this was a surface effect ship, while in the present ship high slenderness facilitates the ship's knifing through the waves, which suggests that high power could substantially increase speed, the present objective.

Another number is the length, L, of 990 ft and the beam, B, of 101 on the SS United States, which yields a L/B of 9.8. The purpose is to maintain the same slenderness ratio. This can be used to specify how a monohull like the SS United States could be constructed to deliver twice the peak power of the SEV. Using the same Slenderness, S=L/$\blacktriangledown^{.333}$=27.2 and doubling the displacement from 53,300 short tons to 106,600 ST, yields a $\blacktriangledown^{0.333}$ of 47.4 from which a length L of 47.3×27.2=1, 287 ft. Using the same L/B of the original ship as 9.8, yields a Beam of=1287/9.8=131. Also L×B=1287×131=168,597 ft$^2$. Now the same wetted area formula with double displacement of 2×1,832,188 ft$^3$=3,664,376 ft$^3$, and again the same estimated ratio of 10.39 as the ratio of cubic feet displacement divided by the wetted surface area yields a wetted area of 3,664,376/10.39=352,683 ft$^2$, which is double the 168,245 ft$^2$ of the current SS United States. The justification for using the same 10.39 is that Table 2 shows the change in its value was not very great, only 50% in going from the Great Britain, the first modern iron ship with a screw propeller to the 16 times greater displacement United States.

The same scaling factor could be used to determine the draft of this larger ship. Here again one can use the L×B=1287*131=168,597 ft$^2$ at the ships water line. Since the volume doubled and the water line area doubled the draft should be cut in half from 31 ft to 15,5 ft. There are other design variations but the main point is the ship is twice the size and its relative contact with the water is reduced because even if the wetted surface area is doublet, it is shallower and therefore the drag should decrease. This up to one half reduction in draft means that less relative power is needed to overcome ship drag.

Another very important factor concerning ship propulsion is the overriding importance of propulsion power. Due to presumably funding limitations or lack of mission or what ever, all the high-speed ship studies in the past decades focused on small ships, mostly 1000 tons and less than 10,000 ton size. However, examining FIG. 8, which also in the JJMA Report one notices that as the ship horsepower, shp, increased the percent reduction in speed with increasing wave heights, decreased to minimal levels at 300,000 hp. The present invention deals with propulsion power levels in a multitude of ships, especially in large 1000 feet long ships. At that range those tiny waves are like tiny barriers that will not discomfort passengers with seasickness. This up and down motion is listed as a significant concern in the cited literature. A 30-hour trip to Europe at 100 knots should more comfortable than sitting squeezed in like sardines in a jumbo jet for 12 hours and bouncing around through turbulence.

Ship Propulsion Power:

The ship's propulsion power could be provided by a 2000° K to 3000° K nuclear reactor, which as disclosed earlier in this application would have a core of 14 ft D.×14 ft. H, which with insulation and shielding would fit inside the SS-United States and any of the U.S. World War 2 battleships and even cruisers. Although the Navy could implement a nuclear powered ship without interference based on a Supreme Court Decision, it is not necessary initially to use nuclear because most of the technology can be commercially implemented with magnesium or aluminum.

As stated above, 24,600 tons of aluminum would be required to propel the SS-United States at 100 knots as deduced from the equal size SEV at 117 knots. Using the aluminum density and 50% of the $Al_2O_3$ density of 206 lb/ft$^3$, requires 684,369 ft$^3$ for a 12,000 mile range, which incidentally none of the other high speed high displacement ship design can achieve. This volume will displace 21,899 tons of seawater, resulting in a net load added of 48,590 tons. However, since the ship has a 12,000-ton of oil capacity, its removal frees up at 56 lb/ft$^3$ seawater density, a total of 428,574 ft$^3$. If room was made for the 20,206 tons of oil to match the range and 39.5 knot speed when aluminum powers SS United States, 716,247 ft$^3$ would be freed up by removing this oil, which equals 40.41% of the ships displacement. This is a detail that can be readily overlooked when invoking Archimedes' principle. A load equal to the displaced volume of water provides a buoyant force to the ship. Now when the "weight" given is only the weight of the displaced water, which presumably is called "displacement", the part of the ship below the water line, which is 31 ft for the initial example for the SS-United States, would be freed up. Now with oil that is 10% less dense than water, the buoyant force is almost a wash, and the water line includes the oil. However, with dense aluminum, the volume occupied is about 3 times less than water. This means that when oil is replaced with the metal and its oxide, then the space originally occupied by the oil become buoyant air. So replacing the 12,000 tons of oil frees up 428,574 ft$^3$ of space and adds 13,714 tons of buoyancy. This leaves only 684,369 ft$^3$–428,574 ft$^3$=255,795 ft$^3$ of new space, which adds 7,980 tons of new buoyancy. The net result is 74,490–7980–12000=54,510 tons are left as new weight. Since there is considerably air inside the shell of the ship above the water line, how far will the ship's waterline be lowered to cover this net weight, assuming the existing load remains the same? Now since the ship's walls at the waterline are near vertical, the "length×beam" of the ship at the water line is 99,990 ft$^3$ per vertical foot and 3200 tons of buoyancy per foot, and the waterline would be lowered by 17 feet, and 1,700,000 ft$^3$. However, since the added 54,510 tons of Al+0.5 $Al_2O_3$, would only occupy 64/206=31% of this space, the remaining 69%, of 1,173,000 ft3 would be empty and add 37,536 tons of buoyancy, leaving only 16,974 tons of new weight, and only 5.27 ft lower waterline below 31 feet.

The purpose of this rough calculation is to bring attention that in using Archimedes Principle one must not forget that each additional weight on a ship is counteracted by buoyancy if the density of the added weight is much greater that water. So the use of metal fuel provides a major advantage by increasing power while using only one-third of the space for fuel thereby freeing up space for other uses. Of course overriding this is that oil fired gas turbines cannot provide the power for 100 knot monohull ships.

The above calculations are meant to show the huge advantages offered by high power density propulsion for Navy and commercial ships.

Another simple option would be to operate at up to 100 atm. This would increase the total force vector for the 240,000 hp case to 1.278×10$^9$ ft$^2$/hr at the nozzle exit without a significant increase in compressor power, and it would reduce the dimensions of the entire gas propulsion system.

The above solution shows how to greatly increase the speed and range of large monohull ships with metal fuels. Alternatively, the metal fuel can also be used to power a MHD generator-accelerator, which could achieve similar thrust. Another alternative would be using a closed cycle gas cooled pebble bed nuclear reactors at lower, 2000° K to 3000° K temperatures to heat air to provide thrust to propel the ship with a gas jet. Another alternative is to use a closed cycle nuclear MHD generator with a seeded noble gas to drive electric motors to propel ships with propellers or pumped water jets which will not achieve the high speeds as above, but will eliminate the need for non-renewable fossil fuels.

The bottom line is the propulsion options disclosed herein are revolutionary in that they provide very high speed in large ships without the use of fossil fuels.

Circumnavigating the Globe at its Polar Axis:

Historically, each major advance in transportation began by demonstrating in a first trip, that the "experts" predicted could not be done from Columbus in 1402, Magellan in 1517, the Brunel's Great Western in 1838, Parson's steam turbine, etc. Circumnavigating around the equator is still of minor interest, as a solar electric powered boat recently accomplished in over a year. However, accomplishing the trip around the polar axis, especially by crossing the North Pole with the ship's icebreaking capability and going around either side of the landlocked South Pole would really be a revolutionary FIRST if done in less that two weeks. As noted earlier, this could be done in 10 days at over 100 knots. By modifications to the SS-United States and the US Battleships that could break the polar ice at about 10 feet, ac discussed earlier herein, this trip could go over the North Pole. That would be a titanic first voyage, and not a repetition of the foolhardy first voyage of the real Titanic that barreled into a huge iceberg.

One final important point needs to be made. This invention discloses a number of very novel concepts for high-speed land, sea, and air transportation. In support of the claims listed herein quite a number of mathematical examples were given. The examples given used the fundamental chemical and physical relationships, such as the laws of conservation of mass, energy, momentum, and chemical reactions. Much of this work was done on a nominal $10 electronic hand calculator. While computer spreadsheet program were used extensively, it was found that after many iterations the objective of a particular analysis had changed so many times, that its purpose was lost.

What this invention sought to avoid is a repeat of the massive "cast of thousand" ERDA/DOE "Energy Conversion Alternative Study" of the 1970s, which was used to destroy energy technologies that were in the advanced research phase with very promising test results, primarily closed cycle, non-equilibrium MHD lest its continued success would prevent the commitment of massive billions to open cycle MHD that was massive in cost but poor in performance.

The most incredible result of this invention is that non-equilibrium MHD offers a realistic chance for success in all the disclosed application herein, and in a plan for its stepwise implementation at modest cost.

The present invention has been described with respect to specific embodiments. It may be embodied in other specific forms without departing from its spirit or essential attributes. Accordingly, reference should be made to the appended claims, rather than the foregoing specifications and accompanying drawings for an indication of the scope of the invention.

Listing of features and accompanying reference numerals disclosed in FIGS. 1 and 2 include:
(1') Air;
(2') aluminum/magnesium;
(3') $Al_2O_3$/MgO slag;
(4') Nitrogen;
(5') Cesium;
(6') Water slag quench;
(A') $1^{st}$ Combustor stage;
(B') $2^{nd}$ Combustor stage;
(C') MHD Generator;
(D') MHD Accelerator;
(E') Exit Nozzle;
(F') Air Cooling;
(1) Gas & Air in;
(2) Argon;
(4) Linear segmented electrode MHD generator;
(5) Steam turbine drives argon compressor;
(6) Rankine steam power cycle plant;
(7) $CO_2$-$N_2$ separation & $CO_2$ sequestration; and
(8) Replace with "Nuclear Pebble Bed Reactor";

I claim:

1. A method, comprising:
using powdered metals as a heat source for power generation by continuous reaction with oxygen in moisture removed air that is compressed to a range from 10 to 100 atmospheres to form liquid 10 to 100 micro-meter, metal oxide droplets in a first of two co-axial chambers in an air-cooled, slagging, cyclone combustor in which nitrogen in the air is heated to a temperature range from greater than or equal to 2000° K, while the droplets are driven into a liquid layer lining an inner cylindrical wall of a first chamber from which the liquid is continuously drained and quenched to a solid in a water filled tank for reprocessing to the metal, wherein:
while heated nitrogen is separated, with part entering a second chamber axially, a balance exits the first chamber and is tangentially re-injected into the second chamber to cancel a nitrogen swirl from the first chamber, and then flows into a subsonic nozzle and supersonic nozzle to exit into the atmosphere, with up to 80% of the thermal energy input to the nitrogen converted to gas dynamic thrust.

2. The method as in claim 1, wherein the nitrogen at the exit of the subsonic nozzle is seeded with 0.1 to 1% cesium or potassium, and flows into a co-axial, linear, Magnetohydrodynamic (MHD) generator that is attached to a coaxial supersonic linear MHD accelerator which on exit to the atmosphere imparts additional thrust.

3. The method as in claim 2, wherein the heated nitrogen expands in the subsonic nozzle to Mach 0.9 to enable its operation at equilibrium conductivity in the MHD generator, that is placed inside a 4 to 6 Tesla saddle coil magnet, and whose segmented electrodes are connected in a diagonal mode to anodes and cathodes of a coaxial supersonic, MHD linear accelerator that operates at Mach numbers between 1.5 and to 2.5, under non-equilibrium conductivity, thereby providing a vehicle with electromagnetic thrust that augments inherent gas dynamic thrust from double to several hundred times greater than gas dynamic thrust by itself.

4. The method as in claim 2, wherein a two stage, counter-swirling combustor retains between 90% to 95%, of liquid fuel metal oxide product of metal fuel combustion for reprocessing to the metal, leaving only 5% to 10% of new metal, for combustion, all for fuel cost that is a fraction of the cost of all new metal fuel.

5. The method as in claim 2, wherein a single MHD generator-MHD accelerator fired with aluminum, or magnesium fuels, delivers over 2 million horsepower to propel a 50,000 ton, mono hull ship to greater than or equal to 50 knots.

6. The method of claim 1, further comprising providing a system that maximizes thermal efficiency by operating at gas temperatures from greater than or equal to 2000°, which enables propulsion efficiencies of 80% from heat input, and compression at ambient temperatures to reduce its power use to 15% of the heat input.

7. The method of claim 1, wherein propulsion capability of ships equipped with a propulsion capability using the method of claim 1 allows:
providing gas dynamic thrust to propel classes of ships from 10,000 to 100,000 ton displacement, mono design to speeds in a range from greater than or equal to 50 knots, with sufficient metal fuel for nominal ranges of 12,000 miles with propulsion using the aluminum or magnesium as a renewable fuel, without any carbon dioxide emissions.

8. The method as in claim 1, wherein to yield highest propulsion power requires highest peak temperatures in which case, the metals are one of:
a) Al or Mg for stagnation gas temperatures of 4000° K and 10 atm to 100 atm pressures,
b) Al for 5000° K and 100 atm, and
c) Zr for 6000° K and 100 atm.

9. The method as in claim 1, wherein existing oil propulsion is replaced with aluminum propulsion in existing ships wherein weight of aluminum and its $Al_2O_3$ oxide product of combustion has a same total energy content as oil, weighs 8.5 times more than oil, has 3 times density of oil, which will reduce by 40% a volume of existing oil storage to 15% for aluminum and the $Al_2O_3$ product volume storage, thereby freeing 25% of the ship's fuel oil volume for additional other uses.

10. The method as in claim 1, wherein the powdered metals include aluminum, magnesium, or zirconium.

\* \* \* \* \*